US012673278B2

(12) United States Patent (10) Patent No.: US 12,673,278 B2
Levy et al. (45) Date of Patent: Jul. 7, 2026

(54) AGRICULTURAL SAMPLING SYSTEM AND RELATED METHODS

(71) Applicant: Precision Planting LLC, Tremont, IL (US)

(72) Inventors: Kent Levy, Morton, IL (US); Reid Harman, Trivoli, IL (US); Dale M. Koch, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 325 days.

(21) Appl. No.: 18/555,307

(22) PCT Filed: May 11, 2022

(86) PCT No.: PCT/IB2022/054361
§ 371 (c)(1),
(2) Date: Oct. 13, 2023

(87) PCT Pub. No.: WO2022/243794
PCT Pub. Date: Nov. 24, 2022

(65) Prior Publication Data
US 2024/0189743 A1     Jun. 13, 2024

Related U.S. Application Data

(63) Continuation-in-part of application No. 17/326,050, filed on May 20, 2021, now Pat. No. 12,343,694.
(Continued)

(51) Int. Cl.
B01D 29/075     (2006.01)
B01D 29/56     (2006.01)
(Continued)

(52) U.S. Cl.
CPC ........... B01D 29/075 (2021.08); B01D 29/56 (2013.01); B01D 29/885 (2013.01); B01F 23/53 (2022.01);
(Continued)

(58) Field of Classification Search
CPC .... B01D 29/075; B01D 29/56; B01D 29/885; B01F 23/53; B01F 23/581; B01F 35/2134; B01F 23/511; B01F 35/213
(Continued)

(56) References Cited

U.S. PATENT DOCUMENTS 2,757,799 A * 8/1956 Ritchie .................. B01D 37/00
210/345
3,338,171 A     8/1967 Conklin et al.
(Continued)

FOREIGN PATENT DOCUMENTS

CA     2147726 A1     10/1995
CN     204900224 U     12/2015
(Continued)

OTHER PUBLICATIONS

European Patent Office, Search report for related PCT Application No. PCT/IB2022/054361, dated Sep. 9, 2022, 15 pages.
(Continued)

*Primary Examiner* — Ekandra S. Miller-Cruz

(57) ABSTRACT

An automated computer-controlled sampling system and related methods for collecting, processing, and analyzing agricultural samples for various chemical properties such as plant available nutrients. The sampling system allows multiple samples to be processed and analyzed for different analytes or chemical properties in a simultaneous concurrent or semi-concurrent manner. Advantageously, the system can process soil samples in the "as collected" condition without drying or grinding. The system generally includes a sample
(Continued)

preparation sub-system which receives soil samples collected by a probe collection sub-system and produces a slurry (e.g., mixture of soil, vegetation, and/or manure and water), and a chemical analysis sub-system which processes the prepared slurry samples for quantifying multiple analytes and/or chemical properties of the sample. The preparation sub-system may comprise a slurry recirculation flow loop configured with devices to stir, measure, and adjust a water to solids ratio of the slurry.

17 Claims, 61 Drawing Sheets

Related U.S. Application Data

(60) Provisional application No. 63/191,195, filed on May 20, 2021, provisional application No. 63/191,199, filed on May 20, 2021, provisional application No. 63/191,204, filed on May 20, 2021, provisional application No. 63/191,186, filed on May 20, 2021, provisional application No. 63/191,189, filed on May 20, 2021.

(51) Int. Cl.

| | | |
|---|---|---|
| *B01D 29/88* | (2006.01) |
| *B01F 23/50* | (2022.01) |
| *B01F 23/53* | (2022.01) |
| *B01F 35/21* | (2022.01) |
| *B01F 35/213* | (2022.01) |

(52) U.S. Cl.
CPC ........ *B01F 23/581* (2022.01); *B01F 35/2134* (2022.01); *B01F 23/511* (2022.01); *B01F 35/213* (2022.01)

(58) Field of Classification Search
USPC ........................................................ 210/408
See application file for complete search history.

(56) References Cited

U.S. PATENT DOCUMENTS

| | | | |
|---|---|---|---|
| 3,363,769 | A | 1/1968 | Wilmot et al. |
| 3,583,209 | A | 6/1971 | Banks |
| 3,605,815 | A | 9/1971 | Von Forell |
| 3,625,296 | A | 12/1971 | Mabry et al. |
| 3,874,417 | A | 4/1975 | Clay |
| 4,074,562 | A | 2/1978 | North, Jr. |
| 4,123,204 | A | 10/1978 | Scholle |
| 4,163,461 | A | 8/1979 | Jacobellis |
| 4,243,533 | A | 1/1981 | Savolainen et al. |
| 4,727,758 | A | 3/1988 | Murdock |
| 4,981,418 | A | 1/1991 | Kingsford et al. |
| 5,033,319 | A | 7/1991 | Ireland |
| 5,186,615 | A | 2/1993 | Karliner |
| 5,332,372 | A | 7/1994 | Reynolds |
| 5,526,705 | A | 6/1996 | Skotnikov et al. |
| 5,863,443 | A | 1/1999 | Mainwaring |
| 5,932,799 | A | 8/1999 | Moles |
| 7,401,543 | B2 | 7/2008 | Curtis |
| 8,325,336 | B2 | 12/2012 | Preiner et al. |
| 8,822,230 | B2 | 9/2014 | Miyoshi et al. |
| 9,028,224 | B2 | 5/2015 | Headley et al. |
| 9,044,752 | B2 | 6/2015 | Wimberger-Friedl et al. |
| 9,116,078 | B1 | 8/2015 | Scheiderer et al. |
| 9,383,232 | B2 | 7/2016 | Hoshika et al. |
| 9,891,155 | B2 | 2/2018 | Eising |
| 10,065,186 | B2 | 9/2018 | Kolb et al. |
| 11,529,579 | B2 | 12/2022 | Kawaguchi et al. |
| 11,549,871 | B2 | 1/2023 | Sogaard et al. |
| 2006/0219642 | A1 | 10/2006 | Farnham et al. |

| | | | |
|---|---|---|---|
| 2007/0017277 | A1 | 1/2007 | Francisco, Jr. et al. |
| 2007/0056914 | A1* | 3/2007 | Slager .................. C02F 1/5281 |
| | | | 210/723 |
| 2008/0053221 | A1 | 3/2008 | Allen |
| 2008/0262783 | A1 | 10/2008 | Alexander Lambert |
| 2010/0224256 | A1 | 9/2010 | Tseng et al. |
| 2010/0303687 | A1 | 12/2010 | Blaga et al. |
| 2012/0051390 | A1 | 3/2012 | Coursey et al. |
| 2012/0103077 | A1 | 5/2012 | Koshnick et al. |
| 2012/0132597 | A1 | 5/2012 | Byalskiy et al. |
| 2012/0177543 | A1 | 7/2012 | Battrell et al. |
| 2013/0078125 | A1 | 3/2013 | Headley et al. |
| 2013/0284651 | A1 | 10/2013 | Lin |
| 2015/0041380 | A1 | 2/2015 | Lin et al. |
| 2015/0109877 | A1 | 4/2015 | Multner et al. |
| 2015/0151223 | A1 | 6/2015 | Eckman |
| 2015/0160056 | A1 | 6/2015 | Schollenberger et al. |
| 2016/0252914 | A1 | 9/2016 | Padgett et al. |
| 2017/0241929 | A1 | 8/2017 | Qui et al. |
| 2018/0008945 | A1 | 1/2018 | Bergamini |
| 2018/0124992 | A1 | 5/2018 | Koch et al. |
| 2018/0224419 | A1 | 8/2018 | Gerber-Siff et al. |
| 2019/0120737 | A1 | 4/2019 | White et al. |
| 2019/0176149 | A1 | 6/2019 | Shachar et al. |
| 2021/0048424 | A1 | 2/2021 | Koshnick et al. |
| 2021/0123936 | A1 | 4/2021 | Swanson et al. |
| 2021/0208037 | A1 | 7/2021 | Swanson et al. |
| 2021/0208123 | A1 | 7/2021 | Swanson et al. |
| 2021/0269331 | A1 | 9/2021 | Anderson et al. |
| 2021/0341452 | A1 | 11/2021 | Swanson et al. |
| 2022/0072545 | A1 | 3/2022 | Keller et al. |
| 2022/0364998 | A1 | 11/2022 | Koch et al. |
| 2023/0213495 | A1 | 7/2023 | Pluta |

FOREIGN PATENT DOCUMENTS

| | | | |
|---|---|---|---|
| CN | 107413269 | A | 12/2017 |
| CN | 110987560 | A | 4/2020 |
| DE | 2936145 | B1 | 10/1980 |
| DE | 2931049 | A1 | 2/1981 |
| DE | 202010002930 | U1 | 7/2011 |
| EP | 0525815 | A1 | 2/1993 |
| EP | 0570335 | A1 | 11/1993 |
| EP | 3636602 | A1 | 4/2020 |
| GB | 751895 | A | 7/1956 |
| GB | 850518 | A | 10/1960 |
| GB | 2555816 | A | 5/2018 |
| JP | 86293501 | A | 4/1987 |
| JP | H02191511 | A | 7/1990 |
| JP | H05317672 | A | 12/1993 |
| JP | 2003210912 | A | 7/2003 |
| JP | 2007029848 | A | 2/2007 |
| WO | 2000069547 | A1 | 11/2000 |
| WO | 2006043900 | A1 | 4/2006 |
| WO | 2013098487 | A1 | 7/2013 |
| WO | 2015171908 | A1 | 11/2015 |
| WO | 2015175470 | A1 | 11/2015 |
| WO | 2021074722 | A1 | 4/2021 |
| WO | 2021171120 | A1 | 9/2021 |
| WO | 2021171121 | A1 | 9/2021 |
| WO | 2021220082 | A1 | 11/2021 |
| WO | 2021220083 | A1 | 11/2021 |
| WO | 2021220084 | A1 | 11/2021 |
| WO | 2021220085 | A1 | 11/2021 |
| WO | 2022243792 | A1 | 11/2022 |
| WO | 2022243793 | A1 | 11/2022 |
| WO | 2022243794 | A1 | 11/2022 |
| WO | 2022243795 | A1 | 11/2022 |
| WO | 2022243796 | A1 | 11/2022 |
| WO | 2022243797 | A1 | 11/2022 |
| WO | 2022243806 | A1 | 11/2022 |
| WO | 2022243807 | A1 | 11/2022 |
| WO | 2022243808 | A1 | 11/2022 |
| WO | 2022243809 | A1 | 11/2022 |
| WO | 2022259071 | A1 | 12/2022 |
| WO | 2022259073 | A1 | 12/2022 |
| WO | 2022259074 | A1 | 12/2022 |
| WO | 2022269388 | A1 | 12/2022 |
| WO | 2023031725 | A1 | 3/2023 |

(56) References Cited

FOREIGN PATENT DOCUMENTS

| | | | |
|---|---|---|---|
| WO | 2023031726 | A1 | 3/2023 |
| WO | 2023031727 | A1 | 3/2023 |
| WO | 2023042036 | A1 | 3/2023 |
| WO | 2023042037 | A1 | 3/2023 |
| WO | 2023042038 | A1 | 3/2023 |
| WO | 2023042039 | A1 | 3/2023 |
| WO | 2023161727 | A1 | 8/2023 |
| WO | 2023161728 | A1 | 8/2023 |

OTHER PUBLICATIONS

Provolo et al: "In situ determination of slurry nutrient content by electrical conductivity", Bioresource Technology, Elsevier, Amsterdam, NL, vol. 98, No. 17, Aug. 23, 2007, pp. 3235-3242, ISSN: 0960-8524, DOI: 10.1016/J.BIORTECH.2006.07.018.
Iain R. G. Ogilvie, "Novel fabrication techniques for microfuidic based in-situ oceanographic nutrient sensors", Sep. 1, 2012, 2012.

* cited by examiner

OSCILLATOR TUBE    PERMANENT MAGNET

Fe BUILDUP 7024    7025

7011

MAGNETIC FLUX LINES

7011

7025

7024

7030

7030    7025

7011

UP

LEFT

RIGHT

DOWN

Gravity 7051　　　　　　　　　　　　　　　　　7052
FIG. 324　　　　　　　　　　　　　　　FIG. 324
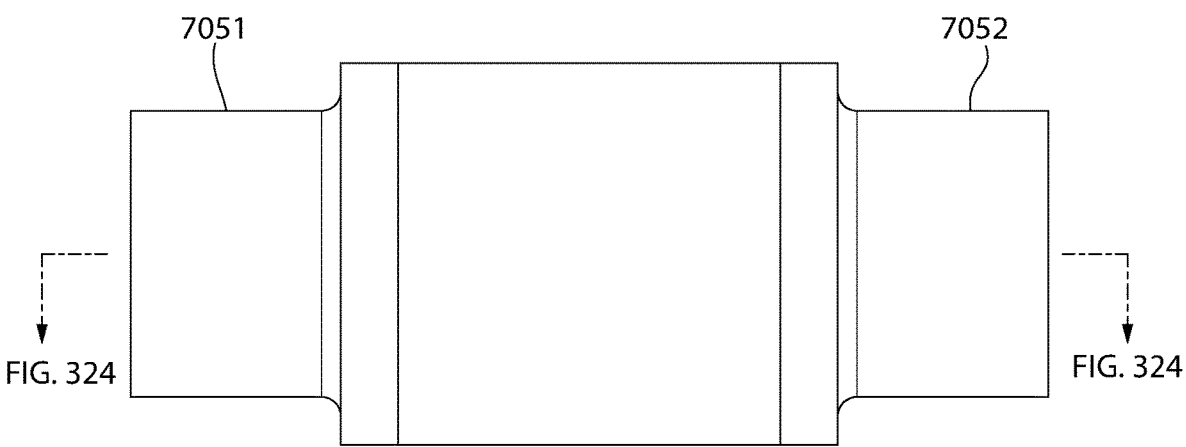
FIG. 22
7053　　　7055
7051　　　　　　　　　　　　　　　　　7052
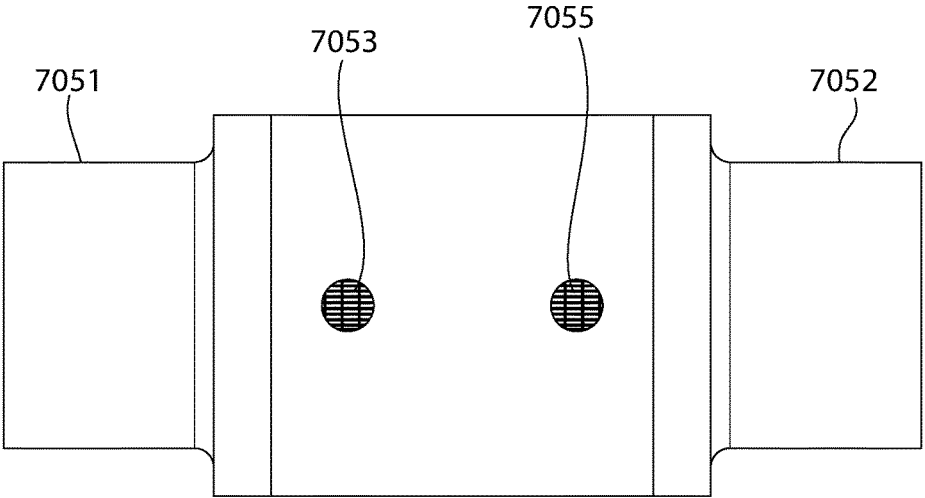
FIG. 23

FILTRATE TO EXTRACTION SUBSYSTEM 7004

SLURRY OUTLET TO SAMPLE MIXER PREP. CHAMBER 7001 (FIG. 303B)

SLURRY INLET FROM DENSITY METER 7010 (FIG. 303B)

AGRICULTURAL SAMPLING SYSTEM AND RELATED METHODS

CROSS-REFERENCE TO RELATED APPLICATIONS

The present application is a national phase entry under 35 U.S.C. § 371 of International Patent Application PCT/IB2022/054361, filed May 11, 2022, designating the United States of America and published in English as International Patent Publication WO 2022/243794 A1 on Nov. 24, 2022, which is a continuation of U.S. application Ser. No. 17/326,050 filed 20 May 2021 and claims the benefit of priority to U.S. Provisional Application Nos. 63/191,186, 63/191,189, 63/191,195, 63/191,199, and 63/191,204 all filed 20 May 2021. The foregoing applications are all incorporated herein by reference in their entireties.

BACKGROUND

The present disclosure relates generally to agricultural sampling and analysis, and more particularly to a fully automated system for performing soil and other types of agricultural related sampling and chemical property analysis.

Periodic soil testing is an important aspect of the agricultural arts. Test results provide valuable information on the chemical makeup of the soil such as plant-available nutrients and other important properties (e.g. levels of nitrogen, magnesium, phosphorous, potassium, pH, etc.) so that various amendments may be added to the soil to maximize the quality and quantity of crop production.

In some existing soil sampling processes, collected samples are dried, ground, water is added, and then filtered to obtain a soil slurry suitable for analysis. Extractant is added to the slurry to pull out plant available nutrients. The slurry is then filtered to produce a clear solution or supernatant which is mixed with a chemical reagent for further analysis.

Improvements in testing soil, vegetation, and manure are desired.

BRIEF SUMMARY

The present invention provides an automated computer-controlled sampling system and related methods for collecting, processing, and analyzing agricultural samples such as without limitation soil samples in one embodiment for various chemical properties such as plant available nutrients. The sampling system allows multiple samples to be processed and analyzed for different analytes (e.g. plant-available nutrients) and/or chemical properties (e.g. pH) in a simultaneous concurrent or semi-concurrent manner, and in relatively continuous and rapid succession. Advantageously, the system can process soil samples or other type agricultural samples in the "as collected" condition without the cumbersome drying and grinding steps in the prior processes previously described.

The present system generally includes a sample preparation sub-system, which receives soil or other type agricultural samples and produces an agricultural slurry (e.g., mixture of soil, vegetation, and/or manure and water), and a chemical analysis sub-system which receives and processes the prepared slurry samples from the sample preparation sub-system for quantification of the analytes and/or chemical properties of the sample. The agricultural samples may be automatically collected by a probe collection sub-system or by other methods including manual sampling. The described chemical analysis sub-system can be used to analyze the agricultural slurry which may be comprises of soil, vegetation, manure, milk, or other type samples.

In one embodiment, the sample preparation system generally includes a mixing device which mixes the collected raw soil sample in the "as sampled" condition (e.g. undried and unground) with a diluent such as water to form a sample slurry. The unfiltered slurry is then coarsely filtered through a coarse filter unit to remove larger than desired oversized solid particles which may include foreign debris in the sample and/or hardened agglomerations of the agricultural sample solids not broken down completely by the mixing device. The filtered slurry (filtrate) then enters a closed slurry recirculation flow loop configured to circulate the slurry for determining the water to solids ratio of the slurry. As further described herein, various components forming integral parts of the flow loop are configured to circulate the slurry in the closed flow loop, suppress pressure surges, measure slurry density, and measure the density of the solid particulate component of the slurry. Operation of some or all of the system and flow loop components may be controlled by a programmable system controller. The system measures the actual water to solids ratio and compares that measurement to a desired target water to soil ratio desired for subsequent chemical analysis of the slurry to quantify the level or concentration of an analyte of interest (e.g. soil nutrient or other parameter). The system is configured to add water to the closed flow loop to hit the target water to soil ratio.

Once the target water to soil ratio is achieved, the slurry is extracted from the slurry recirculation flow loop and filtered through a fine filter unit which forms an integral component of the slurry recirculation flow path. The extracted and filtered slurry is then processed through chemical analysis sub-system which quantifies the concentration or level of the analyte(s) of interest. The chemical analysis sub-system performs the general functions of adding/mixing extractant with the slurry, separating a clear supernatant from the slurry, adding/mixing a color-changing reagent with the supernatant, and finally sensing or analysis for detection of the analytes and/or chemical properties such as via colorimetric analysis or other analytical techniques.

Although the sampling systems (e.g. sample collection, preparation, and processing) may be described herein with respect to processing soil samples which represents one category of use for the disclosed embodiments, it is to be understood that the same systems including the apparatuses and related processes may further be used for processing other types of agricultural related samples including without limitation vegetation/plant, forage, manure, feed, milk, or other types of samples. The embodiments of the invention disclosed herein should therefore be considered broadly as an agricultural sampling system. Accordingly, the present invention is expressly not limited to use with processing and analyzing soil samples alone for chemical properties of interest.

BRIEF DESCRIPTION OF THE DRAWINGS

The present invention will become more fully understood from the detailed description and the accompanying drawings, wherein like elements are labeled similarly and in which:

FIG. 22 is a bottom view thereof;

FIG. 23 is top view thereof;

Figure 1:
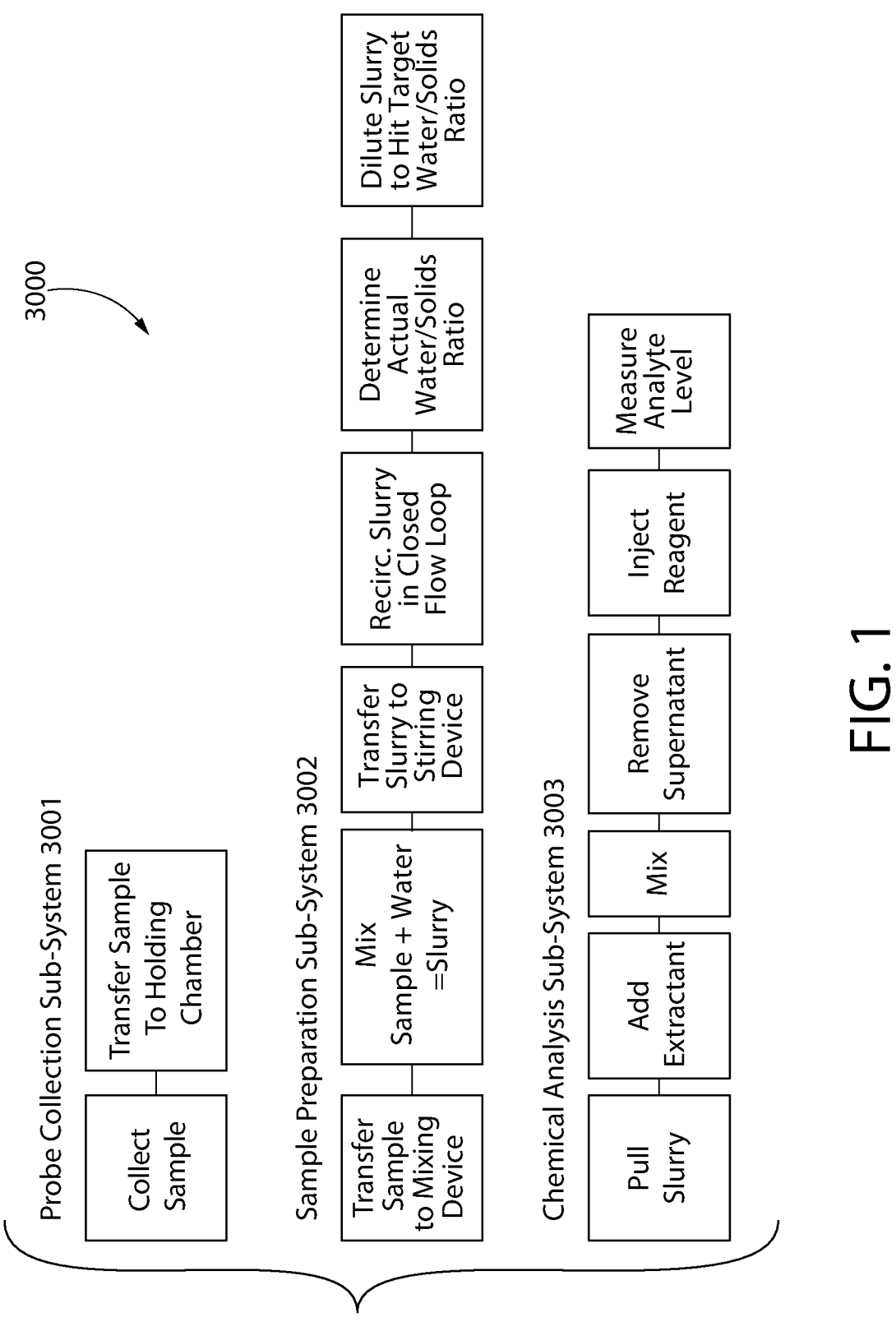
FIG. 1 is a schematic flow diagram of an agricultural sampling analysis system according to the present disclosure showing high-level functional aspects of each sub-system of the sampling analysis system.

All drawings are not necessarily to scale. Components numbered and appearing in one figure but appearing unnumbered in other figures are the same unless expressly noted otherwise. A reference herein to a whole figure number which appears in multiple figures bearing the same whole number but with different alphabetical suffixes shall be construed as a general reference to all of those figures unless expressly noted otherwise.

DETAILED DESCRIPTION

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

FIG. 1 is a schematic flow diagram of an agricultural sampling system 3000 according to the present disclosure. The sub-systems disclosed herein collectively provides complete processing and chemical analysis of agricultural samples from collection in the agricultural field, sample preparation, and final chemical analysis. In one embodiment, the system 3000 may be incorporated onboard a motorized sampling vehicle configured to traverse an agricultural field for collecting and processing soil samples from various zones of the field. This allows a comprehensive nutrient and chemical profile of the field to be accurately generated in order to quickly and conveniently identify the needed soil amendments and application amounts necessary for each zone based on quantification of the plant-available nutrient and/or chemical properties in the sample. The system 3000 advantageously allows multiple samples to be processed and chemically analyzed simultaneously for various chemical constituents or properties, such as for example without limitation plant-available nutrients. In one embodiment, the sampling system may be a soil sampling system configured to determine the nutrients levels in different portions of an agricultural field for crop production. However, the sampling system may be used for various other type agricultural samplings as previously described herein.

The agricultural sampling system 3000 generally includes a sample probe collection sub-system 3001, a sample preparation sub-system 3002, and a chemical analysis sub-system 3003. The sample collection sub-system 3001 and motorized sampling vehicle are fully described in U.S. Patent Application Publication No. 2018/0124992A1. In the case of soil sampling, sample collection sub-system 3001 generally performs the function of extracting and collecting soil samples from the field. The samples may be in the form of soil plugs or cores. The collected cores are transferred to a holding chamber or vessel for further processing by the sample preparation sub-system 3002. Other sampling systems are described in U.S. Application Nos. 62/983,237, filed on 28 Feb. 2020; 63/017,789, filed on 30 Apr. 2020; 63/017,840, filed on 30 Apr. 2020; 63/018,120, filed on 30 Apr. 2020; 63/018,153, filed on 30 Apr. 2020; 63/191,147, filed on 20 May 2021; 63/191,159, filed on 20 May 2021; 63/191,166, filed on 20 May 2021; 63/191,172, filed on 20 May 2021; Ser. No. 17/326,050, filed on 20 May 2021; 63/191,186, filed on 20 May 2021; 63/191,189, filed on 20 May 2021; 63/191,195, filed on 20 May 2021; 63/191,199, filed on 20 May 2021; 63/191,204, filed on 20 May 2021; Ser. No. 17/343,434, filed on 9 Jun. 2021; 63/208,865, filed on 9 Jun. 2021; Ser. No. 17/343,536, filed on 9 Jun. 2021; 63/213,319, filed on 22 Jun. 2021; 63/260,772, filed on 31 Aug. 2021; 63/260,776, filed on 31 Aug. 2021; 63/260,777, filed on 31 Aug. 2021; 63/245,278, filed on 17 Sep. 2021; 63/264,059, filed on 15 Nov. 2021; 63/264,062, filed on 15 Nov. 2021; 63/264,065, filed on 15 Nov. 2021; 63/268,418, filed on 23 Feb. 2022; 63/268,419, filed on 23 Feb. 2022; 63/268,990, filed on 8 Mar. 2022; and PCT/IB2021/051076, filed on 10 Feb. 2021; PCT Application Nos. PCT/IB2021/051077, filed on 10 Feb. 2021; PCT/IB2021/052872, filed on 7 Apr. 2021; PCT/IB2021/052874, filed on 7 Apr. 2021; PCT/IB2021/052875, filed on 7 Apr. 2021; PCT/IB2021/052876, filed on 7 Apr. 2021.

The sample preparation sub-system 3002 generally performs the functions of receiving the agricultural sample solids or cores in a mixing device, adding a predetermined quantity or volume of filtered water, mixing the soil and water mixture to produce a sample slurry, coarsely filtering the slurry and transferring the filtered slurry to a stirring device which is part of the closed slurry recirculation flow loop and flow path, recirculating the slurry in the flow loop, measuring the actual water/soil ratio of the slurry, and diluting the slurry with water to hit a target water/soil ratio.

The chemical analysis sub-system 3003 generally performs the functions of pulling or extracting the slurry from the slurry recirculation flow loop though a fine filter unit, adding extractant, mixing the extractant and slurry to pull out the analytes of interest (e.g. plant available nutrients, etc.), processing the extractant-slurry mixture to produce a clear liquid or supernatant, removing or transferring the supernatant, injecting a reagent and holding the supernatant-reagent mixture for a period of hold time to allow complete chemical reaction with reagent, and measuring the analyte such as via absorbance via colorimetric analysis, or another analytical technique.

The sample preparation and chemical analysis sub-systems 3002, 3003 and their equipment or components will now be described in further detail.

As already noted herein, the agricultural sampling system, sub-systems, and related processes/methods disclosed herein may be used for processing and testing soil, vegetation/plants, manure, feed, milk, or other agricultural related parameters of interest. Particularly, embodiments of the chemical analysis portion of the system (chemical analysis sub-system 3003) disclosed herein can be used to test for multitude of chemical-related parameters and analytes (e.g. nutrients/chemicals of interest) in other areas beyond soil and plant/vegetation sampling. Some non-limiting examples (including soil and plants) are as follows.

Soil Analysis: Nitrate, Nitrite, Total Nitrogen, Ammonium, Phosphate, Orthophosphate, Polyphosphate, Total Phosphate, Potassium, Magnesium, Calcium, Sodium, Cation Exchange Capacity, pH, Percent Base Saturation of Cations, Sulfur, Zinc, Manganese, Iron, Copper, Boron, Soluble Salts, Organic Matter, Excess Lime, Active Carbon, Aluminum, Amino Sugar Nitrate, Ammoniacal Nitrogen, Chloride, C:N Ratio, Electrical Conductivity, Molybdenum, Texture (Sand, Silt, Clay), Cyst nematode egg counts, Mineralizable Nitrogen, and Soil pore space.

Plants/Vegetation: Nitrogen, Nitrate, Phosphorus, Potassium, Magnesium, Calcium, Sodium, Percent Base Saturation of Cations, Sulfur, Zinc, Manganese, Iron, Copper, Boron, Ammoniacal Nitrogen, Carbon, Chloride, Cobalt, Molybdenum, Selenium, Total Nitrogen, and Live plant parasitic nematode.

Manure: Moisture/Total Solids, Total Nitrogen, Organic Nitrogen, Phosphate, Potash, Sulfur, Calcium, Magnesium, Sodium, Iron, Manganese, Copper, Zinc, pH, Total Carbon, Soluble Salts, C/N Ratio, Ammoniacal Nitrogen, Nitrate Nitrogen, Chloride, Organic Matter, Ash, Conductance, Kjeldahl Nitrogen, *E. coli*, Fecal Coliform, *Salmonella*, Total Kjeldahl Nitrogen, Total Phosphate, Potash, Nitrate Nitrogen, Water Soluble Nitrogen, Water Insoluble Nitrogen, Ammoniacal Nitrogen, Humic Acid, pH, Total Organic Carbon, Bulk Density (packed), Moisture, Sulfur, Calcium, Boron, Cobalt, Copper, Iron, Manganese, Arsenic, Chloride, Lead, Selenium, Cadmium, Chromium, Mercury, Nickel, Sodium, Molybdenum, and Zinc Feeds: Alanine, Histidine, Proline, Arginine, Isoleucine, Serine, Aspartic Acid, Leucine, Threonine, Cystine, Lysine, Tryptophan, Glutamic Acid, Methionine, Tyrosine, Glycine, Phenylalanine, Valine (Requires Crude Protein), Arsenic, Lead, Cadmium, Antimony, Mercury Vitamin E (beta-tocopherol), Vitamin E (alpha-tocopherol), Vitamin E (delta-tocopherol), Vitamin E (gamma-tocopherol), Vitamin E (total), Moisture, Crude Protein, Calcium, Phosphorus, ADF, Ash, TDN, Energy (Digestible and Metabolizable), Net Energy (Gain, Lactation, Maintenance), Sulfur, Calcium, Magnesium, Sodium, Manganese, Zinc, Potassium, Phosphorus, Iron, Copper (not applicable to premixes), Saturated Fat, Monounsaturated Fat, Omega 3 Fatty Acids, Polyunsaturated Fat, Trans Fatty Acid, Omega 6 Fatty Acids (Requires Crude or Acid Fat), Glucose, Fructose, Sucrose, Maltose, Lactose, Aflatoxin (B1, B2, G1, G2), DON, Fumonisin, Ochratoxin, T2-Toxin, Zearalenone, Vitamin B2, B3, B5, B6, B7, B9, and B12, Calories, Chloride, Crude fiber, Lignin, Neutral Detergent Fiber, Non Protein Nitrogen, Selenium U.S. Patent, Total Iodine, Total Starch, Vitamin A, Vitamin D3, and Free Fatty Acids.

Forages: Moisture, Crude Protein, Acid Detergent Fiber ADF, NDF, TDN, Net Energy (Gain, Lactation, Maintenance), Relative Feed Value, Nitrate, Sulfur, Copper, Sodium, Magnesium, Potassium, Zinc, Iron, Calcium, Manganese, Sodium, Phosphorus, Chloride, Fiber, Lignin, Molybdenum, Prussic Acid, and Selenium USP.

Milk: Butterfat, True Protein, Somatic Cell Count, Lactose, Other Solids, Total Solids, Added Water, Milk Urea Nitrogen, Acidity, pH, Antibiotic tests, and Micro-organisms.

While described below for testing soil, any extraction, analysis, or measurement system can be used with any of the above materials.

Control System

Figure 2:
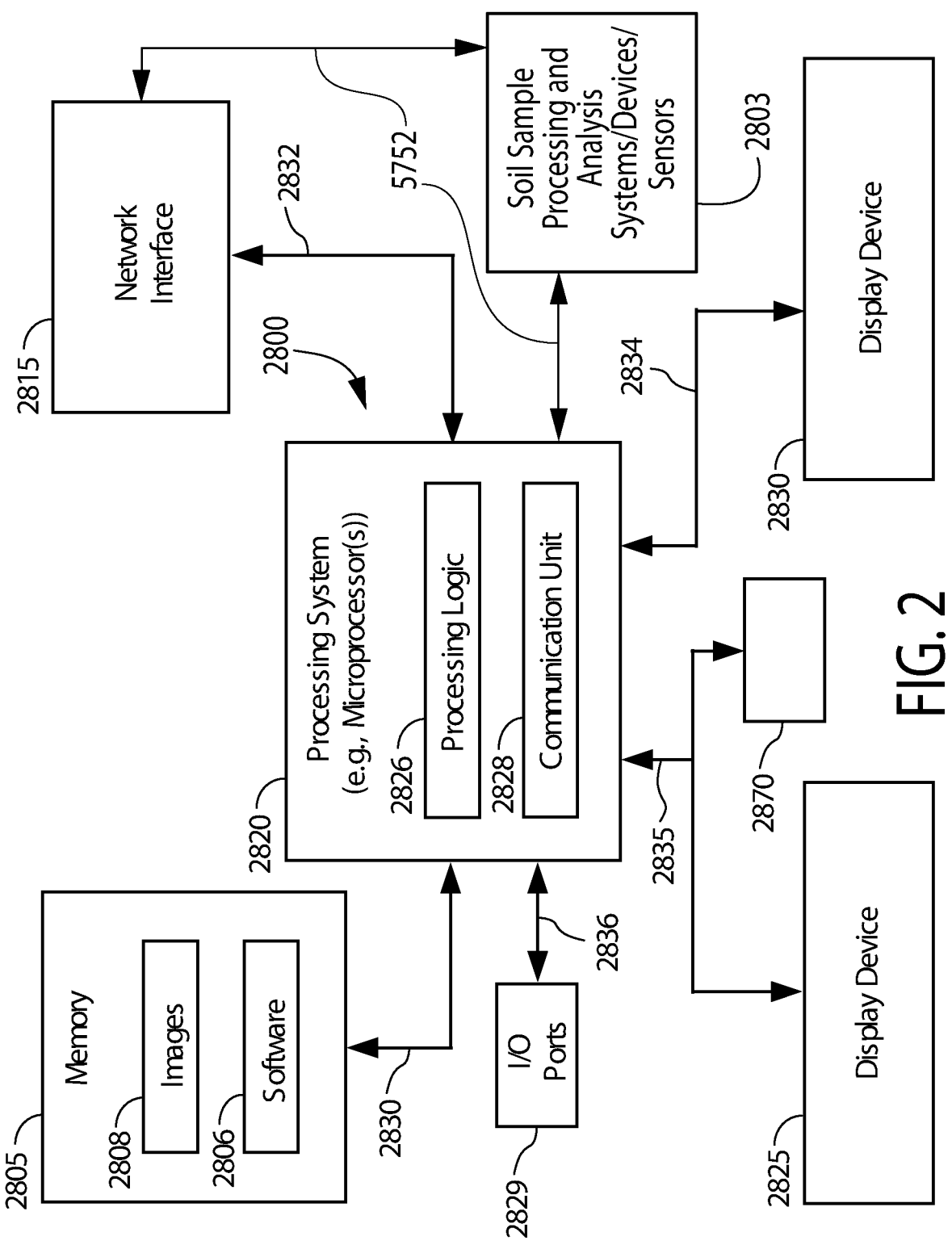
FIG. 2 is a schematic system diagram of a programmable processor-based central processing unit (CPU) or system controller for controlling the systems and apparatuses disclosed herein.

FIG. 2 is a schematic system diagram showing the control or processing system 2800 including programmable processor-based central processing unit (CPU) or system controller 2820 as referenced to herein. System controller 2820 may include one or more processors, non-transitory tangible computer readable medium, programmable input/output peripherals, and all other necessary electronic appurtenances normally associated with a fully functional processor-based controller. Control system 2800, including controller 2820, is operably and communicably linked to the different soil sample processing and analysis systems and devices described elsewhere herein via suitable communication links to control operation of those systems and devices in a fully integrated and sequenced manner.

Referring to FIG. 2, the control system 2800 including programmable controller 2820 may be mounted on a stationary support in any location or conversely on a translatable self-propelled or pulled machine (e.g., vehicle, tractor, combine harvester, etc.) which may include an agricultural implement (e.g., planter, cultivator, plough, sprayer, spreader, irrigation implement, etc.) in accordance with one embodiment. In one example, the machine performs operations of a tractor or vehicle that is coupled to an implement for agricultural operations. In other embodiments, the controller may be part of a stationary station or facility.

Control system 2800, whether onboard or off-board a translatable machine, generally includes the controller 2820, non-transitory tangible computer or machine accessible and readable medium such as memory 2805, and a network interface 2815. Computer or machine accessible and readable medium may include any suitable volatile memory and non-volatile memory or devices operably and communicably coupled to the processor(s). Any suitable combination and types of volatile or non-volatile memory may be used including as examples, without limitation, random access memory (RAM) and various types thereof, read-only memory (ROM) and various types thereof, hard disks, solid-state drives, flash memory, or other memory and devices which may be written to and/or read by the processor operably connected to the medium. Both the volatile memory and the non-volatile memory may be used for storing the program instructions or software. In one embodiment, the computer or machine accessible and readable non-transitory medium (e.g., memory 2805) contains executable computer program instructions which when executed by the system controller 2820 cause the system to perform operations or methods of the present disclosure including measuring properties and testing of soil and vegetative samples. While the machine accessible and readable non-transitory medium (e.g., memory 2805) is shown in an exemplary embodiment to be a single medium, the term should be taken to include a single medium or multiple media (e.g., a centralized or distributed database, and/or associated caches and servers) that store the one or more sets of control logic or instructions. The term "machine accessible and readable non-transitory medium" shall also be taken to include any medium that is capable of storing, encoding or carrying a set of instructions for execution by the machine and that cause the machine to perform any one or more of the methodologies of the present disclosure. The term "machine accessible and readable non-transitory medium" shall accordingly also be taken to include, but not be limited to, solid-state memories, optical and magnetic media, and carrier wave signals.

Network interface 2815 communicates with the agricultural (e.g. soil or other) sample processing and analysis systems (and their associated devices) described elsewhere (collectively designated 2803 in FIG. 2), and other systems or devices which may include without limitation implement 2840 having its own controllers and devices.

The programmable controller 2820 may include one or more microprocessors, processors, a system on a chip (integrated circuit), one or more microcontrollers, or combinations thereof. The processing system includes processing logic 2826 for executing software instructions of one or more programs and a communication module or unit 2828 (e.g., transmitter, transceiver) for transmitting and receiving communications from network interface 2815 and/or agricultural sample processing and analysis system 2803 which includes sample preparation sub-system 3002 and the components described herein further including the closed slurry recirculation flow loop 8002 components. The communication unit 2828 may be integrated with the control system 2800 (e.g. controller 2820) or separate from the programmable processing system.

Programmable processing logic 2826 of the control system 2800 which directs the operation of system controller 2820 including one or more processors may process the communications received from the communication unit 2828 or network interface 2815 including agricultural data (e.g., test data, testing results, GPS data, liquid application data, flow rates, etc.), and soil sample processing and analysis systems 2803 generated data. The memory 2805 of control system 2800 is configured for preprogrammed variable or setpoint/baseline values, storing collected data, and computer instructions or programs for execution (e.g. software 2806) used to control operation of the controller 2820. The memory 2805 can store, for example, software components such as testing software for analysis of soil and vegetation samples for performing operations of the present disclosure, or any other software application or module, images 2808 (e.g., captured images of crops), alerts, maps, etc. The system 2800 can also include an audio input/output subsystem (not shown) which may include a microphone and a speaker for, for example, receiving and sending voice commands or for user authentication or authorization (e.g., biometrics).

The system controller 2820 communicates bi-directionally with memory 2805 via communication link 2830, network interface 2815 via communication link 2832, display device 2830 and optionally a second display device 2825 via communication links 2834, 2835, and I/O ports 2829 via communication links 2836. System controller 2820 may further communicate with the soil sample processing and analysis systems 2803 via wired/wireless communication links 5752 either via the network interface 2815 and/or directly as shown.

Display devices 2825 and 2830 can provide visual user interfaces for a user or operator. The display devices may include display controllers. In one embodiment, the display device 2825 is a portable tablet device or computing device with a touchscreen that displays data (e.g., test results of soil, test results of vegetation, liquid application data, captured images, localized view map layer, high definition field maps of as-applied liquid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 2830 may be a display (e.g., display provided by an original equipment manufacturer (OEM)) that displays images and data for a localized view map layer, as-applied liquid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

Agricultural Sample Slurry Processing System Modifications

Figure 3:
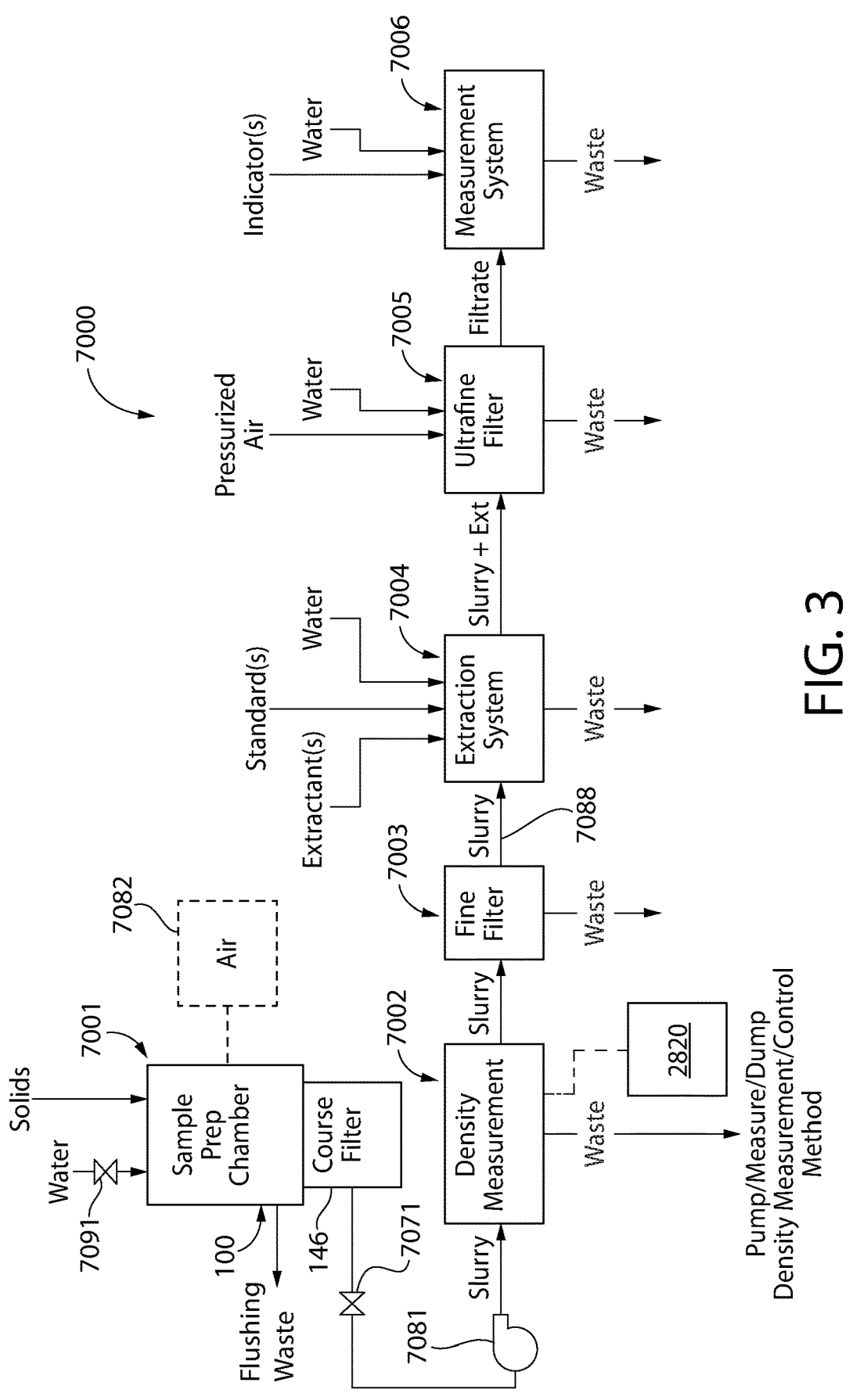
FIG. 3 is a basic schematic diagram of a first embodiment of an agricultural sample analysis system.
Figure 4:
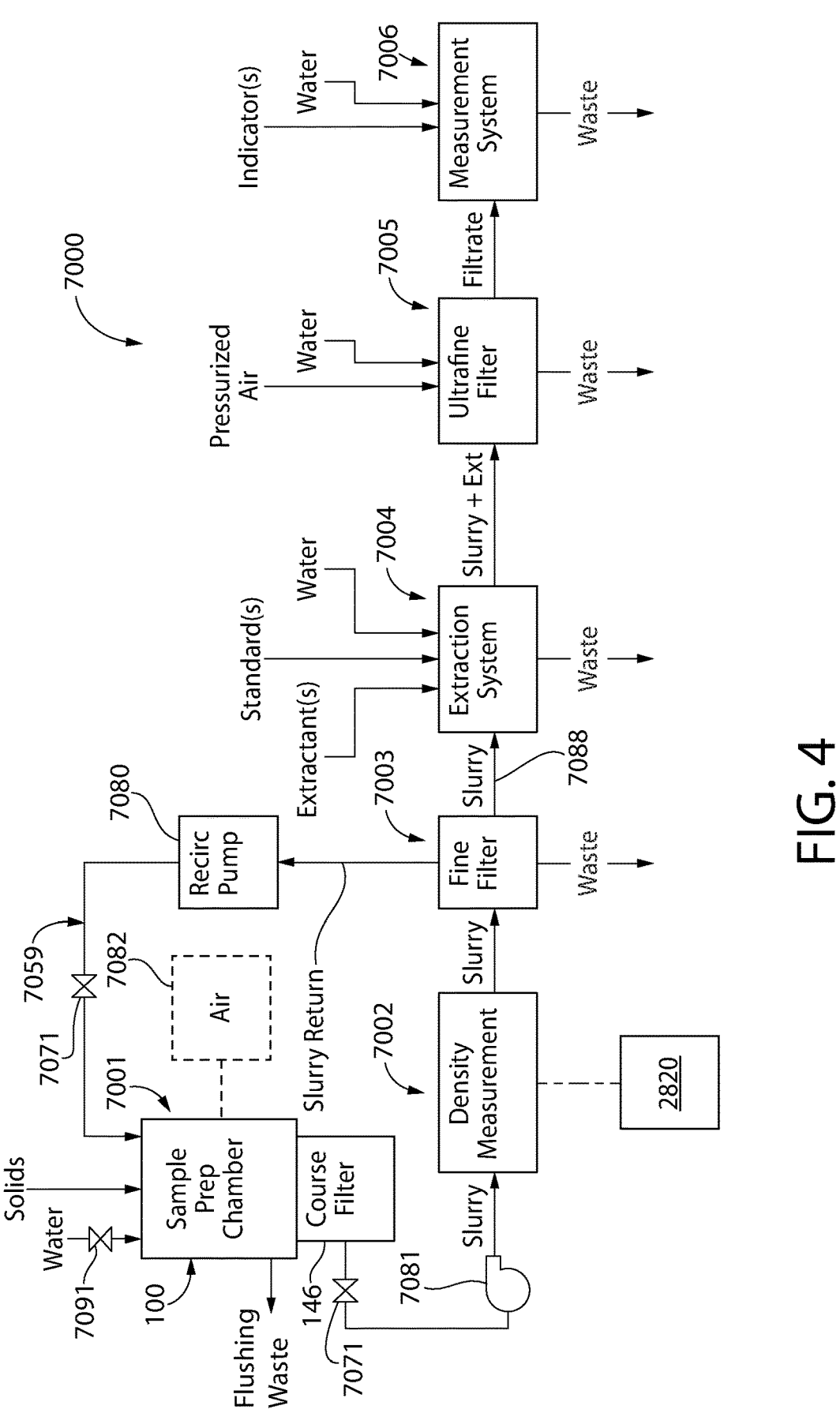
FIG. 4 is a basic schematic diagram of a second embodiment of an agricultural sample analysis system including closed flow loop slurry recirculation.

The sections which follow describe various aspects of the foregoing agricultural sample analysis systems and associated devices previously described herein which process and analyze/measure the prepared agricultural sample slurry for analytes of interest (e.g. soil nutrients such as nitrogen, phosphorous, potassium, etc., vegetation, manure, etc.). Specifically, the modifications relate to sample preparation sub-system 3002 and chemical analysis sub-system 3003 portions of agricultural (e.g. soil or other) sampling system 3000 shown in FIG. 1. To provide broad context for discussion of the alternative devices and equipment which follows, FIG. 3 is a high-level schematic system diagram summarizing the agricultural sample analysis system process flow sequence. This embodiment illustrates static slurry batch mode density measurement as further described herein. FIG. 4 is essentially the same, but adds and includes a slurry recirculation loop between the fine filtration station and sample preparation mixing chamber for dynamic continuous mode slurry density measurement.

Referring now to FIGS. 3 and 4, agricultural sample analysis systems 7000 includes in flow path sequence agricultural sample preparation sub-system 7001, density measurement sub-system 7002, fine filtration sub-system 7003, analyte extraction sub-system 7004, ultrafine filtration sub-system 7005, and analyte measurement sub-system 7006. Soil sample preparation sub-system 7001 represents the portion of the system where sample slurry is initially prepared. Accordingly, sub-system 7001 may comprise the mixing device 8010 described herein which includes the mixing chamber where water is added to the bulk agricultural sample (e.g. soil or other agricultural solids) to prepare the slurry, and a coarse filter (e.g. filter unit 8020) describe herein which removes larger or oversized particles (e.g. small stones, rocks, debris, hardened clumps of agricultural solids, etc.) from the prepared soil slurry. In addition, the coarse filter is sized to pass the desired maximum particle size in the slurry to ensure uniform flow and density of the slurry for weight/density measurement used in the process, as further described herein. The prepared and coarsely filtered slurry may be transferred from the mixing device to the density measurement sub-system 7002 via pumping by slurry pump 7081, or alternatively pneumatically via pressurizing the flow conduit between the mixing device 8010 and filter unit 8020 with pressurized air provided by a fluid coupling to a pressurized air source 7082 (shown in dashed lines in FIG. 3).

The analyte extraction sub-system 7004 and measurement sub-system 7006 may comprise the agricultural sampling system 3000 shown in FIG. 1. The ultrafine filtration sub-system 7005 may comprise the fine filter unit 8080 disclosed herein (see, e.g. FIGS. 34-35) including any of its embodiments further described herein.

It bears noting that the order of the devices and equipment shown in FIGS. 3-4 (e.g. pump(s), valves, etc.) can be switched and relocated in the systems without affecting the function of the unit. Moreover, additional devices and equipment such as valving, pumps, other flow devices, sensors (e.g. pressure, temperature, etc.) may be added control fluid/slurry flow and transmit additional operating information to the system controller which may control operation of the systems shown. Accordingly, the systems are not limited to the configuration and devices/equipment shown alone.

Digital Slurry Density Measurement Devices

Figure 34:
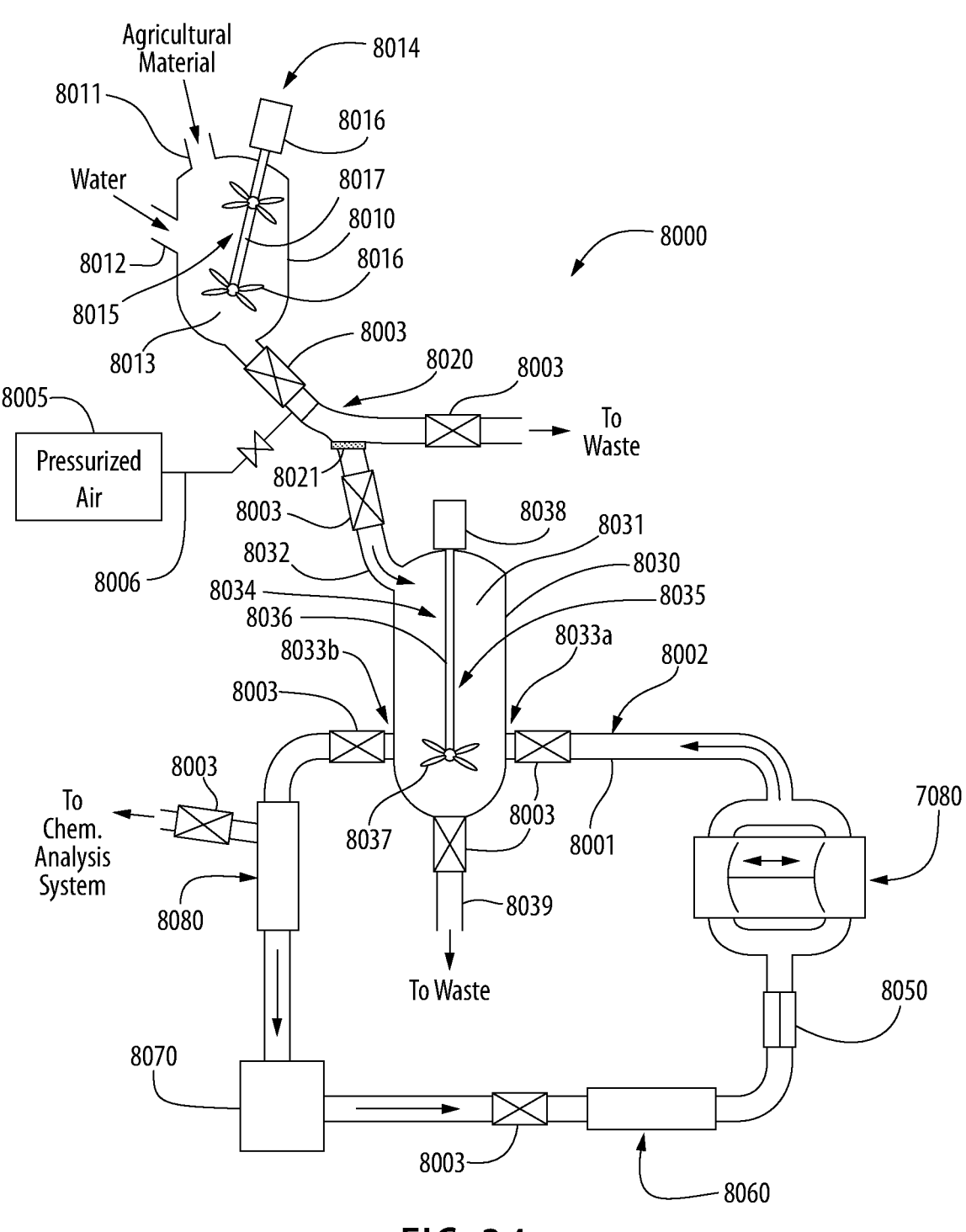
FIG. 34 is a schematic equipment and flow diagram of an alternative embodiment of an agricultural slurry preparation system according to the agricultural sampling analysis system.

Density measurement sub-system 7002 comprises a digital slurry density measurement device 7010 for obtaining the density of the mixed agricultural sample slurry prepared in sample preparation chamber of FIGS. 3-4 (e.g. mixing chamber 8013 of mixing device 8010 in FIG. 34). In one implementation, density measurement device 7010 may be a digital density meter of the U-tube oscillator type of any of the embodiments shown in FIGS. 5-19 and used to measure density of the sample slurry, which may be a soil slurry in one non-limiting example which will be used hereafter for convenience. It should be recognized that any type of agricultural sample slurry however may be processed in the same system including soil, vegetation, manure, or other. The density of the slurry is used to determine the amount of diluent required (e.g. water) to be added to the soil sample in order to achieve the desired water to soil ratio for chemical analysis of an analyte, as further described herein. The U-shaped oscillator tube 7011 is excited via a frequency transmitter or driver 7012 to oscillate the tube at its characteristic natural frequency. In various embodiments, the driver 7012 may be an electromagnetic inductor, a piezoelectric actuator/element, or a mechanical pulse generator all of which are operable to generate a user-controllable and preprogrammed excitation frequency. A corresponding sensor such as a receiver or pickup 7013 is provided which is configured to detect and obtain a vibrational measurement of the oscillator tube when excited. The pickup may be electromagnetic, inductance, piezoelectric receiver/element, optical, or other commercially available sensor capable of detecting and measuring the vibrational frequency response of the oscillator tube 7011 when excited. The pulsing or vibrational response movement of the excited oscillator tube 7011 is detected pickup 7013 which measures the amplitude of the frequency response of the tube, which is highest at a natural/resonance or secondary harmonic frequency when the tube is empty. Alternatively, the phase difference between the driving and driven frequencies may be used to narrow into the natural frequency.

In operation, the vibrational frequency of oscillator tube 7011 when excited changes relative to the density of the slurry either stagnantly filled in the oscillator tube for batch mode density measurement in one embodiment, or flowing through the U-tube at a preferably continuous and constant flow rate for continuous density measurement in another embodiment. The digital density measurement device converts the measured oscillation frequency into a density measurement via a digital controller which is programmed to compare the baseline natural frequency of the empty tube to the slurry filled tube.

The frequency driver and pickup 7012, 7013 are operably and communicably coupled to an electronic control circuit comprising a microprocessor-based density meter processor or controller 7016-2 mounted to a circuit control board 7016 supported from base 7014. Controller 7016-2 is configured to deliver a pulsed excitation frequency to the oscillator tube 7011 via the driver 7012, and measure the resultant change in the resonant frequency and phase of the excited oscillator tube. The digital density measurement device 7010 converts the measured oscillation frequency into a density measurement via the controller which is preprogrammed and configured with operating software or instructions to perform the measurement and density determination. The controller 7016-2 may be provided and configured with all of the usual ancillary devices and appurtenances similar to any of the controllers already previously described herein and necessary to provide a fully functional programmable electronic controller. Accordingly, these details of the density meter controller 7016-2 will not be described in further detail for the sake of brevity.

FIGS. 5-14 show a density measurement device 7010 having an oscillator tube according to a first embodiment. Density measurement device 7010 further includes a base 7014, a plurality of spacers 7015, a tube mounting block 7017, a flow connection manifold 7018, at least one or a pair of permanent magnets 7025, an electronic circuit control board 7016 and an electrical-communication interface unit 7016-1 configured for both electrical power supply for the board and communication interface to system controller 2820. Base 7014 is configured for mounting the density measurement device on a flat horizontal support surface, vertical support surface, or support surface disposed at any angle therebetween. Accordingly, any suitable corresponding mounting orientation of the base may be used as desired. The mounting orientation of the base may be determined by the intended direction of oscillation of the oscillator tube 7011 taking into account the force of gravity on the slurry laden oscillator tube. It is generally advantageous to mount all slurry passages in the oscillator tube in a manner that achieves the highest percent of horizontal passages as possible, so that any settling of particulate occurs perpendicular to the flow passage rather than inline with it. Base 7019 may substantially planar and rectangular in shape in one embodiment as shown; however, other polygonal and non-polygonal shaped bases may be used. The base may optionally include a plurality of mounting holes 7019 to facilitate mounting the base to the support surface with a variety of fasteners (not shown). Base 7019 defines a longitudinal centerline CA of the density measurement device 7010 which is aligned with the length of the oscillator tube 7011 (parallel to the tube's parallel legs as shown). In other words, the length of the oscillator tube extends along the centerline CA. In one embodiment, centerline CA and the flow passages within oscillator tube 7011 may be horizontal as shown so that any settling that occurs is perpendicular to the flow through the passage rather than in-line with the flow. In other embodiments, at least a majority of the flow passages inside the oscillator tube may be horizontal in orientation.

Spacers 7015 may be elongated in structure and space the control board 7016 apart from the base 7014 so that the oscillator tube 7011 may occupy the space 7015-1 created therebetween. Any suitable number of spacers may be used for this purpose. The space is preferably large enough to provide clearance for accommodating the motion of the oscillator tube 7011 and other appurtenances such as the frequency driver and pickup 7012, 7013. The planar control board 7016 may preferably be oriented parallel to the base 7014 as shown.

The frequency driver 7012 and pickup 7013 may be rigidly mounted to circuit board 7016 in one embodiment as variously shown in FIGS. 5-14. In other possible embodiments as shown in FIGS. 15-18, the driver and pickup may be rigidly mounted to separate vertical supports 7031 attached to base 7014. In each case, the driver and pickup are mounting adjacent and proximate to permanent magnets 7025, but do not contact the permanent magnets. Permanent magnets 7025 generate a static magnetic field (lines of magnetic flux) which interacts with the driver 7012 and pickup 7013 for exciting the oscillator tube 7011 and measuring its vibrational frequency when excited.

Tube mounting block 7017 is configured for rigidly mounting oscillator tube 7011 thereto in a cantilevered manner. Oscillator tube 7011 may be a straight U-tube configuration in one embodiment as shown in which all portions lie in the same horizontal plane. The straight inlet end portion 7011-1 and straight outlet end portion 7011-2 of oscillator tube 7011 are mounted to and rigidly supported by the block 7017 (see, e.g. FIG. 14) to allow the tube to oscillate analogously to a tuning fork when electronically/electromagnetically excited. The mounting block 7017 includes a pair of through bores 7017-1 which receive the end portions 7011-1, 7011-2 of the oscillator tube complete therethrough. Bores 7017-1 may be parallel in one embodiment. The U-bend portion 7011-3 of the oscillator tube opposite the inlet and outlet end portions and adjoining tube portions between the U-bend and mounting block 7017 are unsupported and able to freely oscillate in response to the excitation frequency delivered by the driver 7012.

Figure 14:
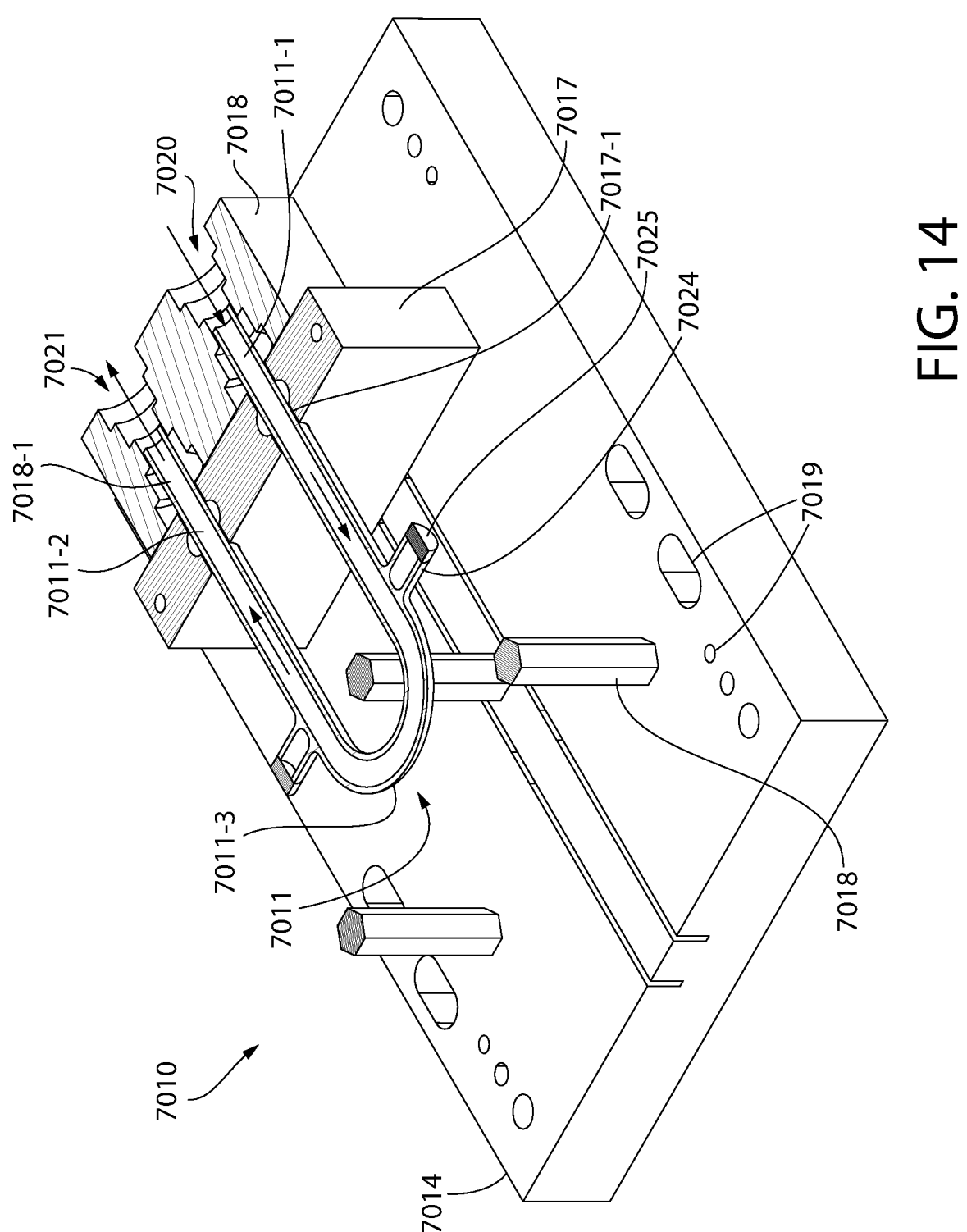
FIG. 14 is a longitudinal perspective cross sectional view thereof.
Figure 15:
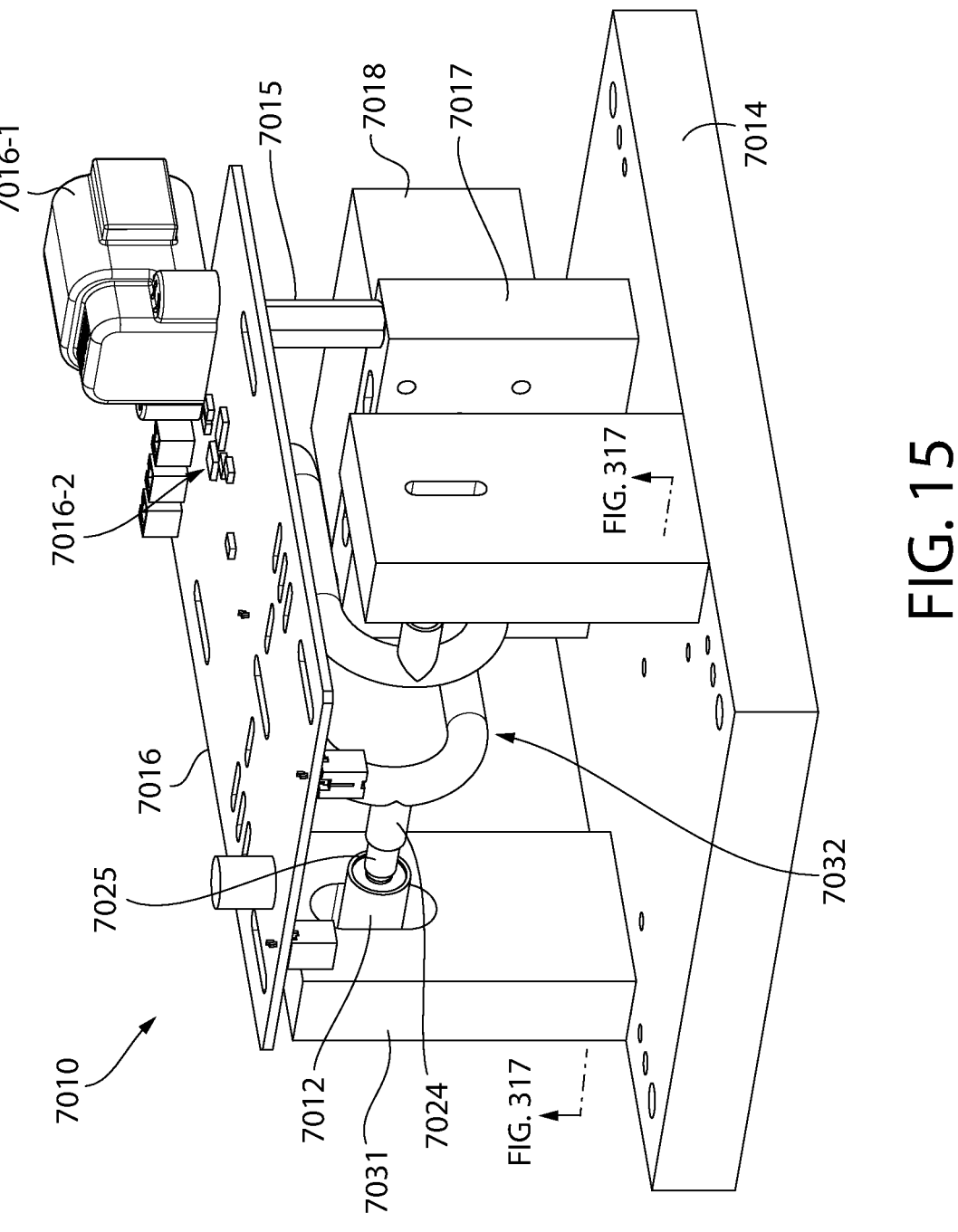
FIG. 15 is a first perspective view of a second embodiment of a slurry density meter usable in the systems of FIG. 44A or 44B.
Figure 16:
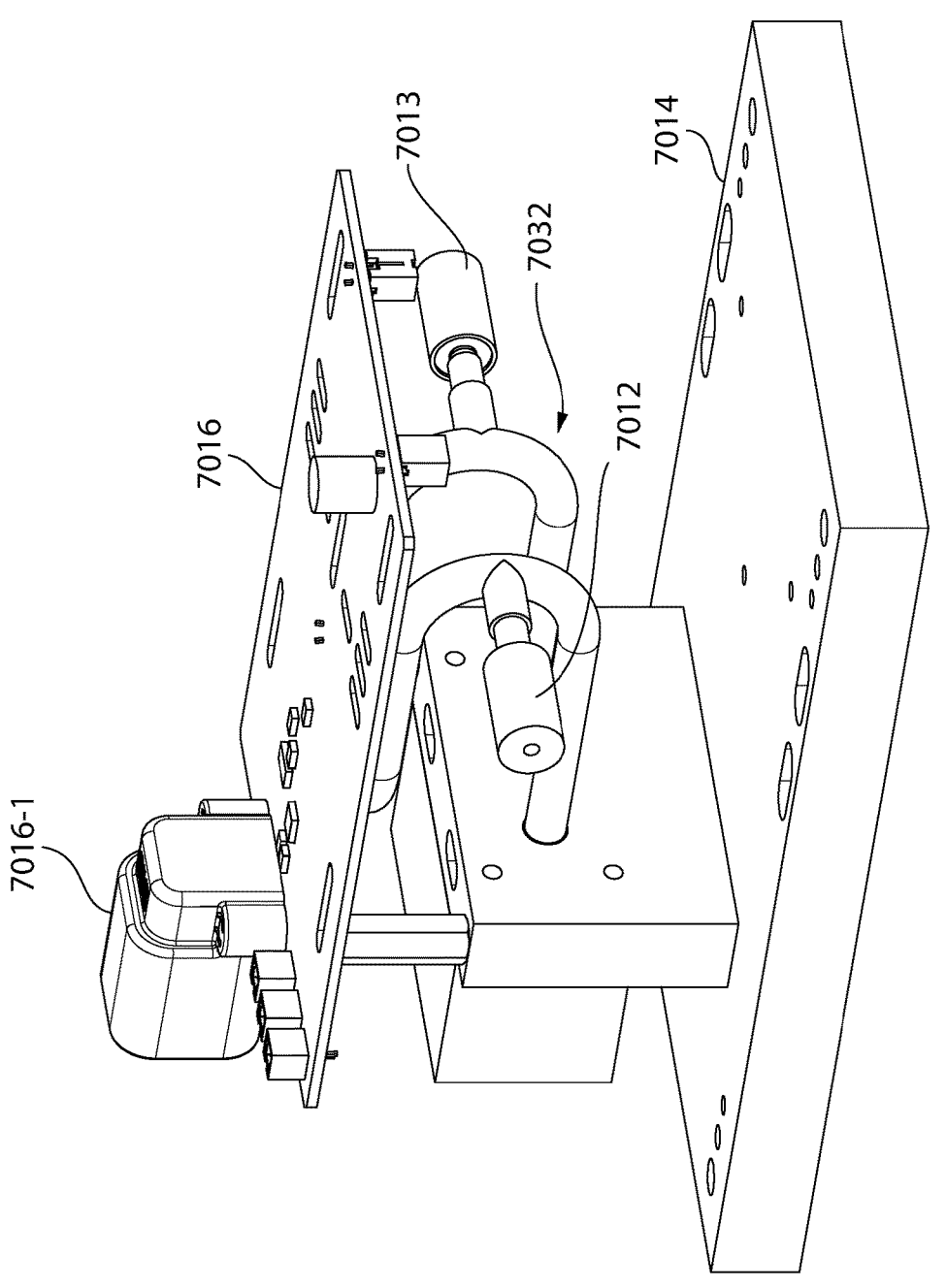
FIG. 16 is a second perspective view thereof.

The inlet end portion 7011-1 and outlet end portion 7011-2 of oscillator tube 7011 project through and beyond the tube mounting block 7017 and are each received in a corresponding open through bore or hole 7018-1 of the flow connection manifold 7018 associated with defining a slurry inlet 7020 and slurry outlet 7021 of the connection manifold 7018 (see slurry directional flow arrows in FIG. 14). Through holes 7018-1 may have any suitable configuration to hold the end portions 7011-1, 7011-2 of oscillator tube 7011 in tight and a fluidly sealed manner. Suitable fluid seals such as O-rings, elastomeric sealants, or similar may be used to achieve a leak-tight coupling between the oscillator tube and connection manifold 7018. The connection manifold 7018 abuttingly engages the mounting block 7017 to provide contiguous coupling openings therethrough for the inlet end portion 7011-1 and outlet end portion 7011-2 to fully support the end portions of oscillator tube 7011 (see, e.g., FIG. 14). In other possible embodiment contemplated, the connection manifold 7018 may be spaced apart from but preferably in relative close proximity to mounting block 7017.

The mounting block 7017, flow connection manifold 7018, and base 7014 may preferably made of a suitable metal (e.g. aluminum, steel, etc.) of sufficient weight and thickness to act as vibration dampeners such that excitation of oscillator tube which is measured by the density measurement device 7010 is indicative of only the frequency response of the filled oscillator tube 7011 without interference by any corresponding parasitic resonances that otherwise could be induced in the base or the mounting block and flow connection manifold.

In the first oscillator tube embodiment shown in FIGS. 5-14, the oscillator tube 7011 may have a conventional U-shape as shown and previously described herein. The tube may be oriented parallel to the planar top surface of the base 7014. Oscillator tube 7001 may be formed of a non-metallic material in one non-limiting embodiment. Suitable materials include glass such as borosilicate glass. In other possible embodiments, however, metallic tubes may be used. The permanent magnets 7025 are fixedly and rigidly supported from and mounted to the oscillator tube 7011, such as on opposite lateral sides of the U-tube proximate to the U-bend portion 7011-3 as shown. The U-bend portion is farthest from the cantilevered portion of the oscillator tube adjoining the mounting block 7017 and thus experiences the greatest displacement/deflection when excited by driver 7012 making the tube vibration frequency change readily detectible by the digital meter controller 7016-2. This creates the greatest sensitivity for frequency deviation measurement of the slurry-filled oscillator tube 7011 versus the natural frequency of the tube when empty; the deviation or different in frequency being used by controller 7016-2 to measure the slurry density.

Figure 19A:
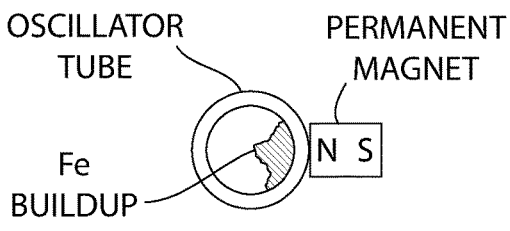
FIG. 19A shows a portion of the oscillator tube of the density meter illustrating accumulation of iron particles in the slurry on the inside of the tube caused by the magnetic field of a permanent magnet attached to the tube.

Although laboratory digital density meters having oscillator tubes are commercially available, they are not entirely compatible off the shelf for measuring soil slurries or other agricultural materials that can have a presence of varying amounts of iron (Fe) in the soil unlike other fluids. The iron in the soil slurry creates a problem which interferes with accurate soil slurry density measurement since iron particles in the slurry are attracted to the permanent magnets used in the density measurement device 7010. This causes the iron particles to aggregate on portions of the tube closest to the permanent magnets, thereby skewing the density measurement results by adversely affecting the resonant frequency of the oscillator tube when loaded with the soil slurry and excited by driver 7012. FIG. 19A shows this undesirable situation with agglomerated Fe particle in the oscillator tube.

Figure 19B:
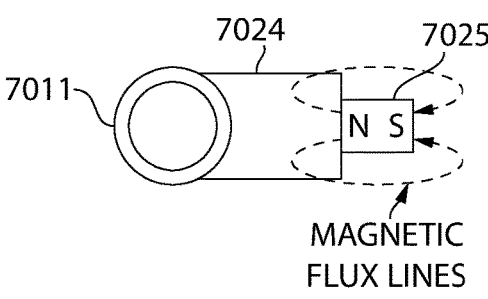
FIG. 19B shows a first embodiment of a magnetic isolation member attached to the oscillator tube.
Figure 19C:
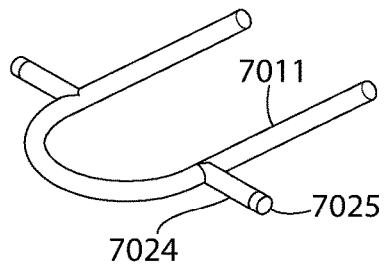
FIG. 19C shows a second embodiment of a magnetic isolation member attached to the oscillator tube.

To combat the foregoing problem when handling iron particle-containing slurries, embodiments of a density measurement device 7010 according to the present disclosure may be modified to include a variety of magnetic isolation features or members configured to magnetically isolate the permanent magnets from the oscillator tube 7011 and iron-containing slurry therein. In the embodiment of FIGS. 5-14, the permanent magnets 7025 may each be mounted to the oscillator tube 7011 by a magnetic isolation member comprising a non-magnetic standoff 7024 (also schematically shown in FIGS. 19B and 19C). The standoffs project transversely outwards from the lateral sides of oscillator tube in opposite directions and perpendicular to longitudinal centerline CA of the density measurement device 7010. Standoffs 7024 are configured with suitable dimensions or lengths to space the permanent magnets far enough away from the oscillator tube 7011 to prevent creating a static magnetic field of sufficient strength within the tube to attract and aggregate the iron particles in the soil slurry for the reasons discussed above. The magnetic field can be such that its strength is weakened to the point that allows particles to move under the force of the flow without deposition on the inside of the oscillator tube. As illustrated in FIG. 19B, the magnet flux lines (dashed) which circulate and flow from the north (N) pole of permanent magnet 7025 to the south (S) pole do not reach the oscillator tube 7011. The magnet standoffs 7024 avoid the iron agglomeration problem shown in FIG. 19A caused by direct mounting of the permanent magnets 7025 to the oscillator tube 7011.

In one embodiment where the oscillator tube 7011 is formed of a non-metallic and non-magnetic material (e.g., glass or plastic), the standoffs 7024 may be integrally formed as a monolithic unitary structural part of the tube. In other embodiments, the standoffs to which the permanent magnets are mounted may be separate discrete elements which are fixedly coupled to the oscillator tube 7011 such as via adhesives, clips, or other suitable coupling mechanical methods. Where a metallic oscillator tube is provided, the standoffs 7024 are formed of a non-metallic material (e.g., plastic or glass) attached or adhered to the oscillator tube by a suitable means (e.g., adhesives, clips, brackets, etc.).

Figure 19D:
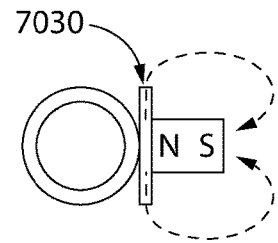
FIG. 19D shows a third embodiment of a magnetic isolation member attached to the oscillator tube.
Figure 19E:
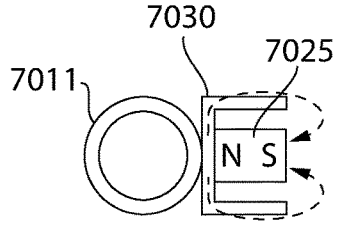
FIG. 19E shows a fourth embodiment of a magnetic isolation member attached to the oscillator tube.

Other possible arrangements for mounting the permanent magnets 7025 to oscillator tube 7011 and magnetic isolation members may be used which shield or guide the creating magnetic lines of flux generated by the magnets away from the tube. For example, FIG. 19D shows a permanent magnet assembly comprising a magnetic isolation member comprising metallic magnetic shield member 7030 interspersed between the permanent magnet and oscillator tube to direct the magazine flux lines (dashed) away from the oscillator tube. In the embodiment shown, the shield member 7030 is configured as a flat plate of metal. FIG. 19E shows a U-shaped or cup shaped shield member 7030 which performs similarly to FIG. 19D. Any suitable shape of metallic magnetic shield member may be used so long as the magazine flux lines are redirected to not reach and penetrate the oscillator tube 7011.

Figure 19F:
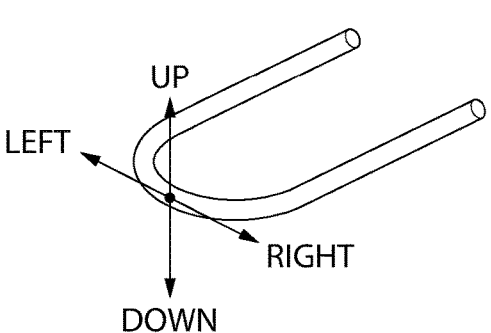
FIG. 19F shows possible directional vibrational motions for the oscillator tube.
Figure 19G:
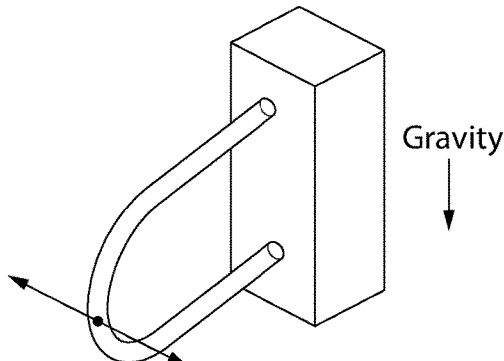
FIG. 19G shows an oscillator tube mounted in a vertically orientation.
Figure 20:
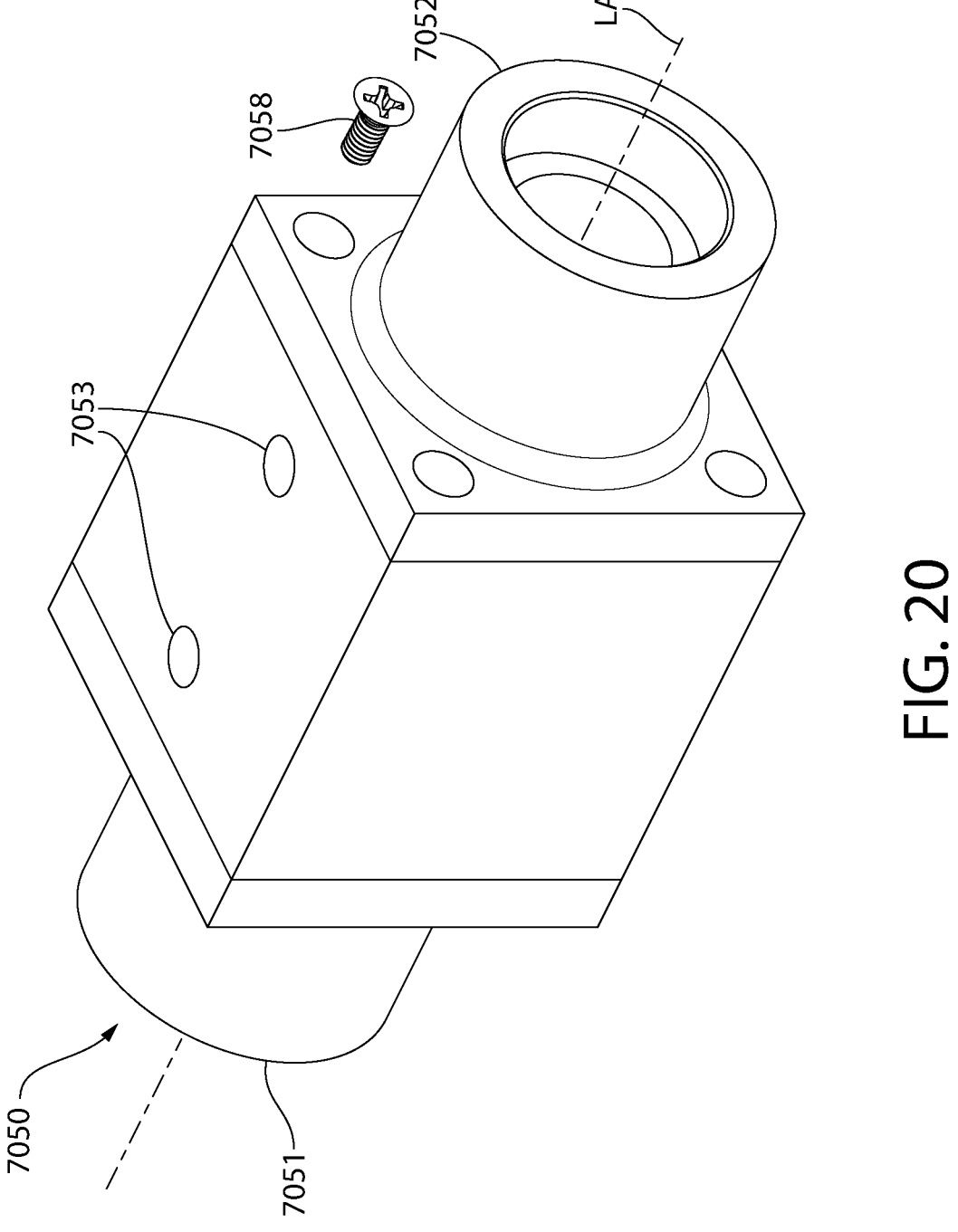
FIG. 20 is a first perspective view of a first embodiment of a fine filter unit.
Figure 21:
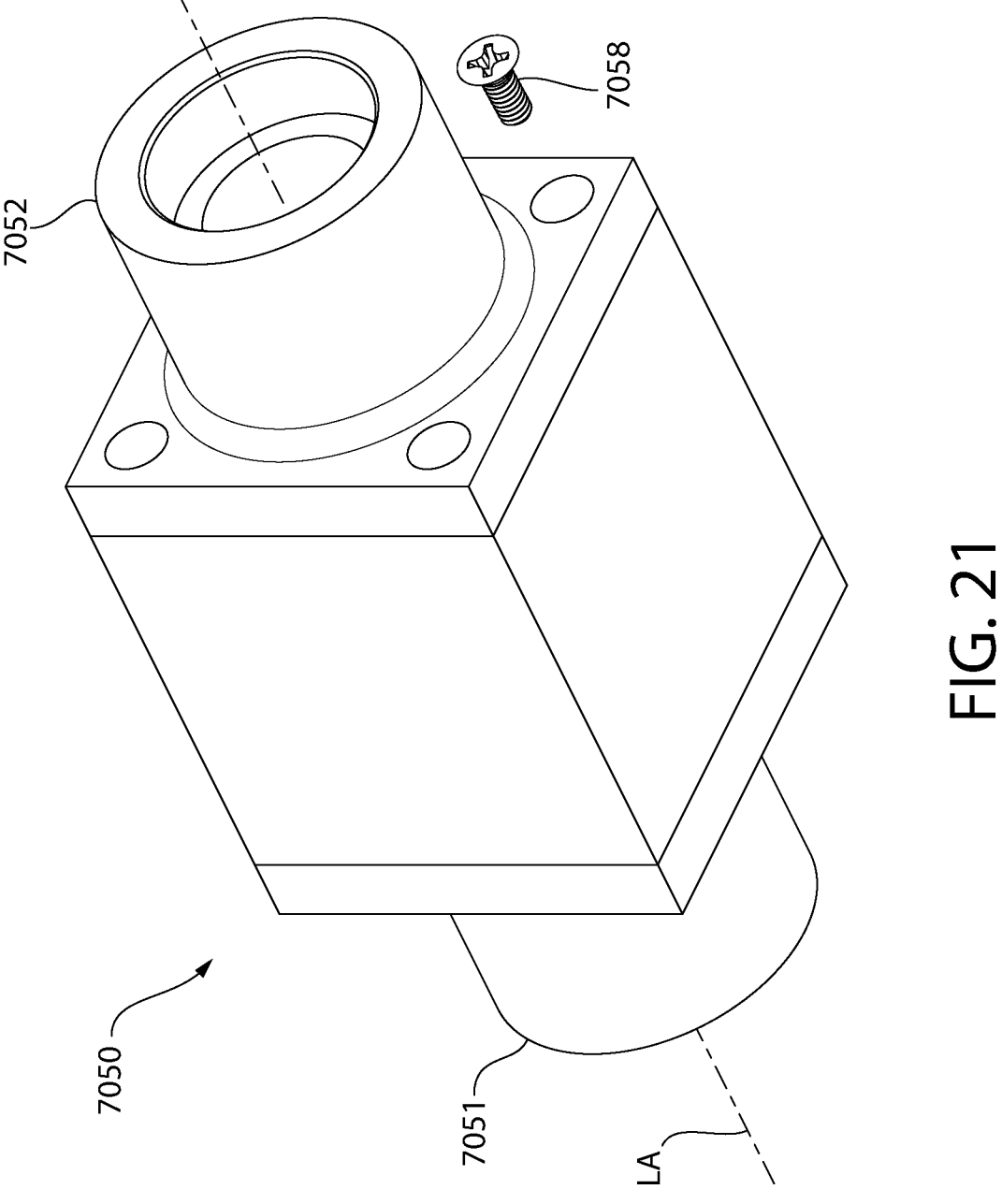
FIG. 21 is a second perspective view thereof.

FIG. 19F illustrates that the direction of the oscillator tube 7011 excitement via placement of the frequency driver and pickup 7012, 7013 could be in the stiffest direction (e.g. left/right represented by the tube oscillation movement arrows) or in the least stiff and most flexible direction (e.g. up/down) for a horizontally oriented tube. This will affect the natural frequency of the oscillator tube significantly, which forms the baseline against which the excited tube full of slurry is compared to determine the slurry density (weight). The stiffer side-to-side excitement/movement direction of the tube will have a higher natural frequency, while the more flexible up and down direction will have a lower natural frequency. Either orientation, or different angular orientations of the oscillator tube may be used. It may further be advantageous in some embodiments to have the tube significantly stiffer in the direction of gravity (i.e. vertically) than in the loading/excitement direction (i.e. horizontal represented by the tube oscillation movement arrows) as shown in FIG. 318B to help reduce system noise which could interfere with density measurement accuracy.

The density measurement device 7010 operates to obtain density measurements from the soil slurry in a conventional manner known in the art for such U-tube type density meters. The slurry density measurements are communicated to control system 2800 (programmable controller 2820) operably coupled to the density measurement device 7010 (see, e.g., density measurement sub-system 7002 in FIG. 3, 4, or 35). The measurements are utilized by the controller to automatically determine how much water (diluent) needs to be added to the slurry to reach a preprogrammed target water to soil or other agricultural sample material ratio depending on the type of material to be sampled and analyzed.

An exemplary method/process for preparing an agricultural sample slurry using slurry density measurement with density measurement device 7010 (density meter) and a preprogrammed closed loop control scheme implemented by controller 2820 of the control system 2800 via suitable programming instructions/control logic will now be described. This example will use soil as the sample for convenience of description but is not limited thereto and may be used for other agricultural sample materials (e.g., plants, manure, etc.). Given an arbitrary amount of soil in the collected sample with an associated arbitrary soil moisture content based on ambient conditions in the agricultural field and soil type, the soil slurry will be diluted to reach a consistent density reading thereby ensuring repeatable analytical results.

Figure 31:
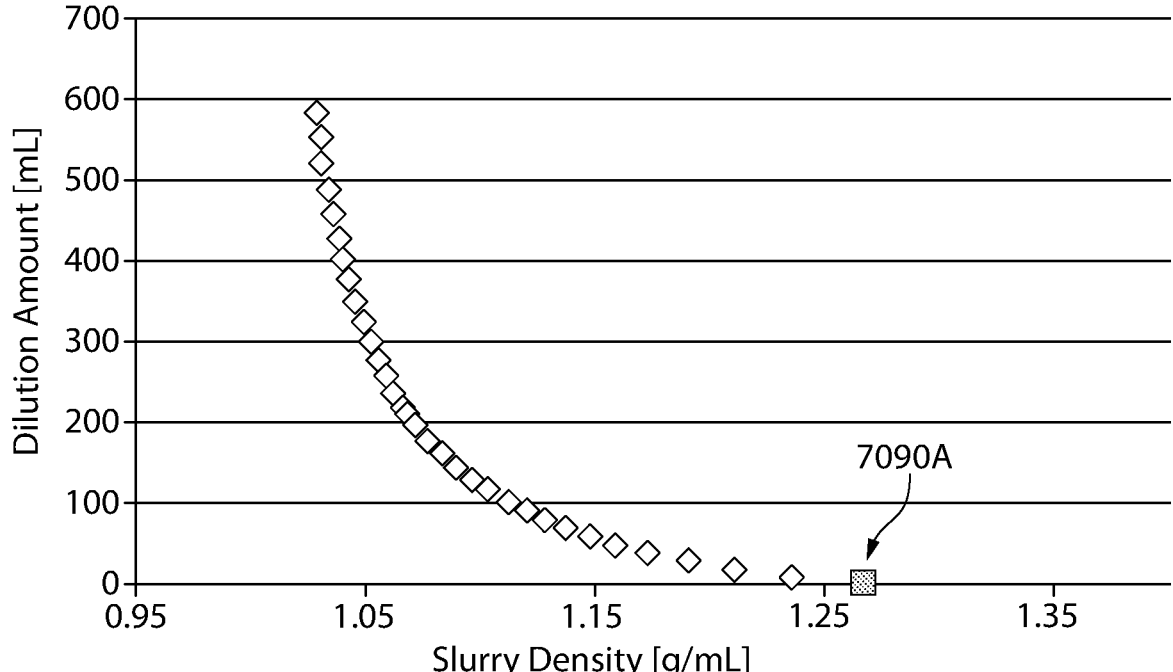
FIG. 31 is a first graph showing dilution amount of diluent (e.g. water) added to the slurry versus slurry density.
Figure 32:
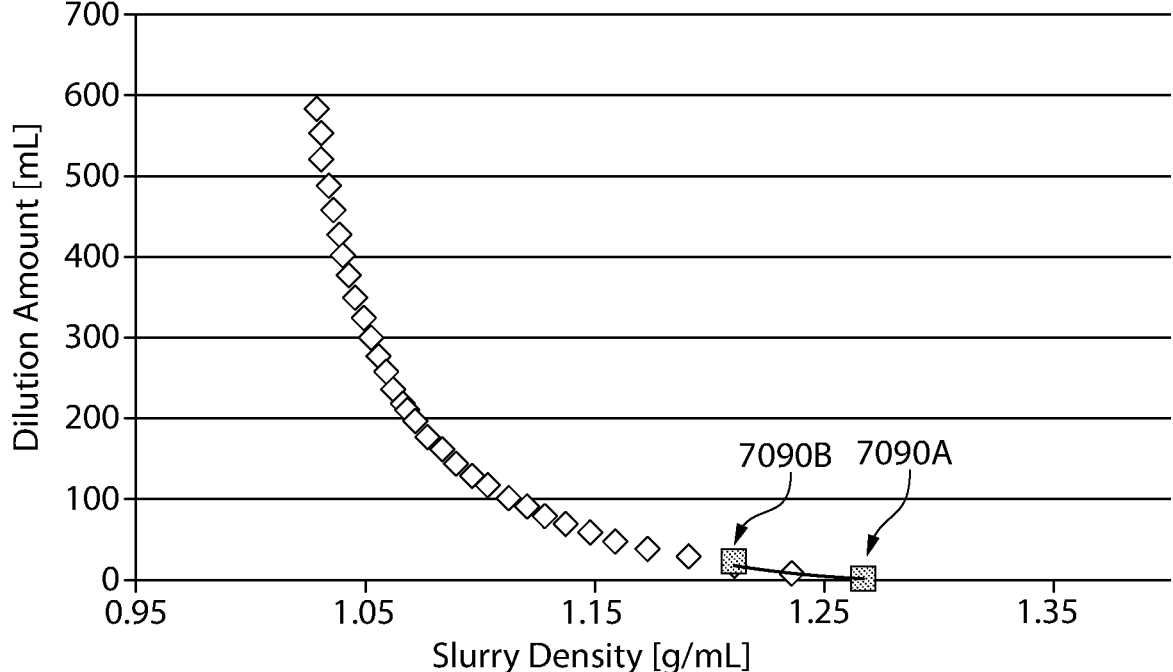
FIG. 32 is a second graph thereof.
Figure 33:
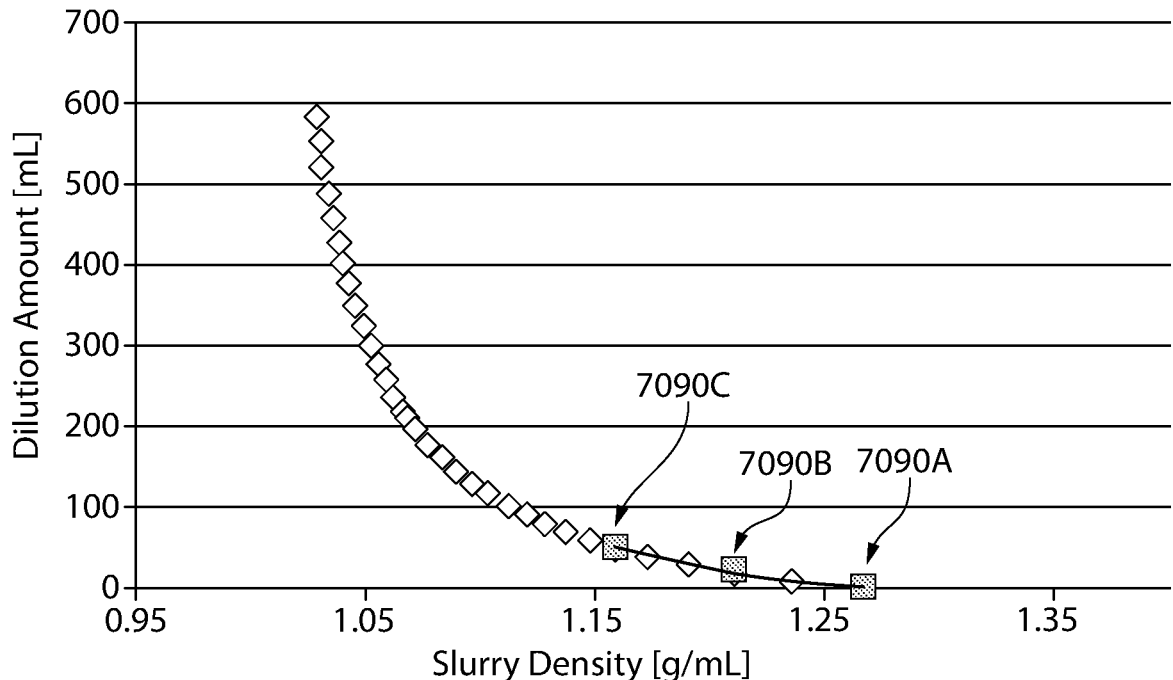
FIG. 33 is a third graph thereof.

FIGS. 31-33 are curves showing dilution amount of diluent (e.g., water) added to the slurry versus slurry density which is used by controller 2820 to determine the amount of diluent required to reach the preprogrammed target water to soil ratio. The target water to soil ratio can be preprogrammed into the controller in the form of a target slurry density which can be directly equated to the ratio because the density of the diluent used is a known fixed factor. With the known density of the diluent being used (e.g., water having a density of 0.998 g/mL) also preprogrammed into the controller, as more and more diluent is added to the slurry in the system, the slurry mixture will ultimately approach the density of the diluent but can never be reversed and become less dense than this value. The relationship and curve shown in FIG. 330 is thus generated by the controller 2820 and used to reach the target slurry density (water to soil ratio). The dilution amount (Y-axis) is the total volume added to achieve the dilution. With different amounts of soil, soil moisture, and water (diluent) added to create the initial slurry mix, the slope of this curve may change but will keep the same general shape.

With additional reference to FIGS. 3-4, the collected raw soil sample and a known amount of water are initially mixed in mixing device 100 a first time as indicated to prepare the slurry. Once the soil slurry has been mixed and homogenized in the mixer, a first density measurement is be sensed by the density meter and transmitted to controller 2820. Point 7090A on the curve in FIG. 31 indicates the first density measurement taken.

To determine the dilution amount versus slurry density relationship more precisely in real-time, a known amount of water is metered and added by controller 2820 via operably coupled water control valve 7091 to mixing device 100 in the next step (e.g., 20 mL) and the resultant slurry density is measured a second time. Point 7090B on the curve in FIG. 32 indicates the second measurement taken. A linear relationship can then be generated by the controller between the two slurry density points 7090A and 7090B taken (represented by solid line on the curve between these two points). For a given preprogrammed target slurry density (soil to water ratio), the target density can then be input to this relationship and the output calculated by controller 2820 is a first estimation of the total amount of diluent (e.g., water) needed to achieve the target density.

The controller 2820 next meters and adds the estimated amount of additional diluent (e.g., water) necessary to reach the target slurry density to the slurry mixture which is mixed with the slurry by mixing device 100. The resultant slurry density is measured a third time. Point 7090C on the curve in FIG. 33 indicates the third measurement taken, which continues to add data points to the linear relationship (see longer solid line on curve). Once at least three slurry density measurements and corresponding points on the slurry density curve have been acquired by the controller, a polynomial regression can be performed on the data by the controller providing a more precise curve fit. Based on and using the preprogrammed target density, the controller 2820 then calculates the required total amount of diluent necessary based on the updated curves and adds this amount to the slurry to achieve the target slurry density. This process can be iterated to improve the accuracy of the regression model or until the actual density is sufficiently close to the target density.

FIGS. 14-18 depict an alternative second embodiment of a cantilevered U-shaped oscillator tube 7032 for use with density measurement device 7010 which contrasts to the straight U-shaped oscillator tube 7011 previously described herein. In this present embodiment, oscillator tube 7032 has a recurvant U-tube shape in which the 180 degree primary U-bend portion 7032-3 extends backwards over top of the straight inlet end portion 7032-1 and outlet end portion 7032-2 of the oscillator tube affixed to tube mounting block 7017 and flow connection manifold 7018. This is created by the addition of two additional 180 degree secondary U-bend portions 7032-4 between the straight end portions 7032-1, 7032-2 and the primary U-bend portion 7032-3. One secondary U-bend portion 7032-4 is disposed in the slurry inlet leg of the oscillator tube upstream of primary U-bend 7032-3, and the other in the slurry outlet leg of oscillator tube downstream of the primary U-bend portion as shown. In this recurvant oscillator tube embodiment, the standoffs 7024 are disposed on the secondary U-bend portions and protrude laterally outwards in opposite lateral directions to hold the permanent magnets 7025 in spaced part relation to the oscillator tube. The frequency driver and pickup 7012, 7013 are supported from base 7014 by separate vertical supports 7031 in proximity to the permanent magnets to excite the oscillator tube 7032 as previously described herein.

Figure 17:
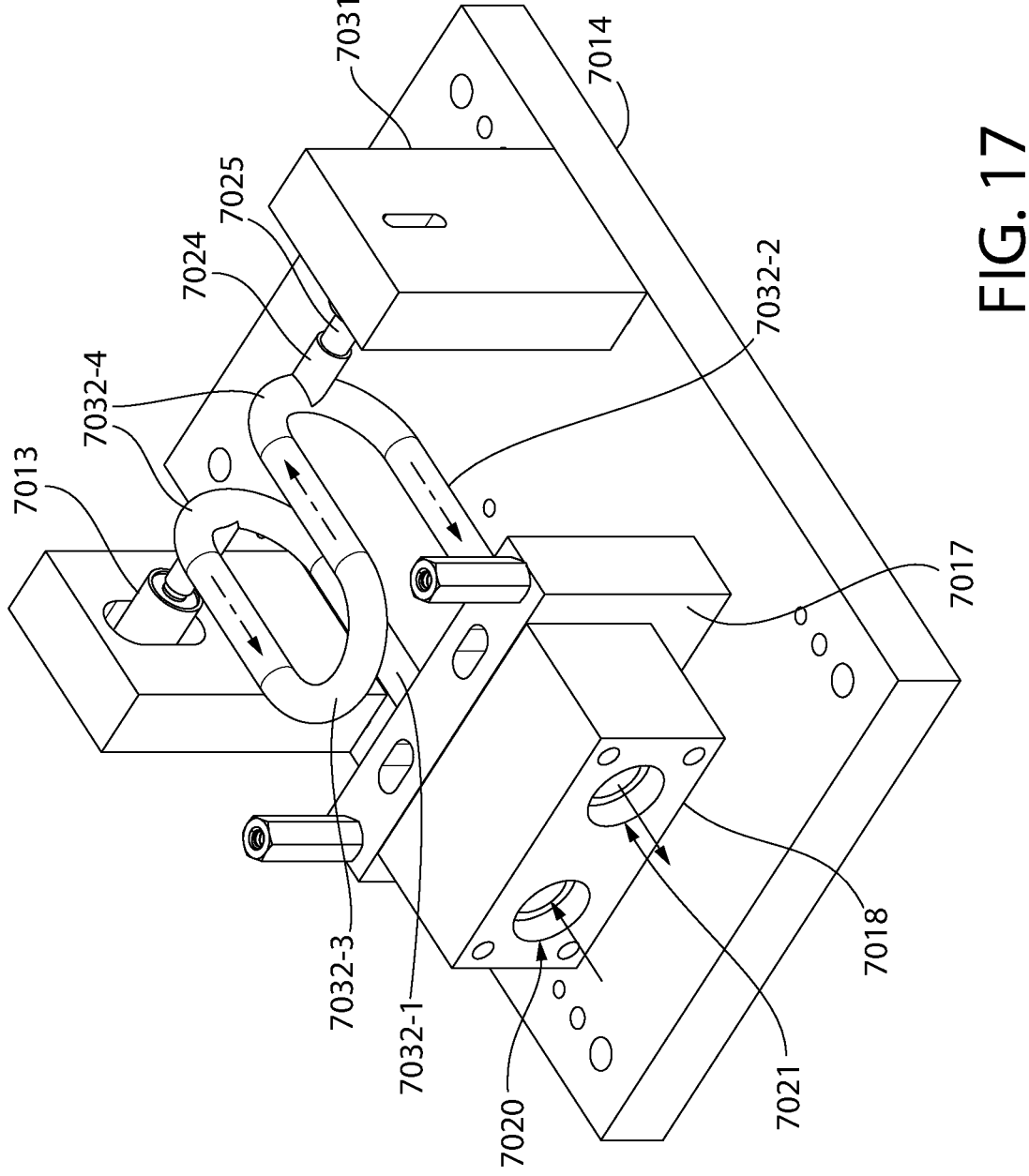
FIG. 17 is a third perspective view thereof with control system circumference board detached.
Figure 18:
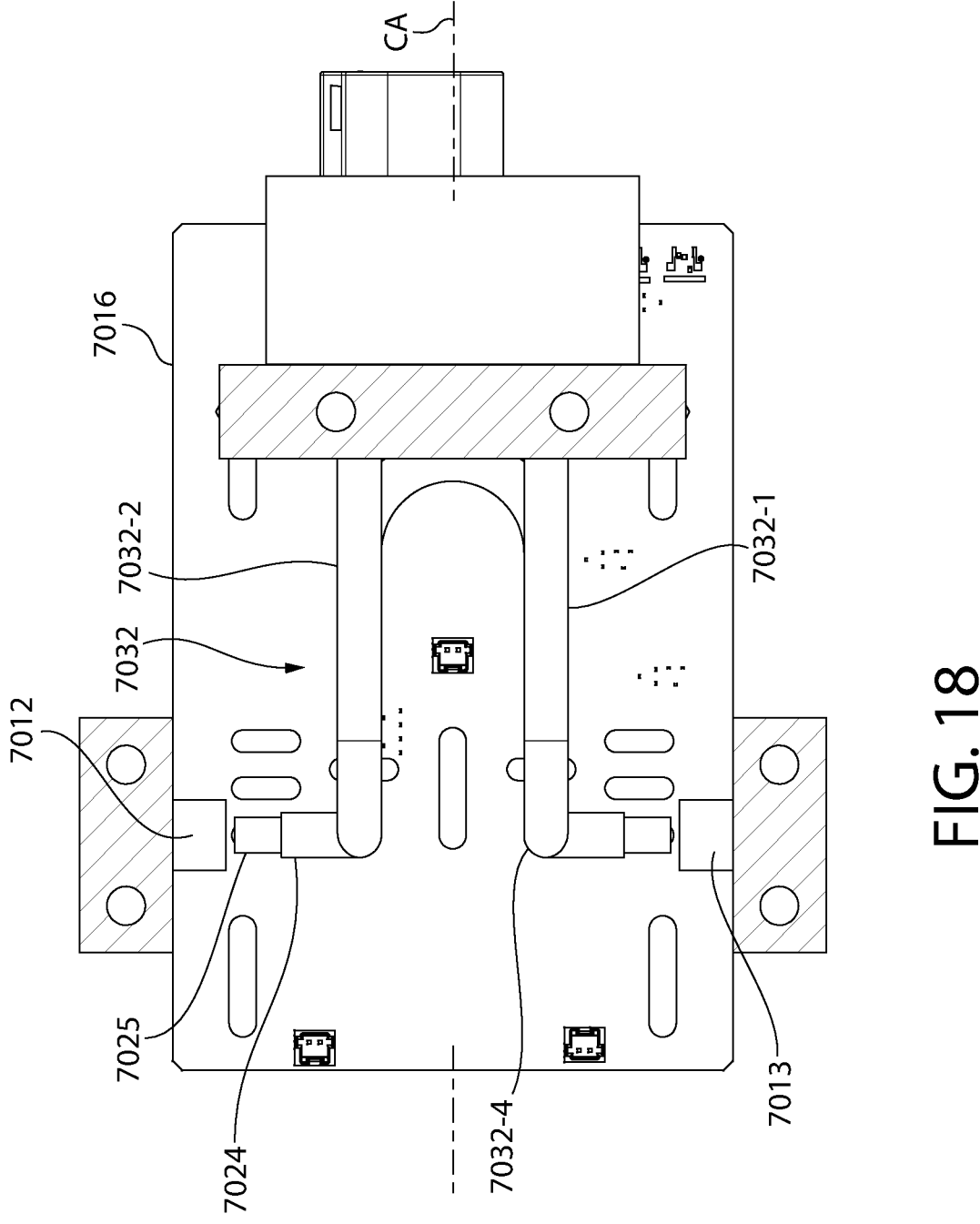
FIG. 18 is a longitudinal cross sectional view thereof.

In recurvant oscillator tube 7032, slurry flow follows the path indicated by the directional flow arrows in FIG. 17. Slurry flow moves in a first direction parallel to centerline axis CA twice, and in an opposite direction parallel to centerline axis CA twice as well by virtual of the primary and secondary U-bend portions 7032-3 and 7032-4. Primary U-bend portion 7032-3 is oriented horizontal while second U-bend portions 7032-4 are oriented vertically. In this design, centerline CA and a majority of the flow passages within oscillator tube 7011 may remain horizontal in orientation as shown so that any settling that occurs is perpendicular to the flow through the passage rather than in-line with the flow.

Figure 5:
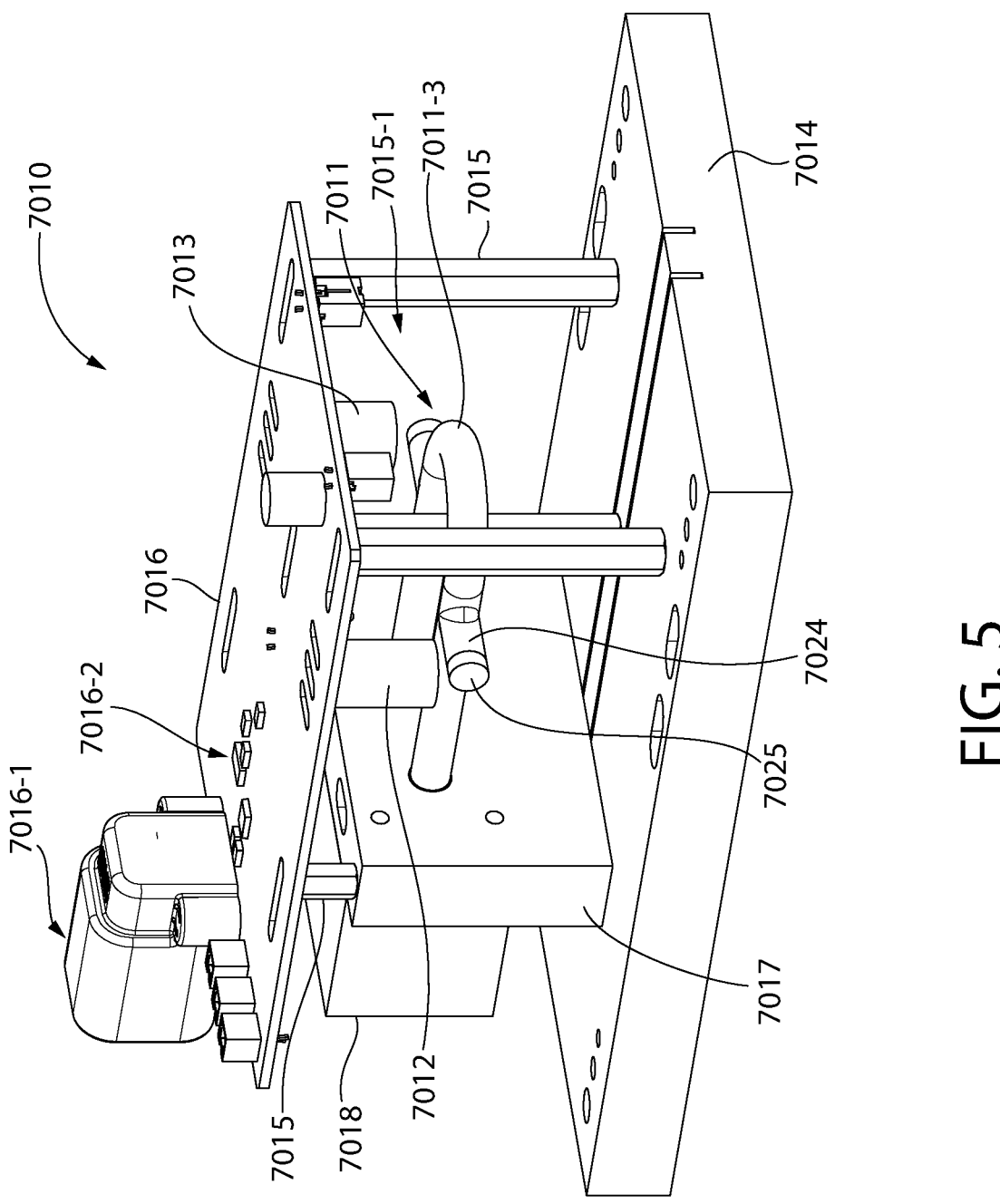
FIG. 5 is a perspective view of a first embodiment of a slurry density meter usable in the systems of FIG. 44A or 44B.
Figure 6:
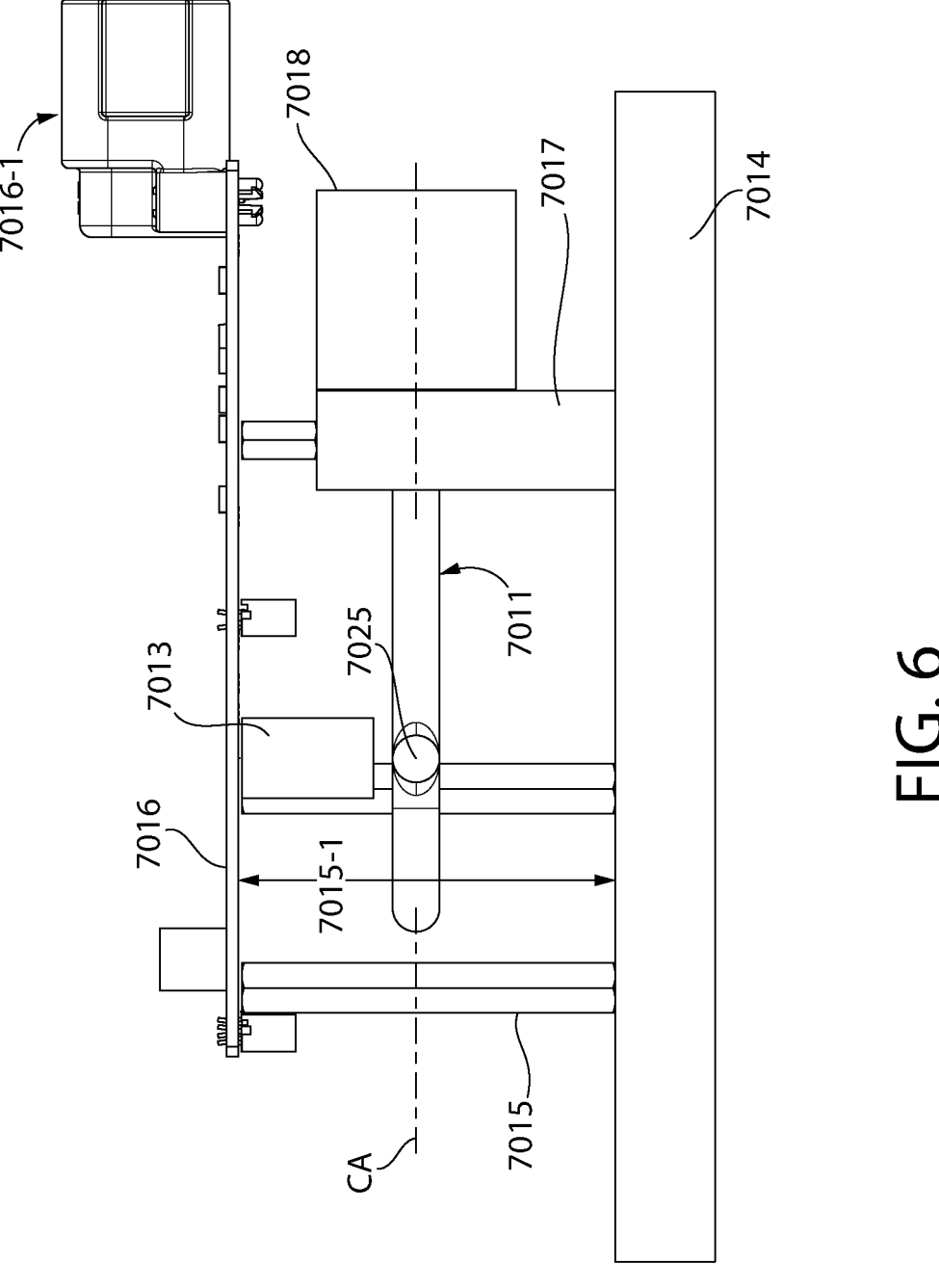
FIG. 6 is a first side view thereof.

In contrast to the first U-shaped oscillator tube 7011 of FIG. 5 first described above, the triple bend recurvant oscillator tube 7032 design is advantageous because the vibration displacement is mirrored between the left and right sides of the tube (e.g., vertical bends 7032-4 bends move towards each other, then away from each other as the tube oscillates). Due to this, there are always equal and opposite forces canceling each other out during oscillation, and thus the vibration is not affected by external influences on mass, stiffness, or damping of the base and other components. The previous straight U-tube oscillator design would propagate vibration into the base easily as the oscillation was not counterweighted, and thus the entire system vibrates somewhat. Since the entire system vibrates, any external influences on the entire systems mass, stiffness, or damping would artificially change the natural frequency, thereby adversely affecting accuracy to some degree. The straight U-tube oscillator nonetheless may be acceptable in situations not subjected to undue external influences.

The remainder of the density measurement device 7010 setup and components are essentially the same as the embodiment utilizing oscillator tube 7011 and will not be repeated here for the sake of brevity.

In some embodiments, a single device which combines the foregoing functions of both frequency transmitter or driver 7012 and receiver or pickup 7013 may be provided in lieu of separate units. Such a device may be an ultrasonic transducer as one non-limiting example. For a combined single driver-pickup device 7012/7013, the device could be activated to excited the oscillator tube 7011, stopped for a few oscillations of the oscillator tube, and then reactivated to measure the resultant oscillation frequency response of the tube. In the combined design, only a single permanent magnet 7025 is required located proximate to the driver/pickup.

Fine Filtration Filter

The fine filter unit of the fine filtration sub-system 7003 shown in FIGS. 3 and 4 will now be further described. In testing, the inventors have discovered that "fine" filtering (e.g., 0.010 inches/0.254 mm) directly out of the mixing device can in some situations adversely and significantly affect the ability to obtain a consistent water to soil ratio (e.g., 3:1) across all types of soils which might be encountered, sampled, and tested. Accordingly, it is beneficial to understand and measure the density of the mixed raw soil sample slurry from the mixing device 100 before performing fine filtering. Accordingly, preferred but non-limiting embodiments of the disclosed agricultural sample analysis systems 7000 comprise both a coarse filter 146 upstream of density measurement device 7010, and a fine filter 7050 or 7060 downstream of the density measurement device; each of which is described in greater detail below. Two different exemplary configurations of the agricultural sample analysis system comprising this two-stage slurry filtering are disclosed; one with slurry recirculation from the fine filter unit back to the mixing device 100 shown in FIG. 4 and one without recirculation shown in FIG. 3 further discussed herein.

The agricultural sample analysis system utilizes a first coarse filter 146 having a very coarse screen (e.g. about 0.04-0.08 inch/1-2 mm maximum particle size passage in one possible implementation) to initially screen and filter out larger size stones, rocks and aggregate from the slurry to avoid clogging/plugging of the flow conduit (tubing) lines upstream of microfluidic processing disk 4000 while still permitting an accurate density measurement in density measurement device 7010. Coarse filter 146 may be incorporated into mixing device 100 in one embodiment as previously described herein, or may be a separate downstream unit. This coarse filtering is followed by fine filtering in fine filter units 7050 or 7060 having fine screening (e.g. less than 0.04 inch/1 mm, such as about 0.010 inch/0.25 mm maximum particle size passage in one possible implementation) to allow the agricultural slurry sample to pass through downstream slurry processing and chamber analysis flow networks (e.g. microfluidic flow networks and components of a microfluidic processing disk) without causing flow obstructions/plugging. Examples of such microfluidic processing disk flow networks is disclosed in commonly owned International Publication No. WO2020/012369. For soil, these extremely small particles passed by the fine filter unit make up the vast majority of the nutrient content of the soil, so it is acceptable to use finely filtered slurry for the ultimate chemical analysis in the system. It bears noting that the fine filtering step and filter units 7050, 7060 are useable and applicable to slurries comprised of other agricultural materials to be sampled (e.g. vegetation, manure, etc.) and thus not limited to soil slurries alone.

FIGS. 21-24 show a first embodiment of a fine filter unit 7050 useable with either of the soil slurry preparation and analysis systems shown in FIG. 3 or 4. Fine filter unit 7050 is configured for particular use with the slurry recirculation setup of FIG. 4 (which includes a closed recirculation flow loop 7059) between the fine filter unit 7050 (or 7060) and mixing device 100 as shown.

Figure 24:
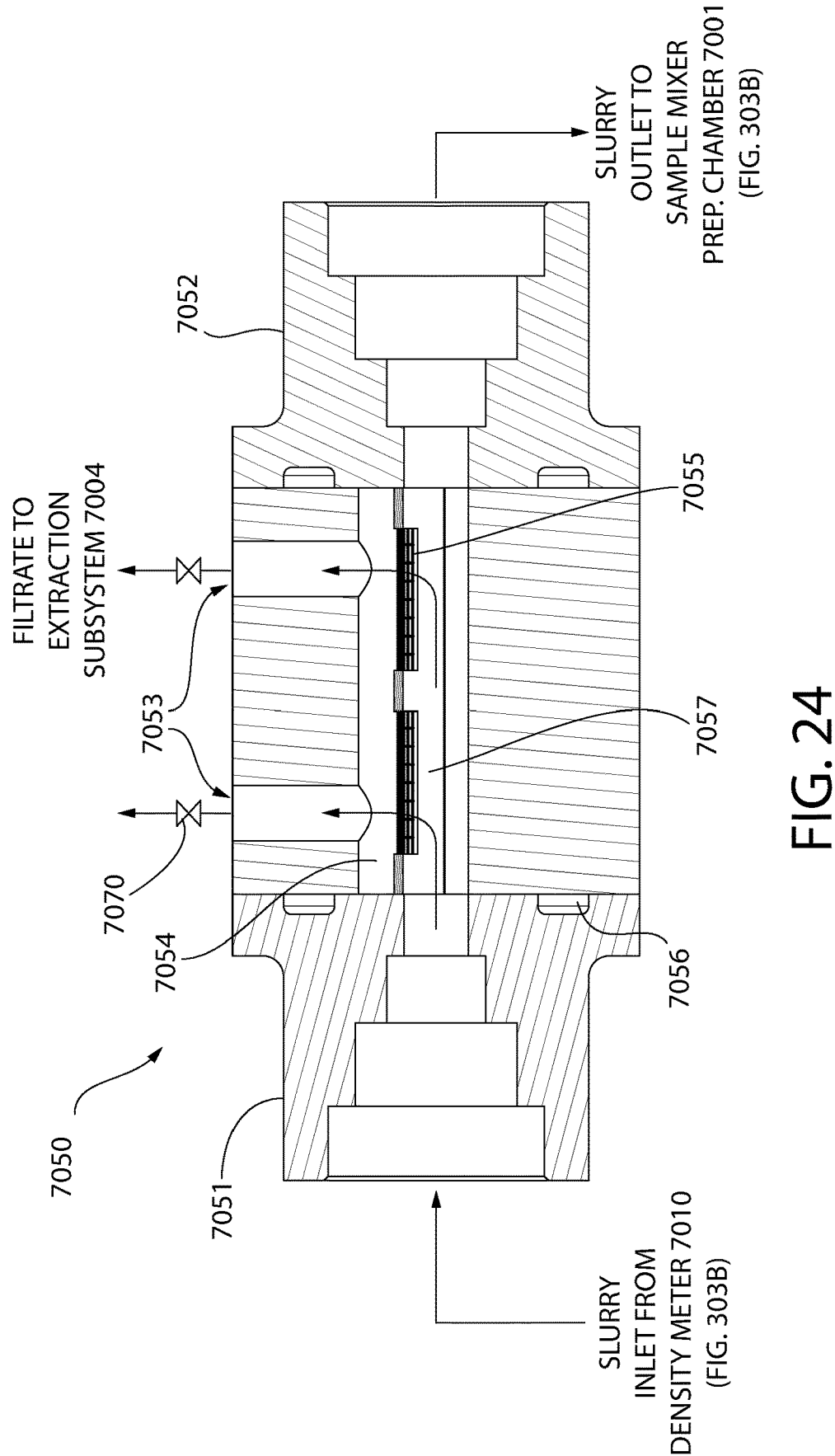
FIG. 24 is a side cross sectional view thereof.
Figure 25:
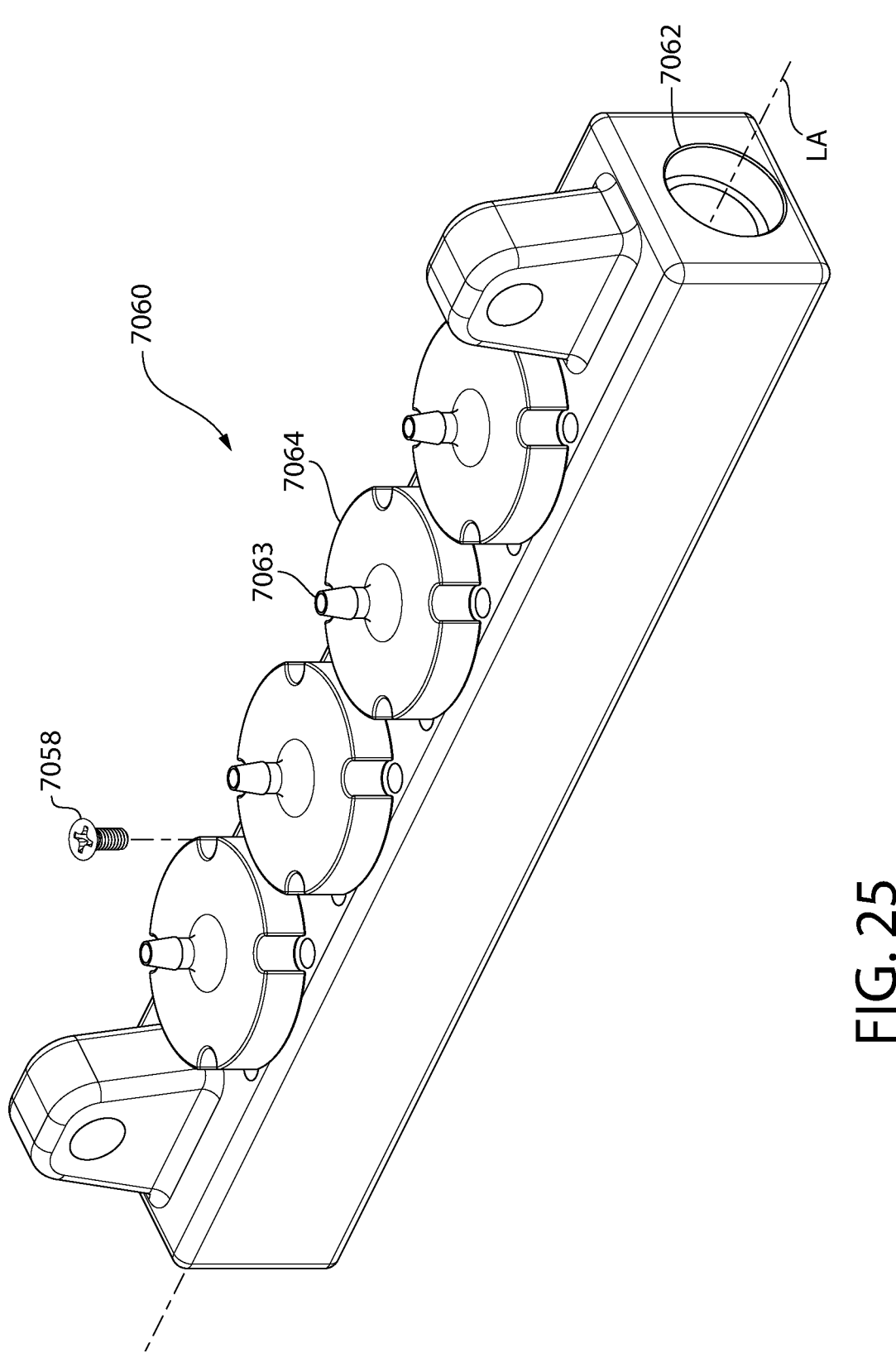
FIG. 25 is a first perspective view of a second embodiment of a fine filter unit.
Figure 26:
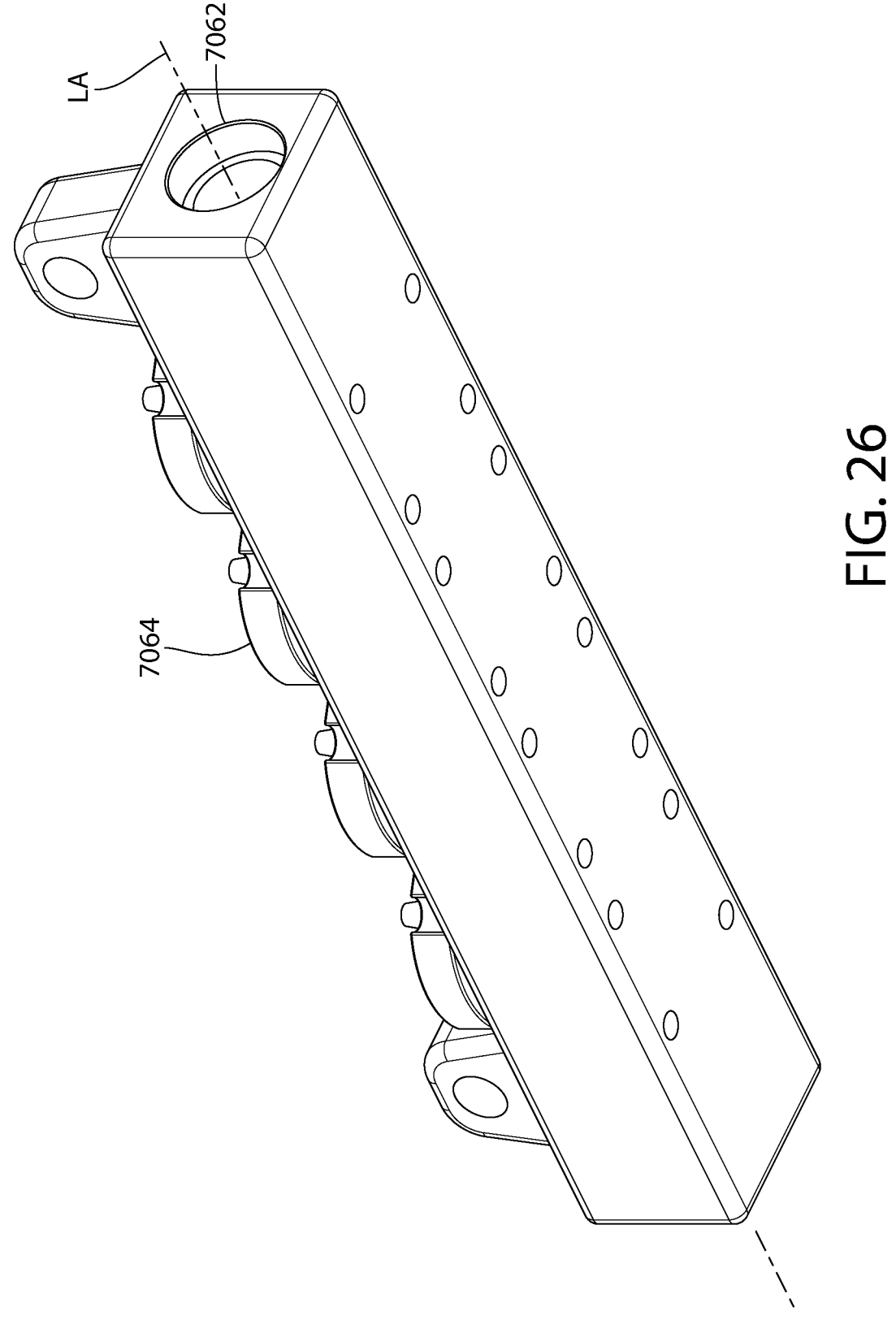
FIG. 26 is a second perspective view thereof.
Figures 27, 28:
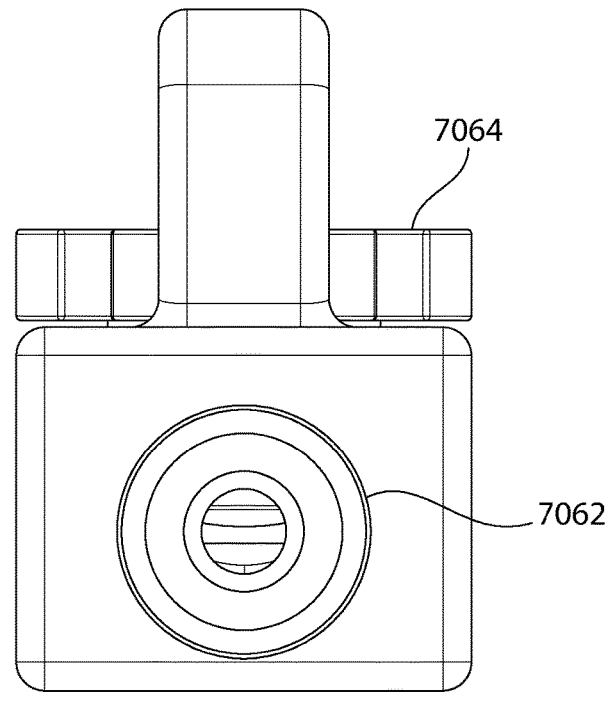
FIG. 27 is an end view thereof.
FIG. 28 is a top view thereof.

Filter unit 7050 comprises a longitudinal axis LA, pre-filtered slurry inlet nozzle 7051, pre-filtered slurry outlet nozzle 7052, plural filtrate outlets 7053 (post-filtered), internal pre-filtered slurry chamber 7057, internal filtrate chamber 7054, and one or more filter members such as screens 7055 arranged between the chambers. Screens 7055 may be arcuately shaped in one embodiment and positioned at the top of the slurry chamber 7057 as best shown in FIG. 24. Any number of screens may be provided. A pair of annular seals 7056 fluidly seals the inlet and outlet nozzles 7051, 7052 to the main body of the filter unit to allow initial placement of the filter screen 7055 inside the filter unit before securing the inlet and outlet nozzles to the body. The main body may be block-shaped, cylindrical, or another shape. The nozzles may be uncoupled from the central main filter body in order to access the interior of the filter unit and initially install or periodically replace the screens. Threaded fasteners 7058 or other suitable coupling means may be used to couple the inlet and outlet nozzles to the opposing ends of the main body. The slurry inlet and outlet nozzles 7051, 7052 may have any suitable configuration in order to accept any suitable type of tubing connector to fluidly couple the system slurry tubing 7088 to the filter 7050. One non-limiting example of tubing connector that could be used is John Guest plastic half cartridge connector which is com-mercially-available. Other tubing connectors may be used. Any suitable non-metallic (e.g. plastic) or metallic materials may be used to construct filter unit 7050 including screens 7055. In one embodiment, the main body of the filter unit may be plastic and the screens 7055 may be metallic such as gridded mesh defining mesh openings.

In operation and describing the slurry flow path through fine filter unit 7050 with respect to FIG. 4, unfiltered slurry flows in sequence (upstream to downstream) from the coarse filter 146 through density measurement device 7010 and enters the fine filter unit through the inlet nozzle 7051. The slurry flows axially and linearly through pre-filtered slurry chamber 7057, and then exits the filter through outlet nozzle 7052 back to mixing device 100 (see, e.g. "sample prep. chamber" in FIG. 4). A slurry recirculation pump 7080 may be provided to fluidly drive the recirculation flow in the closed recirculation flow loop 7059 and return the yet to be fine filtered slurry back to the mixing device. Any suitable type of slurry pump may be used. The recirculation pump may be omitted in some embodiments if the main slurry pump 7081 provides sufficient fluid power to drive the slurry flow through the entire closed recirculation flow loop 7059. The system continuously recirculates the coarsely filtered slurry back into the main blending chamber of the mixer for a period of time. This recirculation can advantageously help with getting a homogeneous slurry mixture more quickly for analysis than with the mixer alone by continuously recycling the slurry through the mixer and coarse filter in the closed recirculation flow loop 7059. During density measurement, water is automatically metered and added to the mixing device 100 by the previously described control system 2800 (including programmable controller 2820) based on the system monitoring the slurry density measured by density measurement device 7010, which is operably coupled to the controller in order to achieve the preprogrammed water to soil ratio. The slurry is better mixed by this continuous slurry recirculation.

Once a coarsely filtered homogeneous slurry having the desired water to soil ratio is achieved, a small minority portion of the recirculating slurry stream may be bypassed and extracted from fine filter unit 7050 for initial processing in analyte extraction sub-system 7004 and subsequent chemical analysis (see, e.g., FIG. 4). The extracted slurry flows transversely through filter screens 7055 and into filtrate chamber 7054, and then outwards through the filtrate outlets 7053 to the analyte extraction sub-system. The flow of extracted slurry may be controlled by suitable control valves 7070 changeable in position between open full flow, closed no flow, and throttled partially open flows therebetween if needed. Valves 7070 may be manually operated or automatically operated by controller 2820 to open at an appropriate time once homogenous slurry having the desired water to soil ratio has been achieved, or as otherwise preprogrammed. Additional valves may also be used to open flow to water in order to backflush the filter during the cleaning cycle in preparation for the next sample.

Although two filtrate outlets 7053 are shown in FIGS. 319-323, other embodiments may have more than two filtrate outlets or less (i.e., one outlet). Each filtrate outlet 7053 is fluidly coupled to and supplies fine filtered slurry (filtrate) to a separate one of the dedicated soil sample slurry processing and analysis trains or systems such as disclosed in commonly owned International Publication No. WO2020/012369; each train fluidly isolated from others and config-ured for quantifying the concentration of a different analyte of interest (e.g. plant nutrients such as nitrogen, phosphorus, potassium, etc.) in parallel.

It bears noting that the term "pre-filtered" used above only refers to the fact that the soil slurry has not been filtered yet with respect to the fine filter unit 7050 being presently described. However, the slurry may have undergone previ-ous filtering or screen upstream however such as in coarse filter 146 seen in FIGS. 3-4. Accordingly, the slurry may be filtered before reaching fine filter unit 7050 downstream.

Fine filter unit 7050 is configured to eliminate the passage of soil or other particles in the slurry which cause blockages in or otherwise obstruct the extremely small diameter micro-fluidic flow passages/conduits and microfluidic processing disk flow components such as valves, pumps, and chambers formed within the analysis processing wedges of the micro-fluidic processing disk described in International Publication No. WO2020/012369. Accordingly, filter screens 7055 of fine filter unit 7050 are sized to pass soil particles compatible with the microfluidic processing disk and smaller in size than those screened out by the upstream coarse filter 146 associated with the mixing device. The filter screens 7055 have a plurality of openings each configured to remove particles greater than a predetermined size from the slurry to yield the filtrate. Screens 7055 may be formed of a grid-like metallic mesh in one embodiment which defines the mesh openings for filtering the slurry.

Accordingly, in one preferred embodiment, the first coarse filter 146 of the system is configured to pass slurry having a first maximum particle size, and the second fine filter unit 7050 is configured to pass slurry having a second maximum particle size smaller than the first maximum particle size. Furthermore, the ultrafine filtration sub-system 7005 which comprises the third ultrafine filter 5757 (which may be incorporated into or associated with microfluidic processing disk 4000 or associated with soil sampling system 3000) is configured to pass slurry having a third maximum size smaller than the first and second maximum particle sizes. As previously described herein, the ultrafine filter 5757 is micro-porous filter which can replace a centrifuge and is configured to produce the clear filtrate from the soil slurry and extractant mixture which serves as the supernatant for chemical analysis. Accordingly, the performance of ultrafine filter 575 surpasses both the coarse and fine filters in terms of the smallest maximum passable particle size. As a non-limiting example, representative pore sizes that may be used for ultrafine filter 575 is about and including 0.05 μm to 1.00 μm. It bears noting that the foregoing terms "first," "second, ", and "third" are used to connote the filter units which the slurry encounters in sequence flowing from upstream to downstream when passing through the systems shown in FIGS. 3-4. Accordingly, the maximum slurry particle size continuously gets smaller as the slurry passes through each filter unit in sequence.

In an ordinary filter operation, all flow is directed through the screen and anything that does not pass through the screen stops on the screen and builds up. This requires the screen to be either drained or back-flushed after a period of time to keep it clean and functional for its purpose. This presents a problem if a lot of particulate material needs to be filtered out because it will lead to a very short time period for which the filter will work before needing cleaning. For this reason, the new screen fine filter units 7050, 7060 were designed which operate on the principle of extracting a small amount soil slurry for testing from the main slurry recirculation flow path as described above instead of intercepting all of the slurry flow for fine filtering. Doing this advantageously enables the filter to stay clean for a much longer period of time because only a minority portion of the slurry flow is extracted and travels through the screen transversely to the main direction of the slurry flow through the filter unit. In addition, the main slurry flow path which preferably is oriented parallel to the plane occupied by the screen 7055 continually scrubs and cleans the filter screens 7055 (see, e.g., FIG. 24) by shearing action of the flow to prevent accumulation of particles on the screens. It further bears noting that the fine filter units 7050 and 7060 advantageously avoids internal areas that have low pressure or flow where particulates can accumulate. It is also desirable to avoid internal surface orientations in the filter in which particulates will accumulate due to gravity. Accordingly, embodiments of fine filter units 7050, 7060 preferably may be oriented such that the filter screens 7055, 7065 respectively are above the main flow and juncture where the bypass slurry flow is drawn off for chemical analysis and preferably in a transverse direction to the main flow path of slurry through the filter bodies (see, e.g., FIGS. 24 and 29).

FIGS. 25-29 shows the second embodiment of a fine filter unit 7060 noted above. Fine filter unit 7060 comprises a plurality of optionally replaceable filter screen assemblies or units 7068. In this embodiment by contrast to fine filter unit 7050, the filter screen units can be removed and replaced without breaking the end fluid connections to the system tubing/piping, thereby greatly facilitating periodic change-out of the screens over time. Filter unit 7050 has internally mounted screens 7055, which can be accessed by removing the slurry inlet and outlets nozzles 7051, 7052 as previously described herein. In some embodiments, filter screen units 7068 may be constructed to be disposable such that a new screen unit is interchanged with the used plugged screen units when needed.

Fine filter unit 7060 has an axially elongated main body which defines a longitudinal axis LA, a pre-filtered slurry inlet 7061, pre-filtered slurry recirculation outlet 7062, plural filtrate outlets 7063 (post-filtered), internal pre-filtered main slurry chamber 7067 in fluid communication with the inlet and outlet, and plurality of filter screen units 7068 each comprising a filter member such as screen 7065 arranged between the chamber 7067 and one filtrate outlet 7063. Inlet 7061 and outlet 7062 may preferably be located at opposite ends of the fine filter unit body at each end of chamber 7067, thereby allowing the main slurry chamber to define a slurry distribution manifold in fluid communication with each filtrate outlet 7063. Screens 7065 may be convexly curved and dome shaped in some embodiments (best shown in FIG. 29). The main slurry chamber 7067 extends axially between the inlet and outlets 7061, 7062 beneath the screen units 7068. Fine filter unit 7060, albeit convexly shaped, may be used in the orientation shown such that portions of the screens 7065 exposed to the slurry in main slurry chamber 7067 may be considered substantially horizontally oriented and parallel to longitudinal axis LA and the axial flow of slurry through the main slurry chamber screens. Flow through the screens is further in an upward direction (transverse to longitudinal axis LA and the axial slurry flow in the chamber) when the fine filter unit 7060 is used in the preferred horizontal position. This combines to advantageously both: (1) scrub and clean the screens 7065 as the slurry flows past the screens in the slurry chamber 7067 thereby preventing accumulation of slurry particles on the screens until the filtrate is extracted, and (2) counteracts the effects of gravity for accumulating particulate on the screens since the slurry enters the screens from the bottom thereby keeping the particles below the screens until filtrate extraction occurs.

Fine filter unit 7060 is axially elongated such that the screen units 7068 may be arranged in a single longitudinal array or row as shown so that the main slurry chamber 7067 is linearly straight to avoid creation of internal dead flow and lower pressure areas in the slurry flow path where particulate in the slurry might accumulate.

Figure 29:
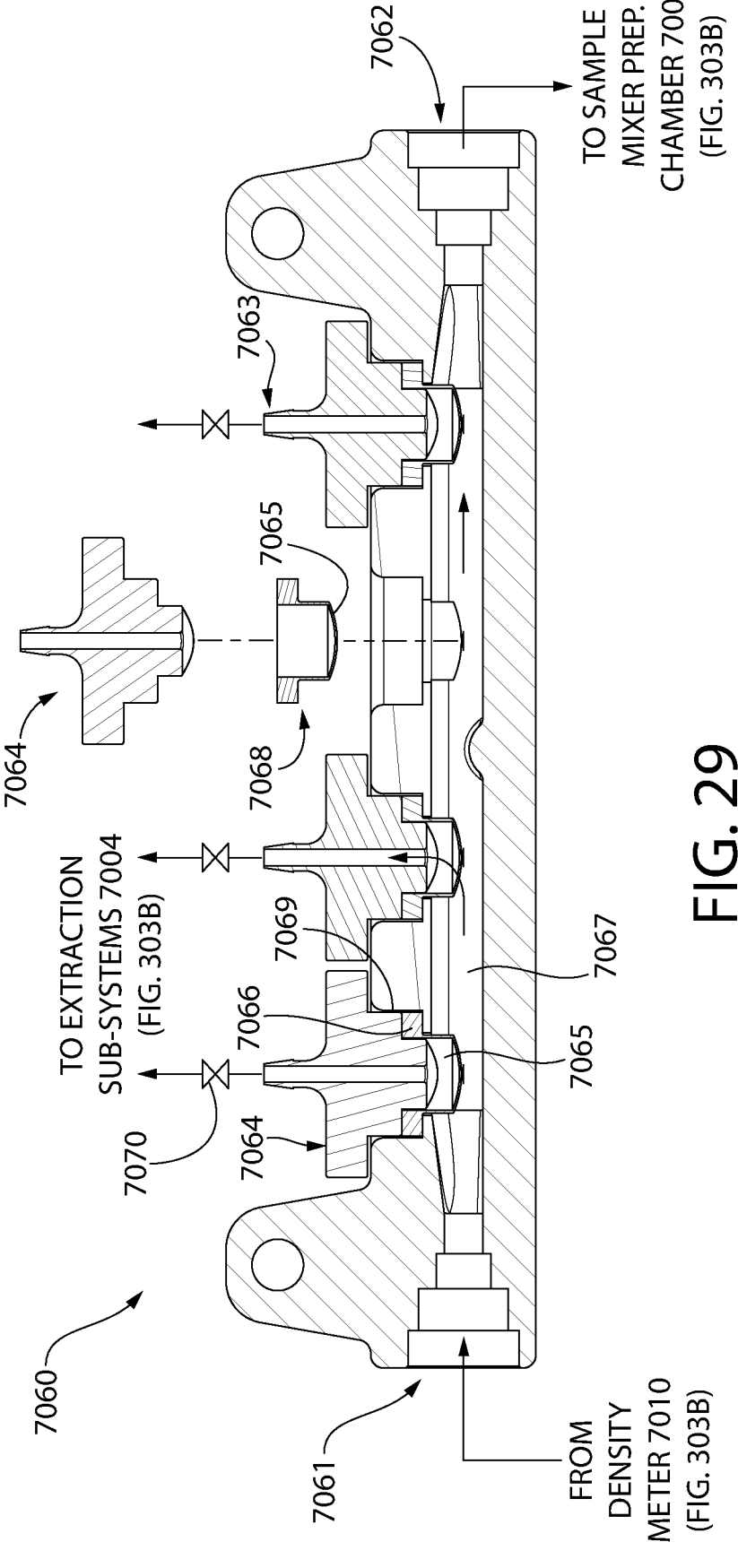
FIG. 29 is side cross sectional view thereof.

An annular seal 7066 which may be elastomeric washers in one embodiment may be incorporated directly into each filter screen unit 7068 as part of the assembly to fluidly seal the screen unit to the main body of the filter unit. Screen unit 7068 may have a cup-shaped configuration in one embodiment (best shown in FIG. 29) with the convexly curved dome-shaped screen 7065 protruding outwards/downwards from one side of the seal 7066 into the main slurry chamber 7067. Each screen unit 7068 is received in a complementary configured upwardly open receptacle 7069 formed in the main body of the filter unit 7060 which fluidly communicates with the main slurry chamber 7067 of the filter unit. A screen retainer 7064 may be detachably coupled to the filter unit main body and received at least partially in each receptacle to retain each screen unit as best shown in FIG. 29. The main body may be block-shaped, cylindrical, or another shape. The filtrate outlets 7063 may an integral unitary structural portion of the screen retainers 7064 in one embodiment, and can be terminated with a conventional tubing barb in some embodiments as shown to facilitate coupling to the flow conduit tubing of the system. Other type fluid end connections may be used. Filtrate outlets 7063 extend completely through the retainers from top to bottom (segment. FIG. 328). Retainers 7064 may have a generally stepped-shape cylindrical configuration in some embodiments. Threaded fasteners 7058 or other suitable coupling means may be used to removably couple the retainers 7064 to the main body of the filter unit. The retainers 7064 trap the filter screen units 7068 in the receptacles 7069. Any suitable non-metallic (e.g. plastic) or metallic materials may be used to construct filter unit 7060 including screens 7065. In one embodiment, the main body of the filter unit may be plastic and screens 7065 may be metallic.

Similarly to filter unit 7050 and screens 7055, the screen units 7068 have screens 7065 each configured to remove particles greater than a predetermined size from the slurry to produce the filtrate. The filter screens 7065 thus have a plurality of openings each configured to pass slurry having a predetermined maximum particle size. Screens 7065 may be formed of a grid-like metallic mesh in one embodiment which defines the mesh openings for filtering the slurry. Other embodiments of screens 7065 or 7055 may use polymeric meshes. Other type filter media may be used in other possible embodiments to perform the desired slurry screening.

An exemplary process for exchanging filter screen units 7068 includes removing the threaded fasteners 7058, withdrawing the retainers 7064 from each receptacle 7069 transversely to the longitudinal axis LA of the filter unit main body, withdrawing the filter screen units transversely, inserting new screen units transversely to the longitudinal axis LA into each receptacle, re-inserting the retainers into the receptacles, and reinstalling the fasteners.

An overview of one non-limiting method for preparing an agricultural sample slurry using the slurry recirculation and dual filtering generally comprises steps of: mixing an agricultural sample with water in a mixing device to prepare a slurry; filtering the slurry a first time; measuring a density of the slurry; recirculating the slurry back to the mixing device; and extracting a portion of the recirculating slurry through a secondary fine filter to obtain a final filtrate. Filtering the slurry the first time passes slurry comprising particles having a first maximum particle size, and filtering the slurry the second time passes slurry comprising particles having a second maximum particle size smaller than the first maximum particle size. The final filtrate then flows to any of the agricultural sample analysis systems discloses herein which are configured to further process and measure an analyte in the slurry.

It bears noting that both fine filter units 7050 and 7060 may be used with the agricultural sample analysis system of FIG. 3 without slurry recirculation by simply closing the respective recirculation outlet nozzles via a plug or a closed valve fluidly coupled to the outlet nozzle. Alternatively, the slurry could flow to waste after passing through the fine filter. In this case, the filtrate would need to be extracted from the slurry while it is flowing through the filter.

Figure 30:
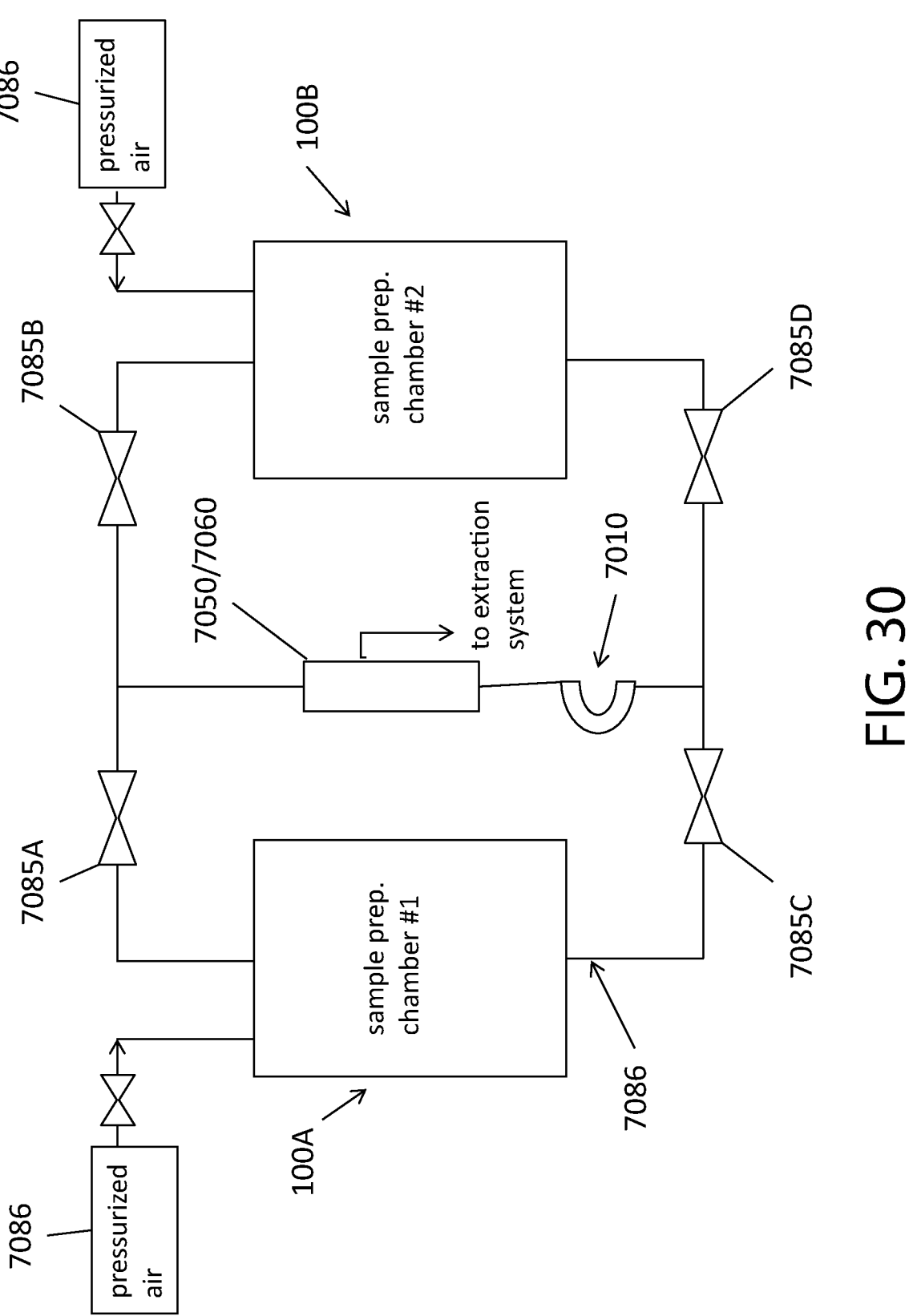
FIG. 30 is a schematic diagram of a pump-less system for blending a soil slurry using pressurized air.

In lieu of the pump recirculation system of FIG. 4, FIG. 30 is a schematic diagram showing an alternative equipment layout and method for recirculating the coarsely filtered slurry through fine filter units 7050 or 7060 using pressurized air instead. Two blending chambers are fluidly coupled to the inlet and outlet of a fine filter unit 7050 or 7060 as shown by the flow conduit network layout which may be piping or tubing 7086 shown. At least one of the blending chambers may be provided by mixing device 100A for initially preparing the water and soil slurry. The other blending chamber may be an additional mixing device 100B, or alternatively simply an empty pressure vessel. Four slurry valves 7085A, 7085B, 7085C, and 7085D are fluidly arranged between the fine filter unit and each of the chambers as shown for controlling the direct of the slurry during blending. In operation, if the slurry is first prepared in mixing device 100A (sample prep. chamber #1), valves 7085B and 7085C are opened, and valves 7085A and 7085D are closed. Mixing device 100A is pressurized with air from a valved pressurized air source 7086 which causes the slurry to flow through density measurement device 7010 and the fine filter unit 7050 or 7060 to mixing device 100B. Valves 7085B and 7085C are then closed, and valves 7085A and 7085D are opened. Mixing device 100B is then pressurized causing the slurry to flow in a reverse direction through fine filter unit 7050 or 7060 and density measurement device 7010 back to mixing device 100A. The sequence cycle is repeated multiple times to continue the slurry blending. The valving and pressurized air sources may be operably coupled to and controlled by system controller 2820 pressure, which may be programmed to cause this back and forth flow to occur very rapidly. The slurry density may be measured continuously each time the slurry flows through the density meter. Once the slurry is thoroughly blended as desired, the filtrate outlets from the fine filter units are opened to direct the filtered slurry to the extraction sub-system 7004 shown in FIG. 4 for processing and chemical analysis. In some embodiments, a single pressurized air source may be used for each mixing chamber in lieu of separate sources. In another embodiment, the second chamber could be mounted directly above the first sample preparation chamber with a valve between. Instead of pressurizing the second chamber, gravity would allow the slurry to flow back down into the first chamber.

System Slurry Flow Conduit Sizing

The internal diameter (ID) of the slurry flow conduit such as slurry tubing 7088 shown in FIGS. 3-4 is critical to proper operation of the agricultural sample analysis systems 7000 without plugging the tubing. When moving slurry with large particles through a small tube, the likelihood of clogging increases. For nearly laminar flow, the velocity at the wall is near zero which exacerbates the problem. For small tubing, this becomes significant because of high frictional forces on the slurry. If these frictional forces become too significant, particles fall out of the flow and build up in the tubing causing a flow stoppage. Additionally, large particles can wedge with other large particles in a small tube and cause blockages and flow stoppage. However, having very large tubing is problematic because it is difficult to have sufficient flow to keep particles in suspension to prevent soil particle precipitates.

The inventors have discovered that the internal diameter of the slurry tubing 7088 and passages should be designed in such a way that the internal cross sectional diameter is at a minimum two times the largest particle size in the slurry. That is, as an example, if the particles are screened to 2 mm in size (e.g., diameter) by the coarse filter 146 or fine filter units 7050 or 7060, the ID of the tubing should be no less than 4 mm diameter. Conversely, the internal diameter of tubing and passages should be designed in such a way that the cross sectional internal diameter is at most ten times the largest particle size (e.g. diameter). That is, as an example, if the particles are screened to 2 mm in size, the ID of the tubing should be no greater than 20 mm in diameter. Accordingly, the preferred internal diameter of the slurry tubing 7088 has a critical range between at least two times the largest particle size/diameter and no greater than ten times the largest particle size/diameter.

In some embodiments, the tubing material used may preferably be flexible and formed of a fluoropolymer, such as without limitation FEP (fluorinated ethylene propylene) in one non-limiting example. Other fluoropolymers such as PTFE (polytetrafluoroethylene), ETFE (polyethylenetetrafluoroethylene), and PFA (perfluoroalkoxy polymer resin). The dynamic coefficient of friction (DCOF) associated with these fluoropolymers also affects the preferred range of tubing internal diameter discussed above because the tubing material creates frictional resistance to slurry flow. FEP, PTFE, ETFE, and PFA each have a DCOF falling the range between about and including 0.02-0.4 as measured per ASTM D1894 test protocol. Accordingly, the tubing material used for slurry tubing 7088 associated with the above critical tubing internal diameter range preferably also has a DCOF in the range between about and including 0.02-0.4, and more particularly 0.08-0.3 associated with FEP in some embodiments. Testing performed by the inventors confirmed that use of FEP tubing falling within the critical internal tubing diameter range avoided the slurry flow blockage problems noted above. In other possible embodiments, nylon tubing may be used.

Agricultural Sample Slurry Preparation System with Modified Slurry Recirculation FIGS. 34-70 show various aspects of a modified agricultural slurry preparation system 8000 of the agricultural sample analysis system 7000 and various components thereof. System 8000 is one non-limiting embodiment of a sample preparation sub-system 3002 shown in FIG. 1. The system 8000 is configured and operable to prepare a water-based slurry comprising the agricultural sample material (e.g., solids) having a desired target slurry water to solids ratio suitable for further chemical analysis and quantification of the analyte levels in the sample (e.g. plant nutrients or other). In one embodiment, the system may include closed slurry recirculation flow loop 8002 comprising a density measurement device operable to measure the density of the prepared slurry. The recirculation flow loop is isolatable from other portions of the slurry system to form a closed slurry flow path or loop used in conjunction with measuring the density of the agricultural slurry, as further described herein. The loop allows the slurry to recirculate in the closed recirculation system while water (diluent) is incrementally added to achieve the target water to solids (agricultural) ratio. In one embodiment, the agricultural sample material may be soil which comprises the particulate or solids portion of the water-based slurry; however, any of the other agricultural materials or solids previously described herein may be used with the slurry preparation system 8000.

Figure 35:
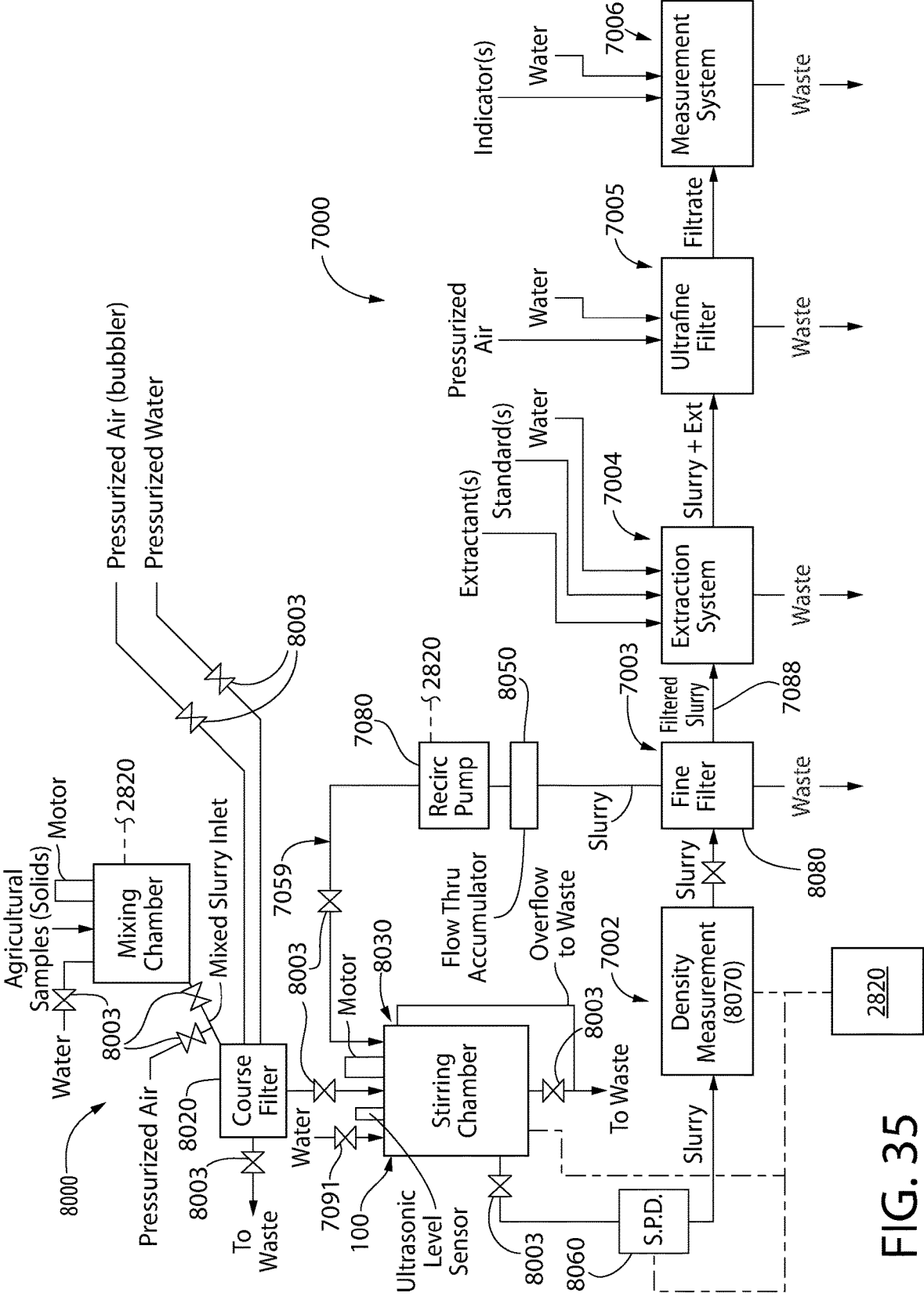
FIG. 35 is a schematic block flow diagram of the agricultural sampling analysis system incorporating the slurry preparation system of FIG. 34.
Figure 36:
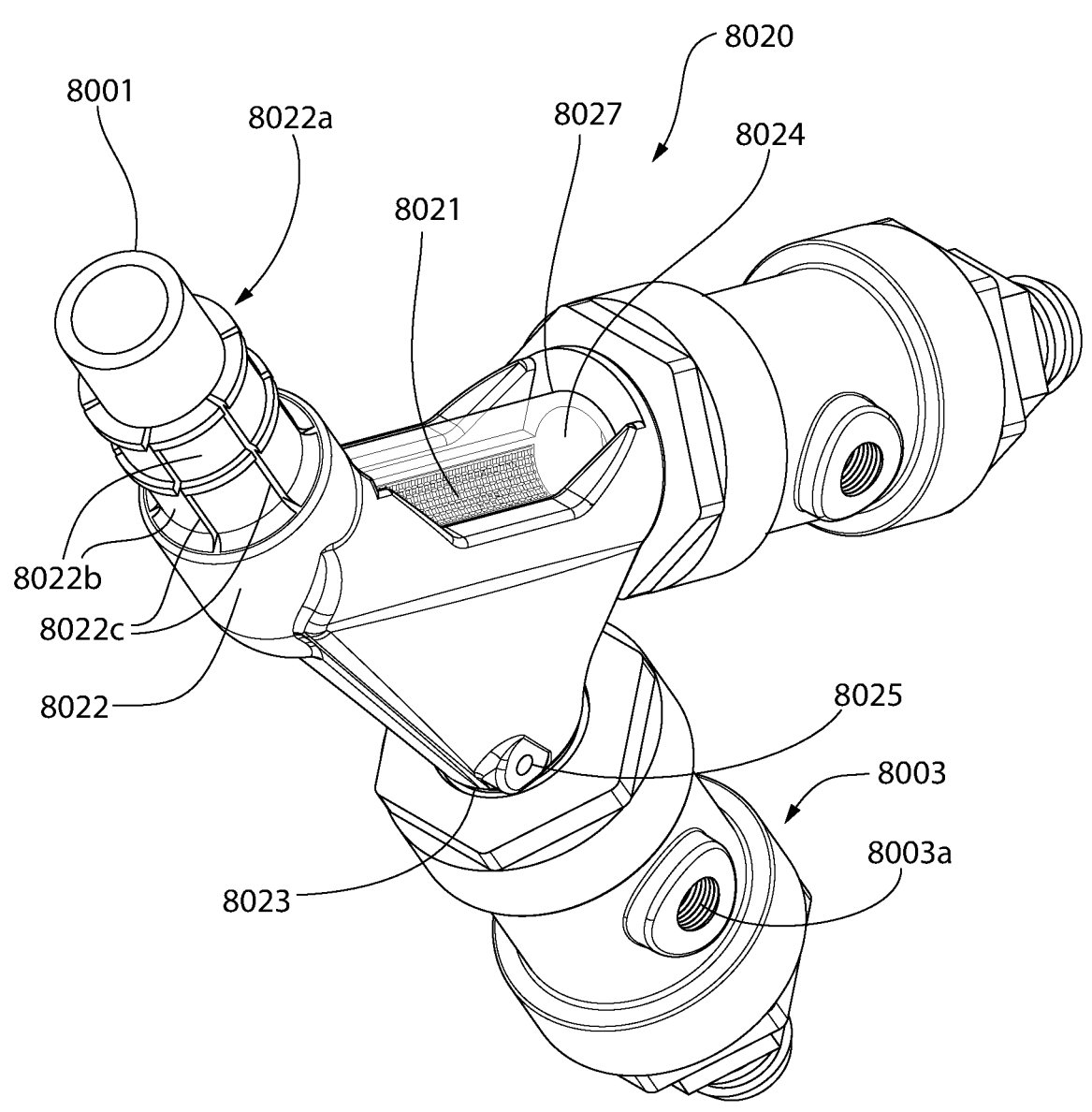
FIG. 36 is top perspective view of the coarse filter unit of the agricultural slurry preparation system.
Figure 37:
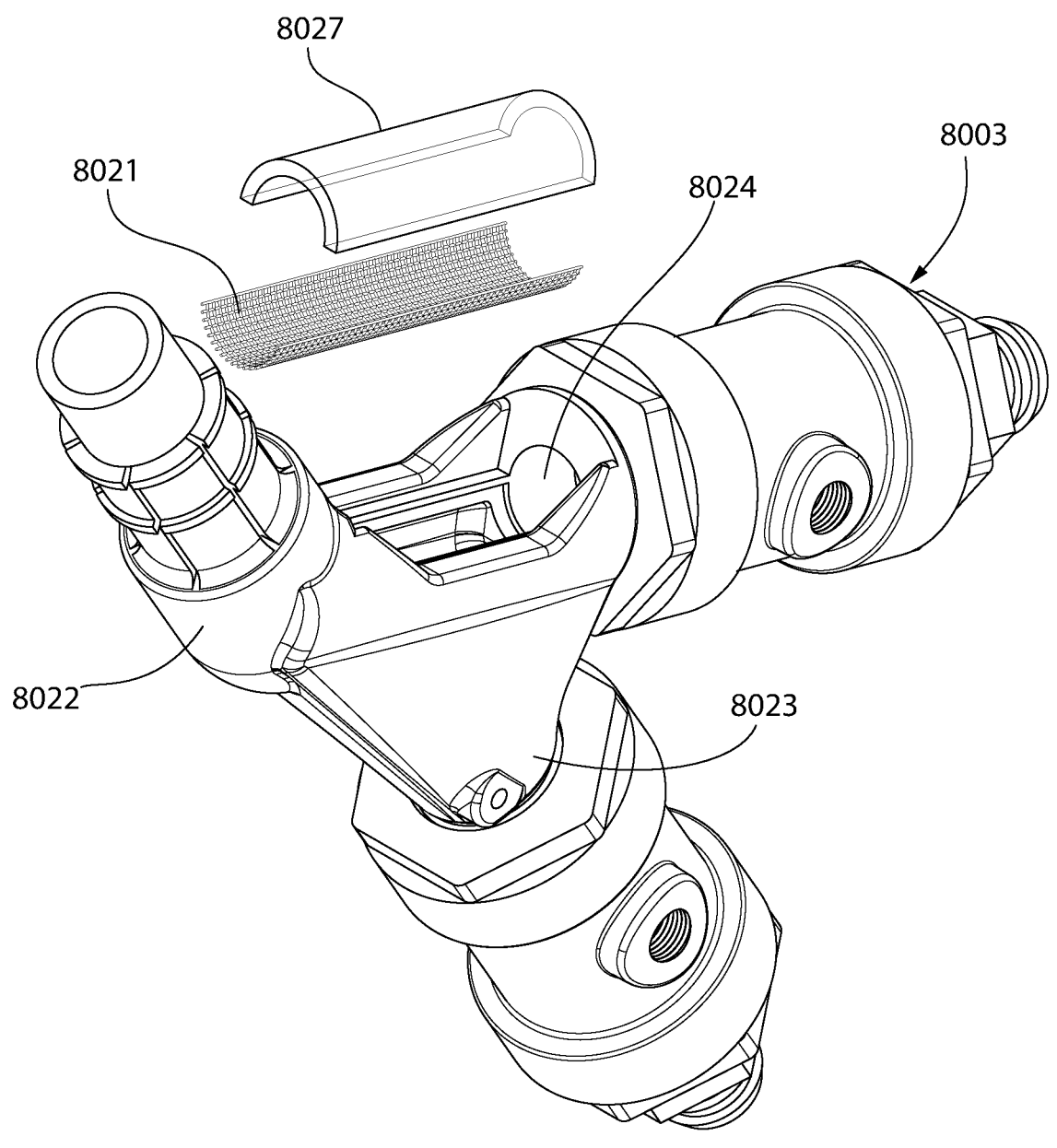
FIG. 37 is an exploded view thereof.
Figure 38:
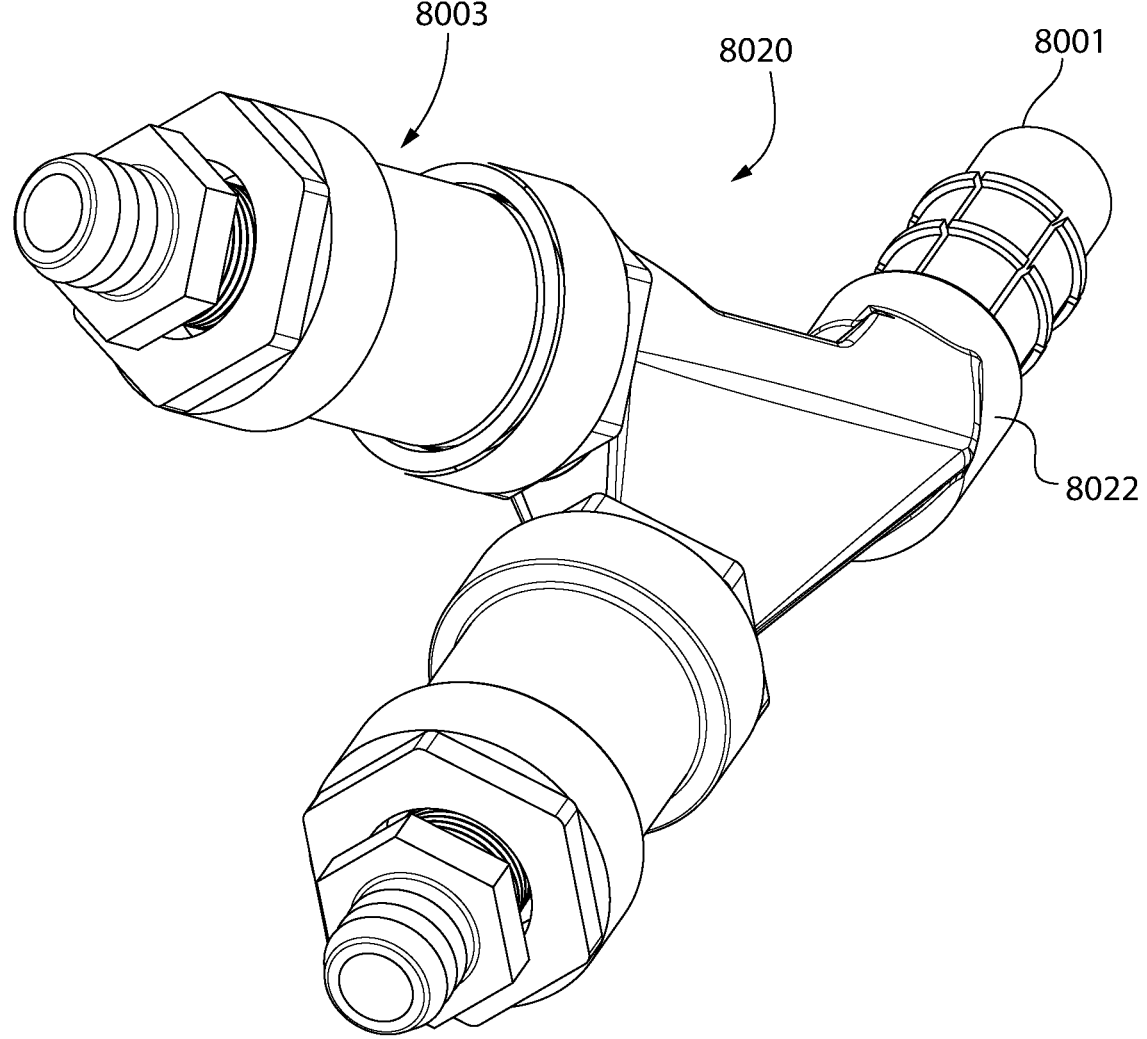
FIG. 38 is a bottom perspective view thereof.
Figures 39, 40:
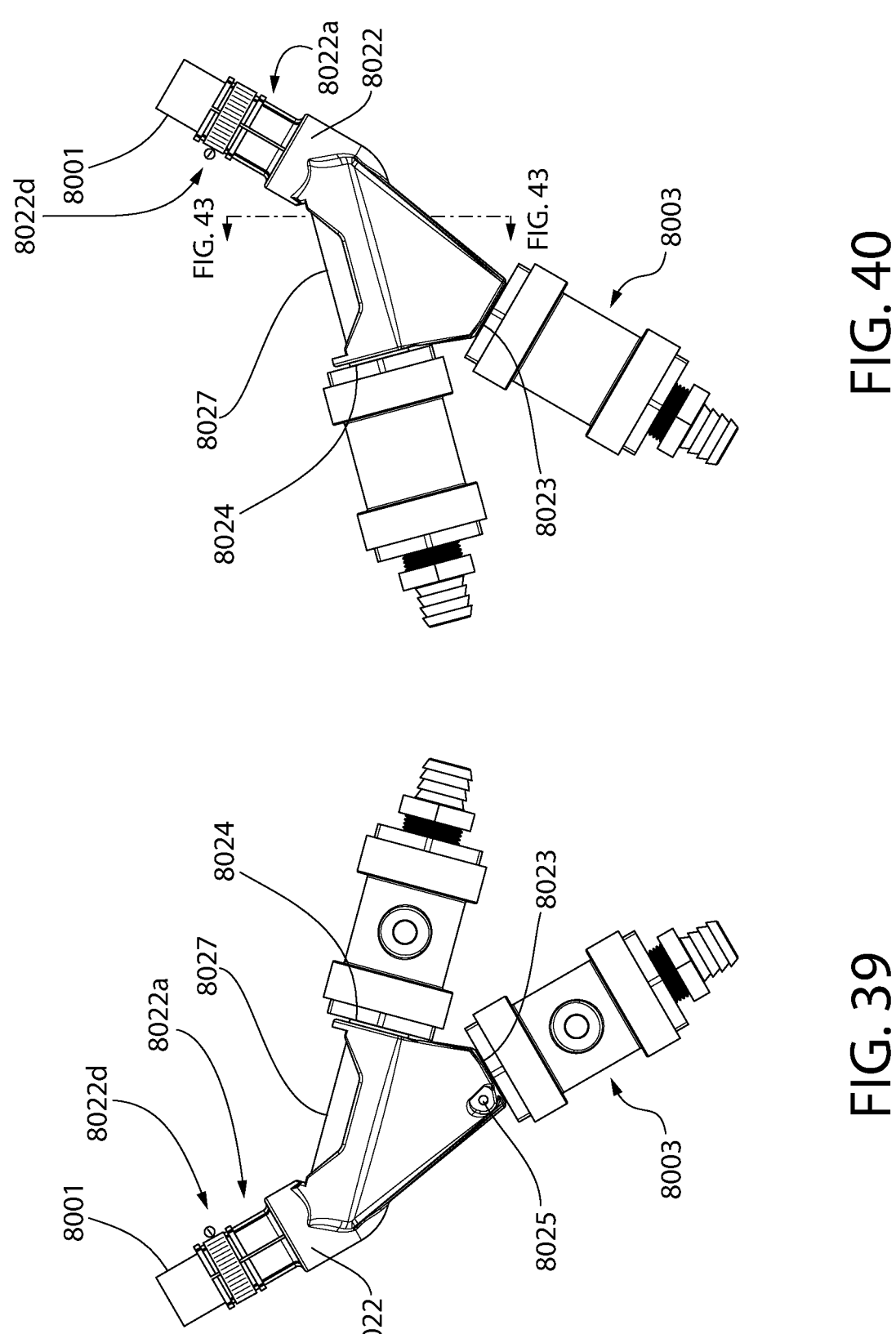
FIG. 39 is a first side view thereof.
FIG. 40 is a second side view thereof.

FIG. 34 is a simplified schematic equipment diagram of the agricultural slurry preparation system 8000 represented in the related high-level block flow diagram of FIG. 35.

Referring initially to the foregoing FIGS. 34-35, agricultural slurry preparation system 8000 generally includes a fluidly coupled and communicating mixing device 8010, coarse filter unit 8020, and closed slurry recirculation flow loop 8002. Mixing device 8010 may be fluidly coupled to the slurry recirculation flow loop 8002 via flow conduits 8001. The slurry may flow via gravity, pressurized air force, or be pumped from the mixing device to the recirculation flow loop in one embodiment. One non-limiting arrangement utilizes gravity to avoid the cost and maintenance of a pump. Other embodiments may rely on gravity with a pressurized air-assist.

Flow conduits 8001 may be formed by tubing, hosing, and/or piping alone or in combination of suitable dimension (i.e., length and diameter) and material such as metallic and/or non-metallic materials (e.g., plastic, rubber, etc.). A combination of these materials and sizes may also be used as needed. The flow conduits 8001 may be flexible, semi-rigid, and/or rigid in structure. In one embodiment, plastic tubing may be used for at least some of the flow conduits. Coarse filter unit 8020 may be fluidly coupled to each of and in the flow path between the recirculation flow loop 8002 and mixing device 8010 via flow conduits 8001.

The inventors have discovered that separating the initial bulk agricultural slurry preparation function via mixing device 8010 from the function of maintaining the slurry in a mixed homogenous state for measuring slurry density results in more accurate density determination. Accordingly, as further described herein, the slurry recirculation flow loop 8002 comprises a separate dedicated stirring device 8030 for this purpose.

Slurry Mixing Device

Mixing device 8010, which is used to prepare the initial agricultural slurry by mixing the collected agricultural solids with water generally comprises a sealable hollow body defining a mixing chamber 8013, sample inlet 8011, water inlet 8012, and a rotatable blade mechanism 8014 configured and operable for mixing the agricultural sample materials and water added to the mixing chamber 8013. The agricultural sample comprised of bulk or raw collected agricultural material (e.g. soil, manure, vegetation, or other agricultural materials) may be added to mixing device 8004 via a sample inlet 8011. Water may be added via water inlet 8012.

Blade mechanism 8014 generally comprises blade assembly 8015 and a drive unit such as electric drive motor 8016 coupled to impeller or drive shaft 8017 of the blade assembly. One or more sets of spaced apart impellers or blades 8016 may be mounted to drive shaft 8017 which are rotatable at a constant predetermined speed(s) or variable speeds via operation of motor 8016. Any suitable commercially-available fixed or variable speed electric motor may be used for this application.

In one embodiment, pressurized air from an available pressurized air source 8005 may be used to drive the unfiltered slurry from the mixing device 8010 to the coarse filter unit 8020 via flow conduit 8001. A shutoff valve 8003 in the slurry discharge flow conduit 8001 from the mixing device 8010 may be closed. The pressurized air line 8006 may be coupled to the flow conduit 8001 between the shutoff valve and filter unit 8020. In other possible embodiments, the slurry may be pumped from the mixing device 8010 to filter unit 8020.

Coarse Filter Unit

FIGS. 36-43 show additional images of the coarse filter unit 8020 in isolation and greater detail. Coarse filter unit 8020 is configured and operable to remove undesired oversized or larger particles which may remain entrained in the agricultural sample slurry after preparing the slurry in the mixing device 8010. Such oversized particles may comprise hardened accumulations or pieces of agricultural solids or foreign debris/objects collected with the agricultural sample. For soil samples, such oversized particles may include small field stones or pebbles, foreign objects in the soil (e.g. parts of farm equipment, tools, fasteners), or hard bits of crop residue.

Coarse filter screen 8021 mounted in the interior of the filter unit 8020 has a mesh size or openings selected to preclude such larger than desired or oversize particles from passing through the screen, while allowing the desired smaller solid particles suspended in the agricultural slurry to pass through to the slurry recirculation flow loop 8002 for further processing as further described herein. The screen openings or mesh size is therefore selected to preclude particles of a predetermined size from passing through the screen 8021 which might adversely affect downstream flow components or equipment (e.g. pumps, valving, etc.) disclosed herein. Thought of the opposite way, the screen openings are selected to allow a particle having a predetermined maximum particle size to pass through. In one non-limiting embodiment, as an example, the screen or mesh opening size of the filter screen 8021 may be about $\frac{1}{16}$ inch (0.063 inches) for soil-based slurry. Slurry particles larger than this size will not pass through the filter screen. Other size screen openings may be used for soil slurry or other types of agricultural slurries. Filter screen 8021 is elongated and may be arcuately curved from side to side in one embodiment for passing and shedding passing accumulating debris more readily.

In one embodiment, coarse filter unit 8020 may have a generally Y-shaped body including unfiltered slurry inlet 8022, filtered slurry (filtrate) outlet 8023, and waste outlet 8024. Filter unit 8020 may be formed of plastic in some embodiments; however, other embodiments may use metallic bodies. In one embodiment, slurry inlet 8022 may comprise a resiliently deformable segmented tubing coupling 8022a comprising a plurality of radially deformable elongated fingers 8022b with longitudinal slits 8022c circumferentially separating the fingers (labelled in FIG. 36). The tubing coupling 8022a allows the flow tube/hose 8001 (flow conduit) to be inserted inside the coupling rather than outside such that the end of the tube/hose enters the slurry inlet 8022 of filter unit 8020. This advantageously eliminates any small openings, gaps, or exposed edges in the coupling arrangement where solids or debris in the unfiltered slurry might accumulate and cause blockages. The unfiltered slurry flow passage into the filter unit is therefore unobstructed internally to also avoid disturbance in flow. A standard tightenable hose clamp 8022d may be used to compress the fingers 8022b inwards and secure the tubing/hose 8001 to tubing coupling 8022a (see, e.g., FIG. 39). In other embodiments, other types of tube/hosing couplings may be used.

The filtrate and waste outlets 8024 may be threaded in one embodiment to mount valves 8003 directly to the body of the coarse filter unit 8020. Other type end coupling arrangements however may be used.

Figure 41:
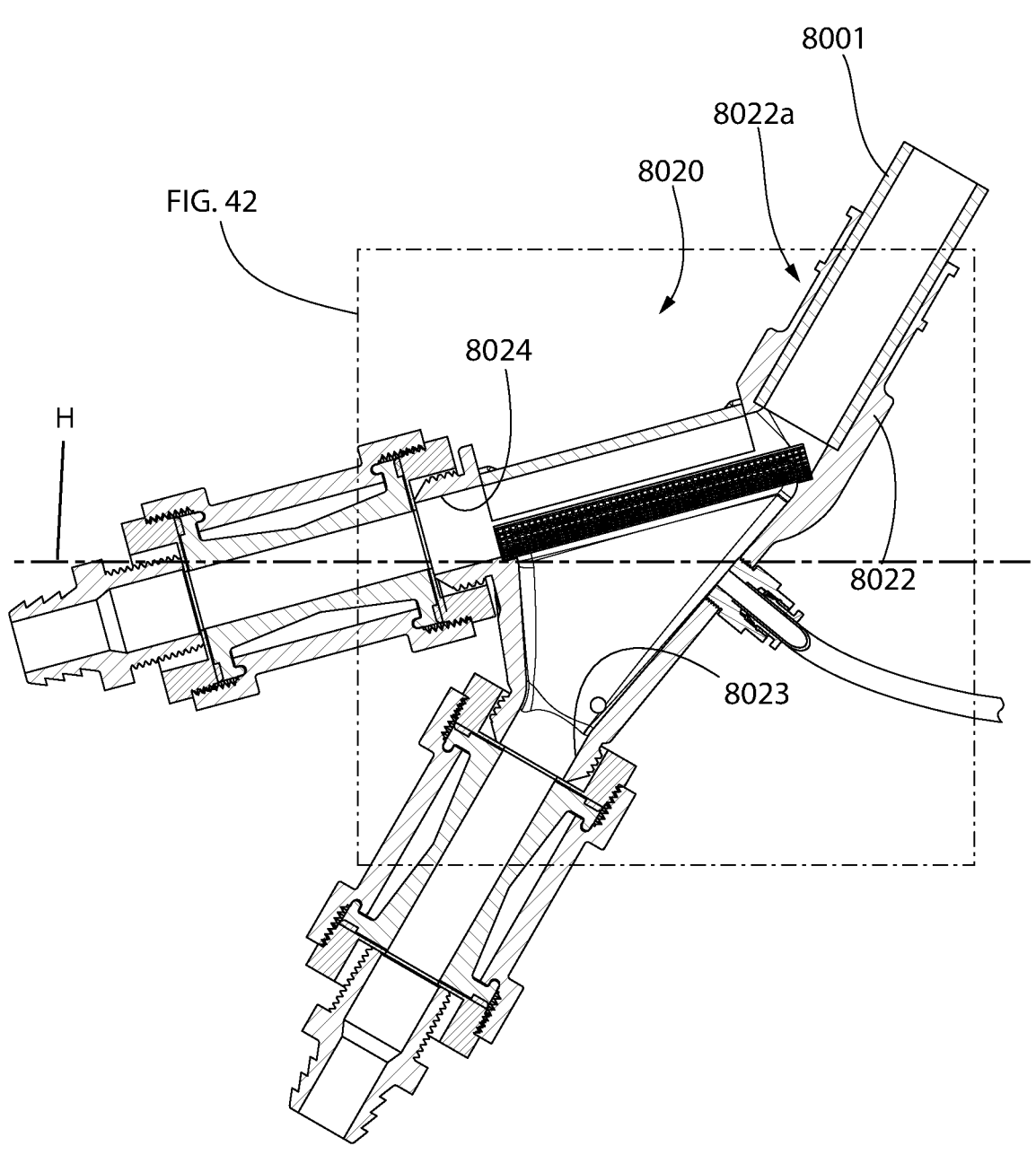
FIG. 41 is a longitudinal cross-sectional view thereof.
Figure 42:
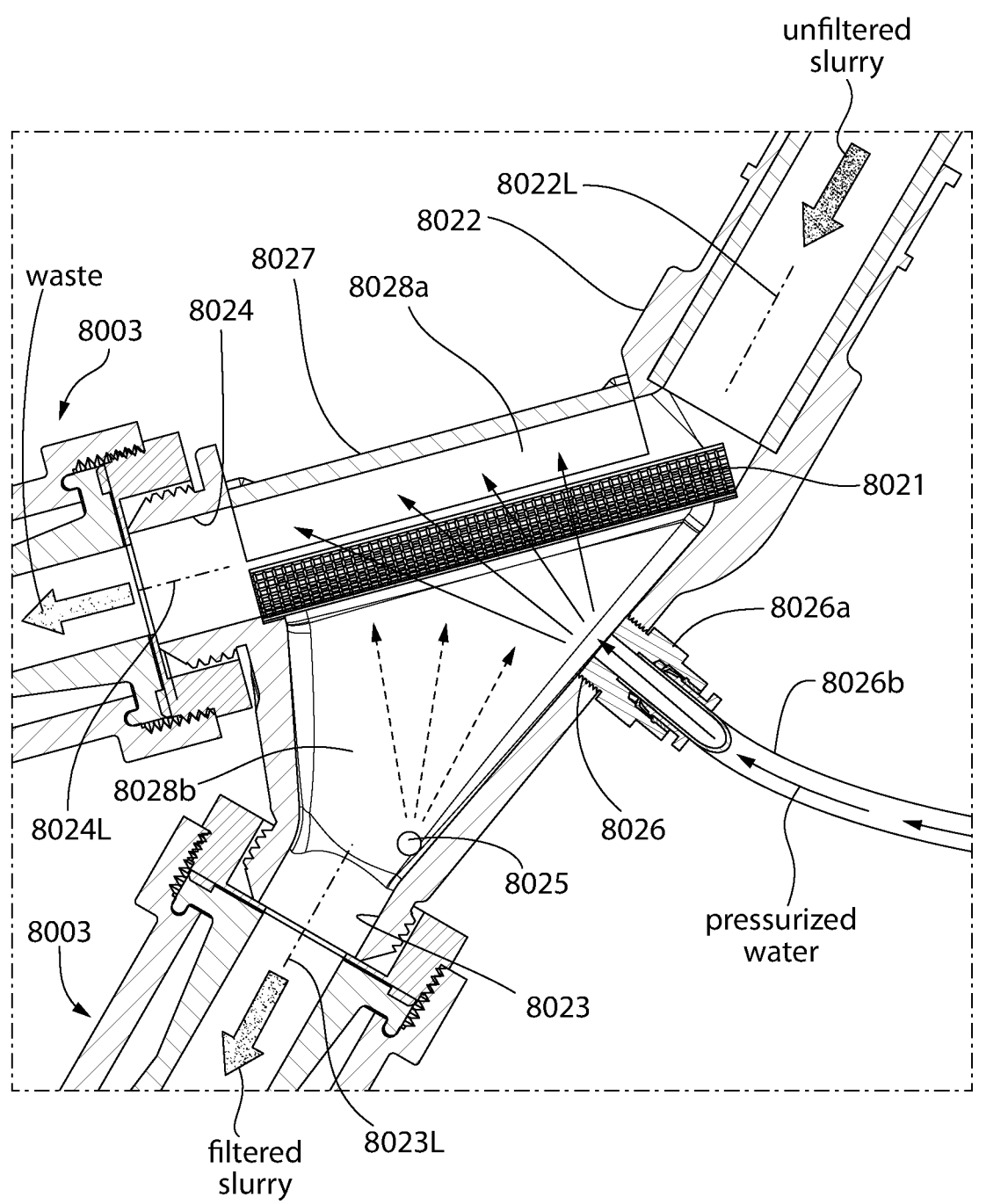
FIG. 42 is an enlarged detail taken from FIG. 41.
Figure 43:
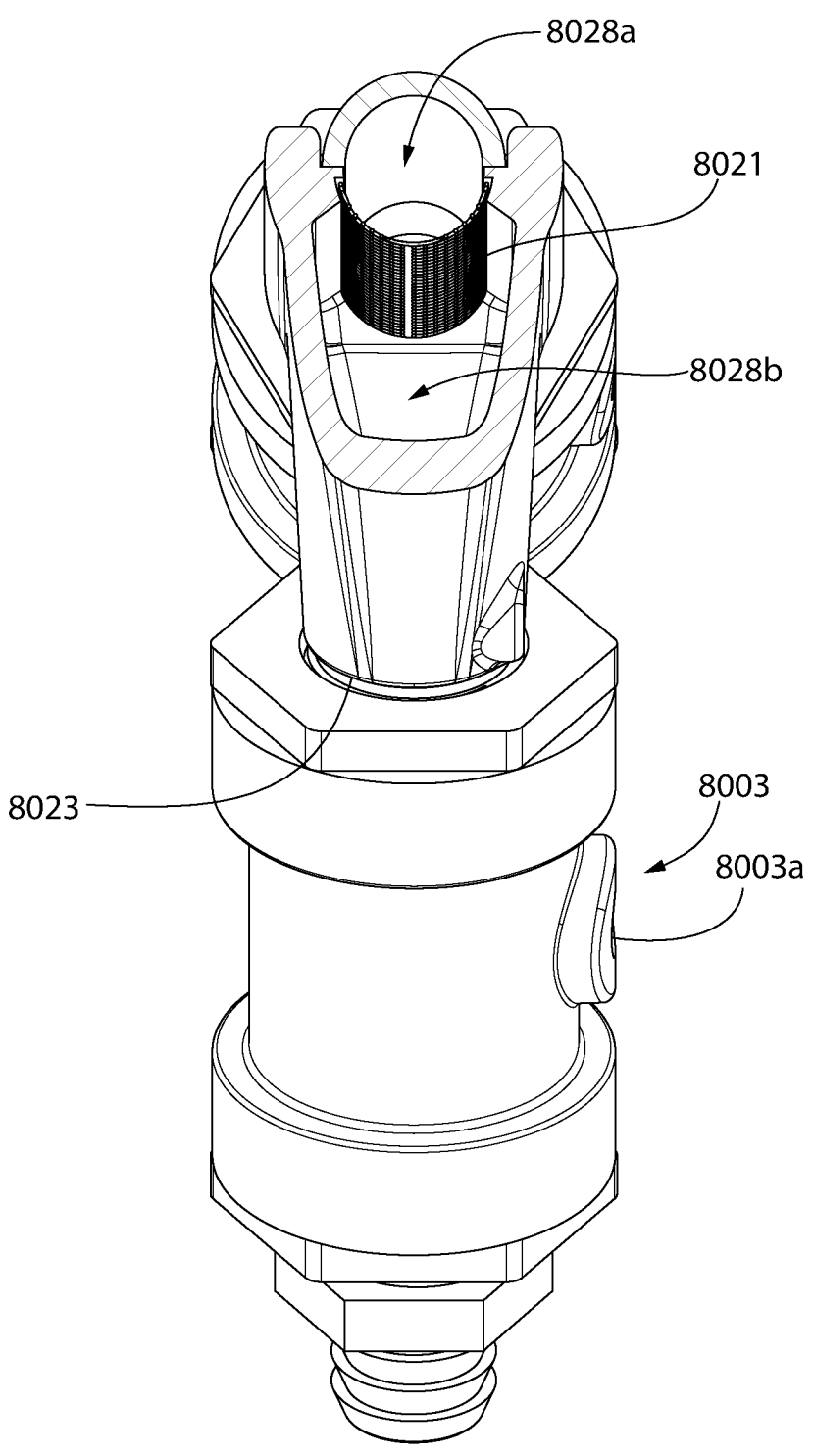
FIG. 43 is a transverse cross sectional view of the coarse filter unit.

Filter screen 8021 is fluidly interposed between the slurry inlet 8022 and filtrate outlet 8023 as best shown in FIG. 42. In one embodiment, screen 8021 may be elongated and arcuately curved from side to side. Screen 8021 may be mounted in the central portion of the Y-shaped body dividing the interior of the filter unit into an upper cavity 8028a (above the concave side of the screen) and lower cavity 8028b (below the convex side of the screen). Filter unit 8020 is intended to be used in a position in which the upper cavity is angled downwards relative and obliquely to a horizontal reference plane H passing through the filter body (See, e.g., FIG. 41). Other positions may be used in other embodiments.

Referring to FIGS. 41 and 42, lower cavity 8028b may have an oblique frustoconical shape in some embodiments forming a converging cone which narrows moving downwards in direction from filter screen 8021 towards filtrate (filtered slurry) outlet 8023. This funnels and concentrates the filtered slurry leaving the filter unit 8020 while providing a large upper portion of the lower cavity adjacent the filter screen for filtering a maximum amount of the slurry with minimum fluid pressure drop.

Coarse filter unit 8020 may also include a clear cover 8027 in some embodiments to permit visual inspection of the filter screen 8021 for accumulation of debris removed from the slurry stream. Other embodiments may have a non-transparent cover. Each of the filtrate and waste outlets 8023, 8024 and unfiltered slurry inlet 8022 of the filter unit are closeable/sealable for fluid isolation from other components of the slurry preparation system via provision of dedicated valves 8003 associated with each of the outlets and inlet. One or more of these filter unit valves 8003 may be directly coupled to the filter unit body in some embodiments. In one embodiment, air-operated pinch valves with resiliently deformable diaphragms or bladders (sometimes called sleeves) may be used which are ideal for handling slurries with entrained/suspended particulate matter. Valves 8003 of pinch valve type include a pressurized air port 8003a for pressurizing the valve which collapses the bladder to close the valve. Relieving the air pressure returns the bladder to its resiliently biased original open state due to the elastic memory of the bladder. Such pinch valves are commercially-available and their operation is known in the art without further elaboration. Other type of commercially-available valves suitable for this application however may be used. All valves 8003 discussed herein are changeable between at least a fully closed position (no flow condition) and fully open position (flow condition). Some valves 8003 may be operable in a throttled (i.e., partially open) position if desired. Note that not every valve 8003 might be numbered in FIGS. 34 and 35 for brevity and to minimize drawing clutter where valves are shown.

Coarse filter unit 8020 may be a self-cleaning design. Referring to FIG. 42, oversized particles (e.g., agricultural solids or debris) entrained or suspended in the slurry mixture from the mixing device 8010 which are too large to pass through the screen openings in filter screen 8021 flow in a linear path across the concave upper surface of screen 8021 toward waste outlet 8024. The smaller solids or particles in the slurry passable through the screen are forced downwards through the screen from upper cavity 8028a into the lower cavity 8028b of filter unit 8020 in a direction transversely to the slurry flow path in the upper cavity between slurry inlet 8022 and waste outlet 8024. It bears noting that the term "transversely" or "transverse" in this context does not necessarily mean perpendicular to but may also include angular orientations relative to a reference line or path. The filtered slurry (filtrate) continues to flow to the slurry recirculation flow loop 8002. This self-cleaning arrangement advantageously reduces plugging of the filter screen 8021, thereby allowing the filter unit to continue operation without frequent stoppages of the unit for back-flushing/cleaning the screen.

Coarse filter unit 8020 may further comprise a bubbler system used for both actively filtering the slurry and for periodic backwashing to clear the upper face of the filter screen 8021 of debris deposited thereon which is screened out of the slurry passing through the screen. The bubbler system comprises a pressurized air inlet port 8025 ("bubbler") and pressurized water inlet port 8026. In one embodiment, a push-to-connect type tube to threaded coupling may be used to attach a pressurized water tube 8026b to water inlet port 8026 which may be threaded. A similar arrangement may be used for connecting an air tube to the air inlet 8025. Other types of fittings however may be used.

Both the air inlet port 8025 and water inlet port 8026 are located on filter unit 8020 body to introduce pressurized air and cleaning water into the lower cavity 8028b of filter unit 8020 below the convex lower face of filter screen 8021 as best shown in FIG. 42. The bubbler system combines the air and water in lower cavity 8028b to produce a pressurized stream of aerated water for both normal operation of the filter unit and cleaning the screen. In some implementations, the lower cavity may be first filled with water before admitting pressurized air to activate the bubbler action. During normal slurry filtering operation or the backwash screen cleaning cycle, the pressurized aerated water stream in the lower cavity 8028b flows upwards through the filter screen to actively dislodge debris which is flushed to waste. During normal filtering operation, the aerated water stream flows on a continuous basis to discourage accumulations or deposits from forming on the screen face which may block the screen openings. Advantageously, the pressurized "bubbler" action delivers greater force to agitate and dislodge larger debris or solid particle entrained in the slurry than water alone. In the case of soil slurry, these slurries may contain debris in the form of heavier pebbles or stones (or other foreign metallic or non-metallic objects) which are not readily removed and might otherwise frequently plug the screen. The aerated water stream flushes the debris through the waste outlet 8024 to waste. The bubbler system also advantageously minimizes water usage for periodically cleaning the coarse filter unit 8020 when the filter unit 8020 is not in service or between uses.

During the periodic screen cleaning operation for maintenance, filtrate outlet 8023 is closed by closing its associated valve 8003. Slurry inlet 8022 may be fluidly isolated by closing the upstream valve 8003 between the mixing device 8010 and filter unit 8020. Alternatively, it bears noting that valve 8003 may remain open when cleaning the upstream mixing chamber with clean water and then flushing that water through the filter to waste. So often the filter is not isolated from mixing during the cleaning process Waste outlet 8025 is opened via opening its associated valve 8003. This fluidly isolates the filter unit 8021 from mixing device 8010 and slurry recirculation flow loop 8002. Once the filter backwash/cleaning operation is terminated, the waste outlet 8025 is closed and sealed by closing its associated valve 8003 and conversely the valves associated with the slurry inlet and outlet are reopened to resume normal operation.

Because the coarse filter unit 8020 is a self-cleaning design and the forgoing bubbler system is operated during the normal slurry filtering process, an insignificant portion of the unfiltered slurry may be wasted to keep the filter screen relatively free of debris and plugging. To minimize the amount of slurry lost, several measures in the design of the filter unit are provided. First, the slurry inlet and outlet 8022, 8023 and waste outlet 8024 are oriented relative to each other to minimize the wasted slurry during the filtering process. In one non-limiting embodiment, the centerlines 8022L, 8023L of the unfiltered slurry inlet 8022 and filtrate outlet 8023 respectively may be oriented parallel to each other. This introduces and extracts slurry from the filter unit 8020 in a similar orientation (best shown in FIG. 42) to take advantage of the fact that unfiltered slurry will tend to continue to flow most easily in the same direction in which it is introduced into the filter unit. The centerline of the waste outlet 8024L however is oriented transversely to the centerlines of the slurry inlet and outlet. This results in less slurry following the waste path than the path through the filter screen 8021 due to the dynamic force of the incoming slurry into the filter unit 8020. The filter screen 8021 is also oriented transversely to the centerline 8022L of the slurry inlet 8022 so that the incoming slurry stream is directed against the upper face of the screen 8021. This will tend to drive the slurry downwards through the screen, rather than angularly or laterally sideways towards the waste outlet. Finally, the lower cavity 8028B is sized larger than the upper cavity 8028a of the filter unit 8020 to offer less resistance to flow. The narrower upper cavity creates a greater resistance so that the slurry stream has a propensity to flow downwards through the filter screen 8021.

It bears noting that if the anticipated amount of debris in the unfiltered agricultural slurry to be processed is small, the coarse filter unit 8020 may be operated in a conventional manner (rather than self-cleaning mode) if desired by closing the waste outlet valve 8003 of the filter unit.

A general method or process for filtering slurry generally comprises: providing a filter unit comprising a filter screen, an upper cavity formed above the filter screen, and a lower cavity formed below the filter screen; injecting pressurized air and water into the lower cavity to produce an aerated water stream; flowing the aerated water stream through the filter screen into the upper cavity; introducing unfiltered slurry into the upper chamber of a filter unit; and passing the unfiltered slurry through the filter screen in a countercurrent direction to the aerated water stream to produce a filtrate. Accordingly, the filter unit is operated in a self-cleaning mode when the waste outlet valve 8003 is opened to expel a portion of the slurry with entrained oversized particles sliding along the upper surface of the filter screen 8021 through the waste outlet 8024 of filter unit 8020 simultaneously with passing the remaining portion of unfiltered slurry downwardly through the filter screen in a countercurrent direction to the aerated water stream to produce the filtrate. The upper surface of the filter screen is arcuately curved from side to side and concave in shape forming a trough which facilitates funneling the oversized particles along the screen towards the waste outlet 8024. The aerated water stream passing through the filter screen 8021 and entering the upper cavity of filter unit 8020 from below the screen agitates and dislodges the particles from the upper surface of the screen so they are swept away from the screen as to not impede slurry filtering performance. In some implementations, water may be injected into the lower cavity 8028b first followed by applying air pressure to the lower cavity to produce the aerated water stream.

Closed Slurry Recirculation Flow Loop—Density Measurement

Components will now be described which form part of the closed slurry recirculation flow loop 8002 used in conjunction with measuring the slurry density to determine an actual water/solids (agricultural) mass ratio for comparison to a target water/solids mass ratio desired for a flowable slurry capable of effective further sample processing and chemical analysis in analysis sub-system 3003 and its flow network. As previously described herein, sub-system 3003 ultimately measures analytes (e.g., chemical/elemental constituents) in the agricultural slurry to chemically characterize the sample. In one non-limiting example, the agricultural material to be analyzed for analytes (e.g., soil nutrient levels such as nitrogen, phosphorous, potassium, etc.) may be soil and the ratio is the water/soil (water to soil) ratio.

The present closed slurry recirculation flow loop 8002 shown in FIGS. 34-35 represents a modification of the recirculation flow loop 7059 shown in FIG. 4. In the present flow loop 8002, similar components are re-ordered in the slurry flow path and additional components are added as described below to optimize accuracy of the slurry density measurement for achieving the target water/solids ratio. Flow loop 8002 is configured and operable to promote stable flow rates while maintaining the slurry in a fully mixed homogenous condition which advantageously enhances the accuracy of the agricultural slurry density measurements. This information is ultimately used to add dilution water to the flow loop 8002 in order to achieve the target agricultural water/solids mass ratio.

In one embodiment, the slurry recirculation flow loop 8002 generally comprises in operable fluid coupling and communication a stirring device 8030, slurry recirculation pump 7080 which fluidly drives the recirculation flow through the closed recirculation flow loop, accumulator 8050, agricultural solids measurement device 8060, density measurement device 8070, and fine filter unit 8080. The circulation or flow path of slurry in the flow loop is indicated by the slurry flow arrows in FIGS. 34-35.

Stirring Device

Stirring device 8030 is the fluid gateway for introducing coarsely filtered slurry (filtrate) from mixing device 8010 via filter unit 8020 into the slurry recirculation flow loop 8002. The filtrate flows from the filter unit to stirring device 8030 via the motive force provided by the pressurized air line 8006 fluidly coupled to air source 8005 upstream of the filter unit if used, as previously described herein. In other embodiments, the filtrate may flow via gravity alone without air pressure assist to the stirring device or be pumped to the stirring device.

FIGS. 51-63 show various views of stirring device 8030 in isolation and greater detail. In one embodiment, stirring device 8030 may be a mixer type apparatus albeit specially configured to less aggressively agitate the slurry since larger bulk agricultural solids need not be broken down into finer particles for initially creating the slurry. Instead, the stirring device is configured and operable to more gently stir and maintain a homogenous mixture of the water and agricultural solids (e.g., soil) for density measurement in the closed slurry recirculation flow loop 8002 shown in FIGS. 34-35 and described elsewhere herein.

Stirring device 8030 generally comprises a sealable and vertically elongated hollow body formed by a housing 8094 defining a stirring chamber 8031 for holding a volume of filtered slurry (filtrate) and a rotatable blade mechanism 8035. Blade mechanism 8035 is configured and operable for agitating the agricultural slurry to a degree sufficient to keep the agricultural solids or particles in suspension in the water carrier fluid (diluent) of the slurry, but not over-agitate the slurry to entrain air which adversely affects slurry density measurements. Chamber 8031 forms an integral fluidic part of the slurry recirculation flow loop 8002 and slurry flow path. The stirring device and chamber operate at atmospheric pressure in one embodiment albeit the recirculation flow entering the chamber is pressurized by AODD slurry pump 7080.

The stirring device housing 8094 includes a top 8100, bottom 8101, right lateral side 8103, left lateral side 8104, front 8105, and rear 8106. In one embodiment, housing 8094 comprises multiple parts or segments which may include removable top cover 8090, top section 8091, mid-section 8092, and bottom section 8093. Sections 8091-8093 may be detachably or permanently coupled together, or a combination thereof. In one embodiment, at least bottom section 8093 is detachably coupled to mid-section 8092 via threaded fasteners 8095. Top cover 8090 may similarly be detachably coupled to top section 8091 of housing 8094 by threaded fasteners 8095. Note that only one or a few fasteners may be shown in the figures for brevity recognizing that other similar holes in the stirring device housing receive similar fasteners.

The fluid connections of stirring device 8030 which are in fluid communication with stirring chamber 8031 include slurry inlet 8032 which receives slurry from mixing device 8010, slurry recirculation inlet 8033a, slurry recirculation outlet 8033b, overflow port 8096, and waste outlet port 8049 to permit flushing and cleaning the stirring chamber with water between slurry runs. Overflow port 8096 expels excess slurry added into chamber 8031 from upstream mixing device 8010. The overflow port is configured for coupling to a hose/tube which is at atmospheric pressure. This in turn places the stirring chamber 8031 of stirring device 8030 at atmospheric pressure during operation.

In one embodiment, slurry inlet formed through top section 8091 of housing 8094 may be obliquely angled to vertical centerline 8040 of stirring device 8030 to deliver slurry at a similar angle inwards into the stirring chamber 8031. Each of these fluid connections may have an associated openable/closeable valve 8003 as shown in FIG. 34 (with exception of the overflow in one embodiment) for stopping or permitting flow through or from these connections.

Blade mechanism 8035 generally comprises blade assembly 8034 and a drive unit such as electric drive motor 8038 coupled to impeller or drive shaft 8036 of the blade assembly. Blade assembly 8034 further comprises one or more sets of impellers or blades 8037 mounted to drive shaft 8036 which are rotatable at a constant predetermined speed(s) or variable speeds via operation of motor 8038. Any suitable commercially-available fixed or variable speed electric motor may be used for this application.

In comparison to the more aggressively agitated mixing device 8010, stirring chamber 8031 may be at least as large in volumetric capacity to hold the entire contents of the agricultural slurry prepared in mixing chamber 8013 which is transferred to the stirring chamber 8031 for density measurement and water/solids mass ratio adjustment as further described herein. In one embodiment, the volumetric capacity of stirring chamber 8031 may be larger than mixing chamber 8013 of mixing device 8010 (e.g. about 20% or more) to ensure all of the slurry can be accommodated.

The blade mechanism 8014 of mixing device 8010 is intended to impart greater energy (i.e. energy input) to and provide more aggressive agitation of the slurry than the stirring device 8030 in order to break down the agricultural solids in the water carrier to form the initial relatively homogenous slurry mixture. This may be accomplished in several ways from a design standpoint. In some implementations, for example, blade mechanism 8014 of mixing device 8010 may be run at a higher rotational speed (rpm-revolutions per minute) than the blade mechanism 8035 of stirring device 8030 to more aggressively blend the bulk agricultural material and water together to create the slurry mixture. This is not necessary for the stirring device whose purpose is to simply agitate the already prepared slurry just sufficient to prevent the agricultural sample solids or particles from settling out of solution (i.e., keep the slurry in a homogenous condition for slurry density measurement). Without the stirring device, the slurry mixture is prone to solid separation which adversely affects obtaining an accurate slurry density. In one representative but non-limiting example, mixing device blade mechanism 8014 may have a rotational speed of about 15,000 rpm coupled with multiple, more aggressive sets of spaced apart sets of blades 8016 on impeller/drive shaft 8017 as shown which are configured for greater agitation of the agricultural material and water mixture. By contrast, the stirring device blade mechanism 8035 may have a single set of blades 8037 on the blade assembly drive shaft 8036 and a slower rotational speed on the order of about 1,000 rpm as one non-limiting example. Accordingly, in some embodiments, the mixing device blade mechanism 8014 may have a rotational speed at least 10 times greater than the stirring device 8030. Numerous other speeds may be used as appropriate depending on the nature of the agricultural material which forms the sample.

In other embodiments to achieve more aggressive mixing in the mixing device 8010, blade 8016 lengths may be different such that the mixing device blades have a greater length than the stirring device 8030, thereby producing higher blade tip velocities even at the same or slower rotational speeds than the blades in the stirring device. As noted above, the stirring device blade mechanism 8035 may have less blades 8037 and/or a less aggressive blade configuration to more gently agitate the slurry than blades 8016 of mixing device 8010. Whether based on rotational speed of the blade assembly, number and/or length of the blades, configuration thereof, or blade tip velocities, the more aggressive mixing of the slurry in mixing device 8010 is performed at a greater energy or power input to the slurry than in the stirring device 8030 to break down the solids in the initial slurry being prepared. The power consumption of the drive motor 8016 of mixing device 8010 is therefore greater than the power consumption of drive motor 8038 of stirring device 8030 in all preferred mixing scenarios.

Figure 61:
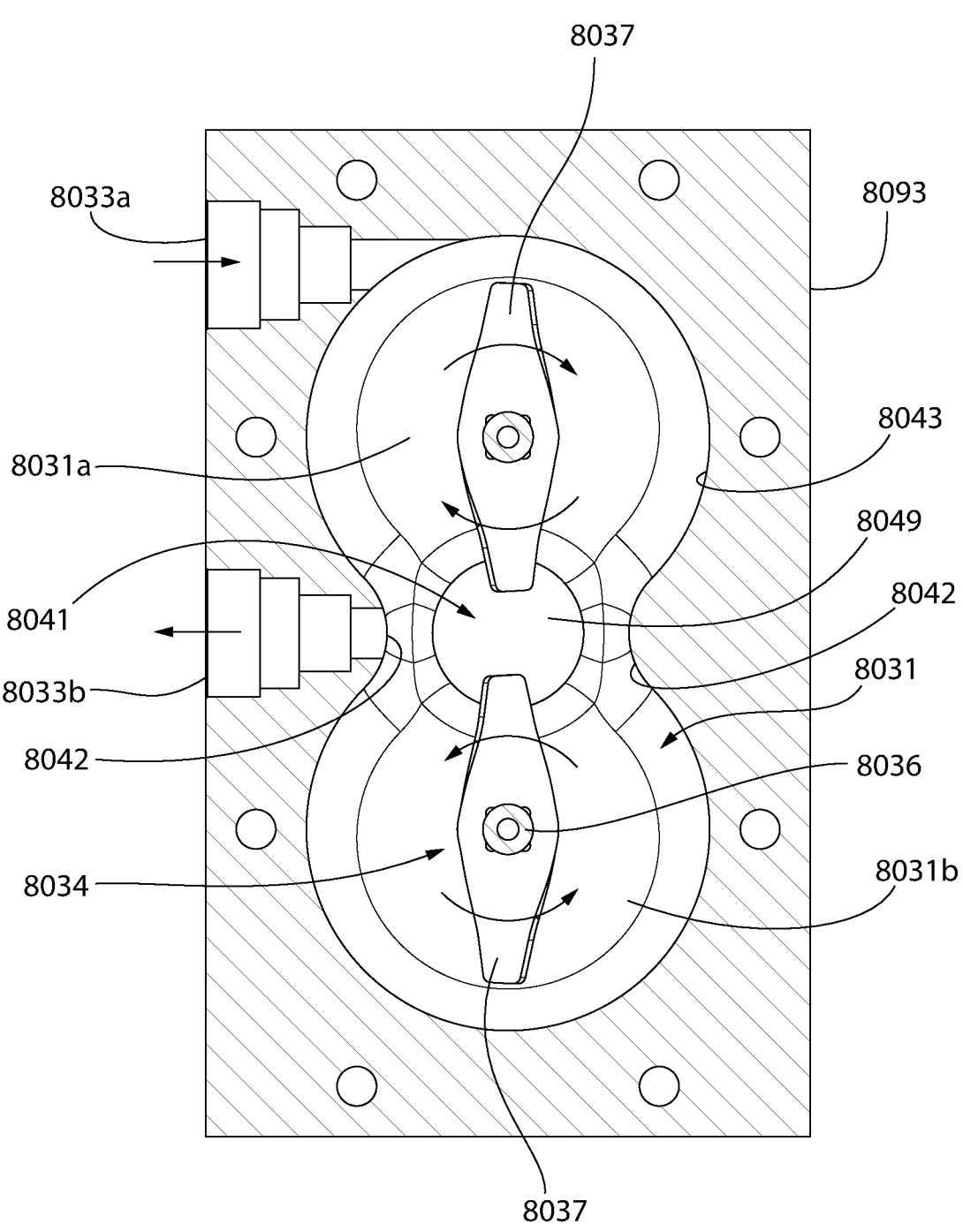
FIG. 61 is a lower transverse cross sectional view thereof showing the blade assembly.
Figure 62:
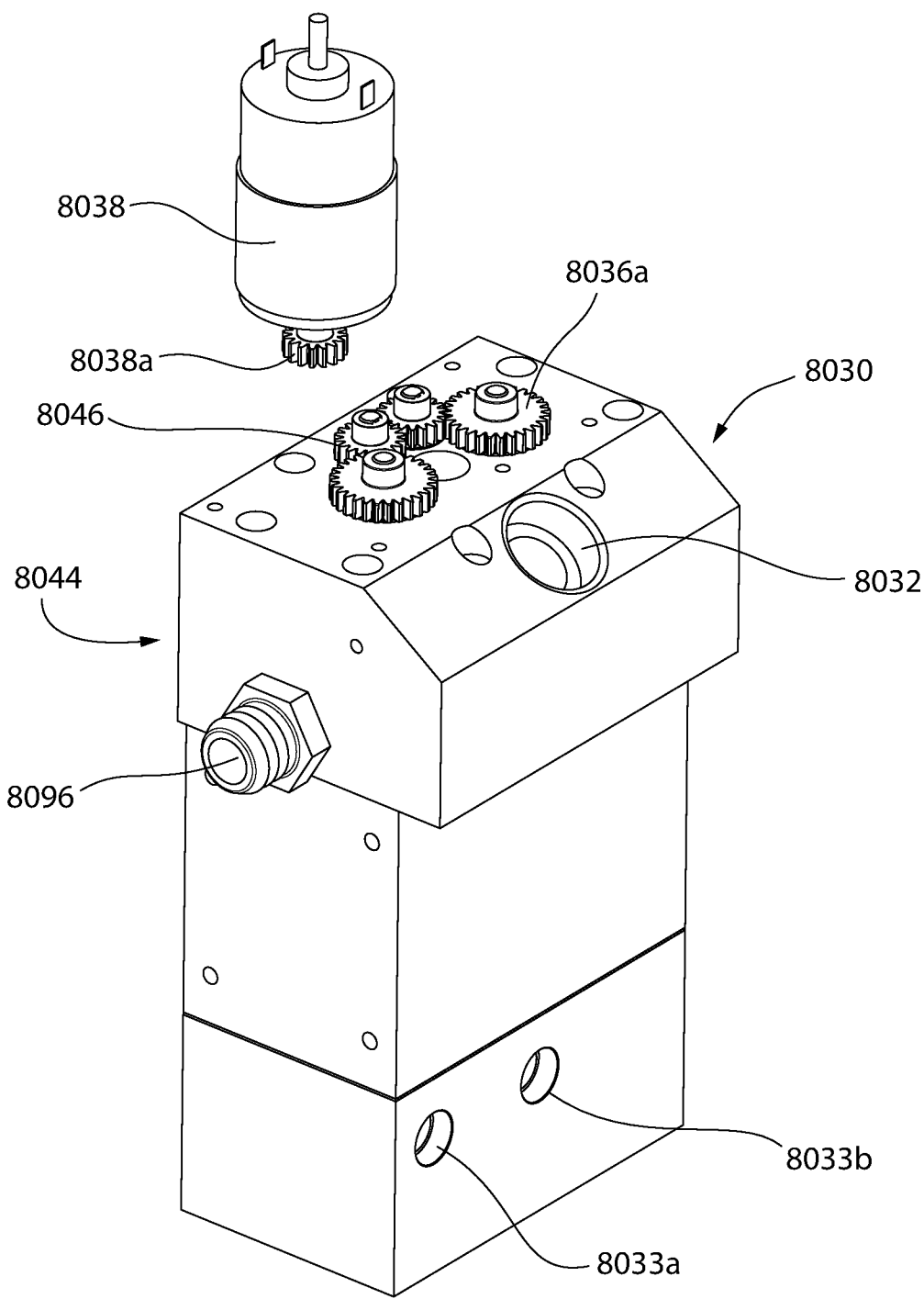
FIG. 62 is an exploded top perspective view thereof showing the motor separated out and portions of the drive gearing.
Figure 63:
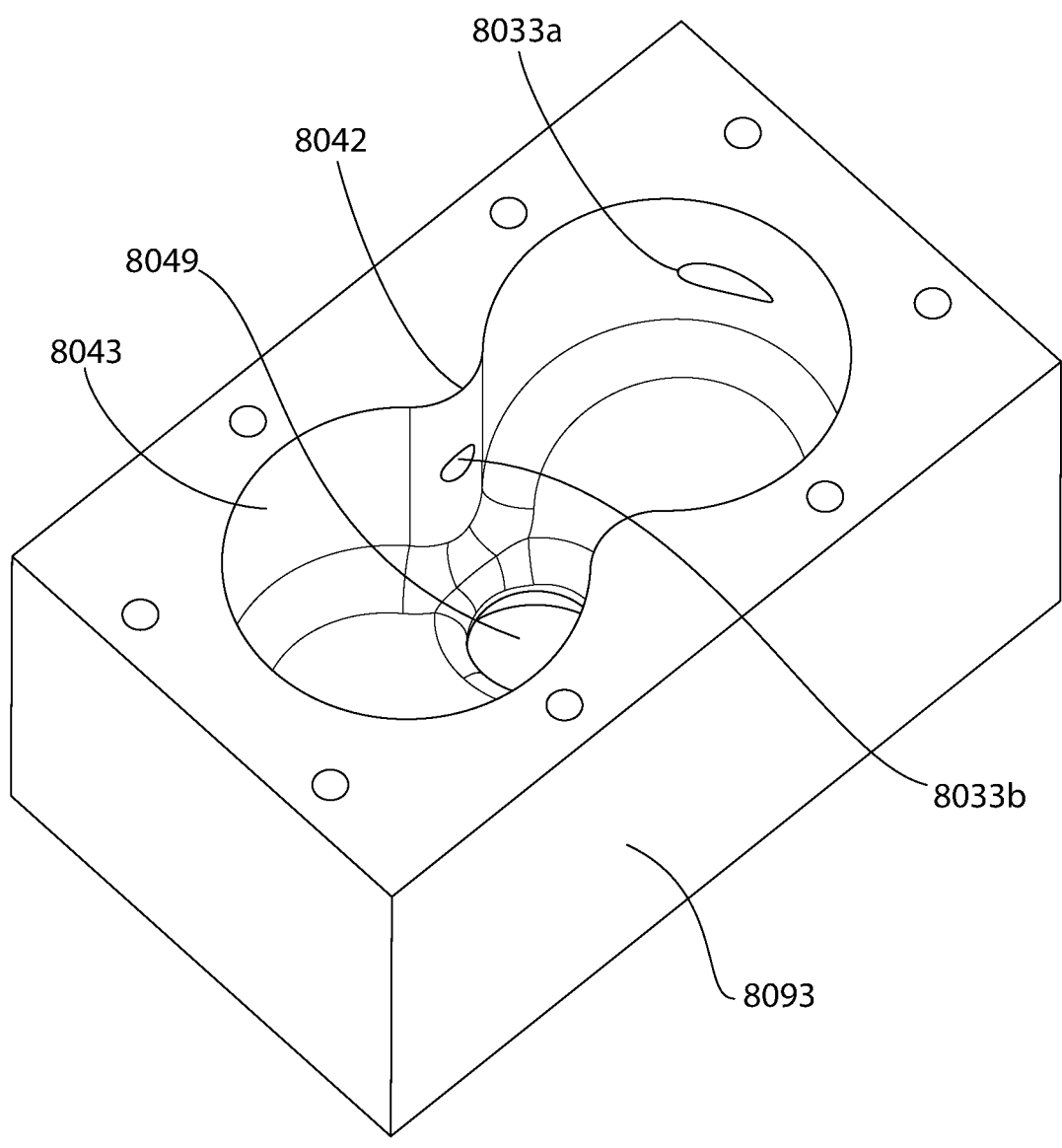
FIG. 63 is a perspective view of the bottom section of the stirring device.

The shape or configuration of the mixing and stirring chambers 8013, 8031 may also be different in view of the different functions for the mixing device 8010 and stirring device 8030. Referring to FIG. 61, mixing chamber 8031 in some embodiments may have an hourglass or peanut or "figure eight (8)" configuration with a pinched middle waist area as further described herein designed to accommodate two separately rotating drive shafts 8036 which may be provided for improved slurry stirring action. The twin drive shafts 8036 may also be counter rotating relative to each other to further enhance the slurry stirring action in some implementations. These features help stir the slurry while reducing vortexing (air that "tornados" down the shaft) because it is undesirable to introduce air into the slurry recirculation flow loop 8002 as it adversely affects slurry density measurement accuracy. In addition, the slurry circulating in slurry recirculation flow loop 8002 may be reintroduced or returned to stirring chamber 8031 via recirculation inlet 8033*a* tangentially to further reduce air entrainment, as described below.

Additional aspects and details of stirring device 8030 and the foregoing features will now be described. With continuing reference in general to FIGS. 51-63, stirring device 8030 may comprise a vertically elongated body defining a vertical centerline 8040 passing through the geometric center of the stirring device. The body concomitantly defines vertically elongated stirring chamber 8031 in which the pair of blade assemblies 8034 are positioned. Stirring chamber 8031 may be non-circular and oblong in shape having a greater lateral width side to side than depth front to back (best seen in FIG. 61). The blade assembly shafts 8036 may be oriented parallel to each other as shown.

Stirring chamber 8031 may be laterally/horizontally segregated into a first and second sections 8031*a*, 8031*b* separated by a narrowed throat area 8041 defined by a pair of opposing and inwardly projecting baffle protrusions 8042 on opposite sides of the centerline 8040 (see, e.g., FIG. 61). The baffle protrusions may be convexly and arcuately shaped extending both inwards horizontally and vertically for a majority of the height of stirring chamber 8031 (see, e.g., FIG. 59). One blade assembly 8034 is centered in each section 8031*a*, 8031*b* of the chamber between the sides of the stirring device as shown. The baffle protrusions 8041 function to enhance the slurry stirring action so that the slurry cannot just travel around the outside or peripheral portion of chamber 8031 along the interior sidewalls 8043 of the stirring device body to avoid mixing. The baffle protrusions 8042 force the slurry to flow inwards towards vertical centerline 8040 in throat area 8041 and mix which aids to maintain a homogenous slurry mixture of agricultural solids and water. In one embodiment, slurry inlet 8032 formed through top section 8091 of housing 8094 may be obliquely angled to vertical centerline 8040 of stirring device 8030 to introduce slurry at a similar angle inwards into the stirring chamber 8031 in throat area 8041 at the top ends of baffle protrusions 8042 (see, e.g. FIG. 59). Interior bottom wall 8097 of stirring device 8030 within the stirring chamber 8031 may be sloped downwards and inwards towards centrally located waste outlet 8049 in the bottom wall of stirring chamber 8031 from each side of the stirring device to effectively flush sediment from the chamber when cleaned periodically with flushing water between different runs of slurry preparation.

The stirring device 8030 further includes a drive mechanism for operating blade assemblies 8034. In one embodiment, the drive mechanism comprises a gear box 8044 which houses a cooperating gear mechanism or train 8045 comprising a plurality of intermeshed gears. The shaft of motor 8038 includes the drive gear 8038*a* and each blade assembly comprises a driven gear 8036*a* operably coupled to and rotated by the motor drive gear via intermediary gears 8046 (see, e.g., FIG. 60). Gear box 8044 may be located at the top of the stirring device proximate to motor 8038. Gear box 8044 may be formed by top cover 8090 in one embodiment (see, e.g., FIGS. 58-59). Gear train 8045 is operably coupled to motor 8038 and each of the blade assembly shafts 8036. Motor 8038 operates to actuate the gear train 8045 which in turn rotates the blade assemblies 8034. In some embodiments as previously described herein, the blade assemblies may be rotated in counter/opposite rotational directions to each other to enhance mixing the agricultural slurry (see, e.g., FIG. 61 rotational arrows). The gear train 8025 is configured to produce this type of counter rotational movement of the pair of blade assemblies. Intermediary gears 8046 may be configured and arranged to produce the counter rotational movement of blade assemblies 8034 (see, e.g., FIG. 60). In other embodiments, the blade assemblies may be rotated in the same rotational direction. It bears noting that other gearing arrangements are possible. In addition, other methods in lieu of gearing may be used for rotating the blade assemblies such as belt drives or pneumatic air drives via an air vane coupled to the main drive shaft which in turn drives the gear train.

In operation, filtered slurry flows into the stirring chamber 8031 via inlet 8032 from the coarse filter unit 8020. Blade assemblies 8034 are rotated via the foregoing gear mechanism to agitate the slurry and prevent solids from settling out of suspension. If the slurry recirculation flow loop 8002 is initially empty, the slurry may at least partially fill the loop depending on the flow loop tubing diameter. In some cases, therefore, the slurry may not completely fill the loop until the slurry recirculation pump 7080 is started such that the pump is started when slurry is initially introduced into the flow loop at the onset via the stirring device 8030. In either case, slurry recirculation pump 7080 will begin to circulate slurry through the loop (see, e.g., FIGS. 34-35). Slurry is pumped directly into the recirculation inlet 8033*a* of stirring device 8030 where it is agitated to maintain a homogenous consistency. The slurry then exits the stirring device via recirculation outlet 8033*b* and returns to the flow loop 8002 to continue circulating through the loop and other devices shown under the motive force of pump 7080. Any excess slurry in the flow loop is expelled through overflow port 8096.

Figure 59:
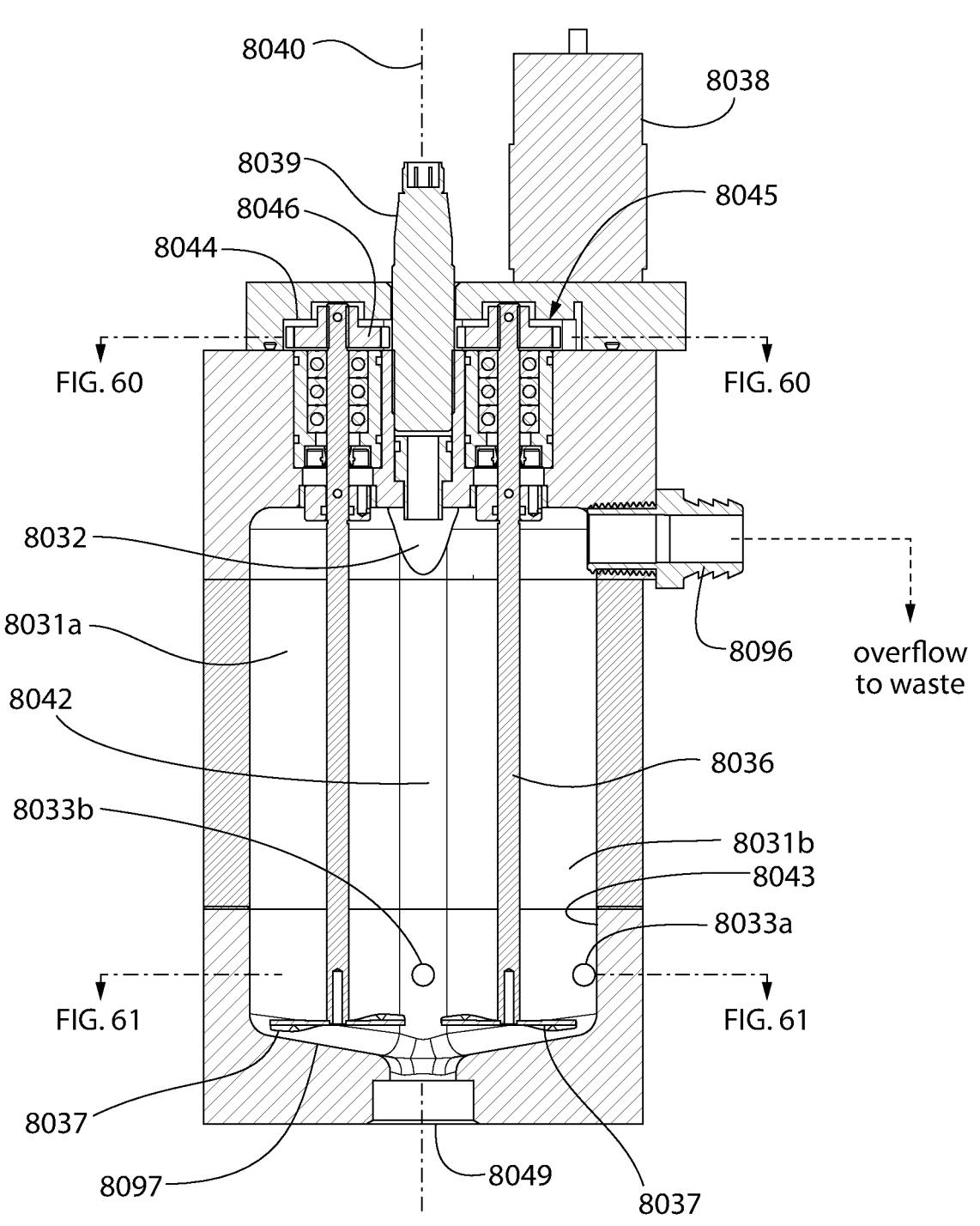
FIG. 59 is a front longitudinal cross sectional view thereof.
Figure 60:
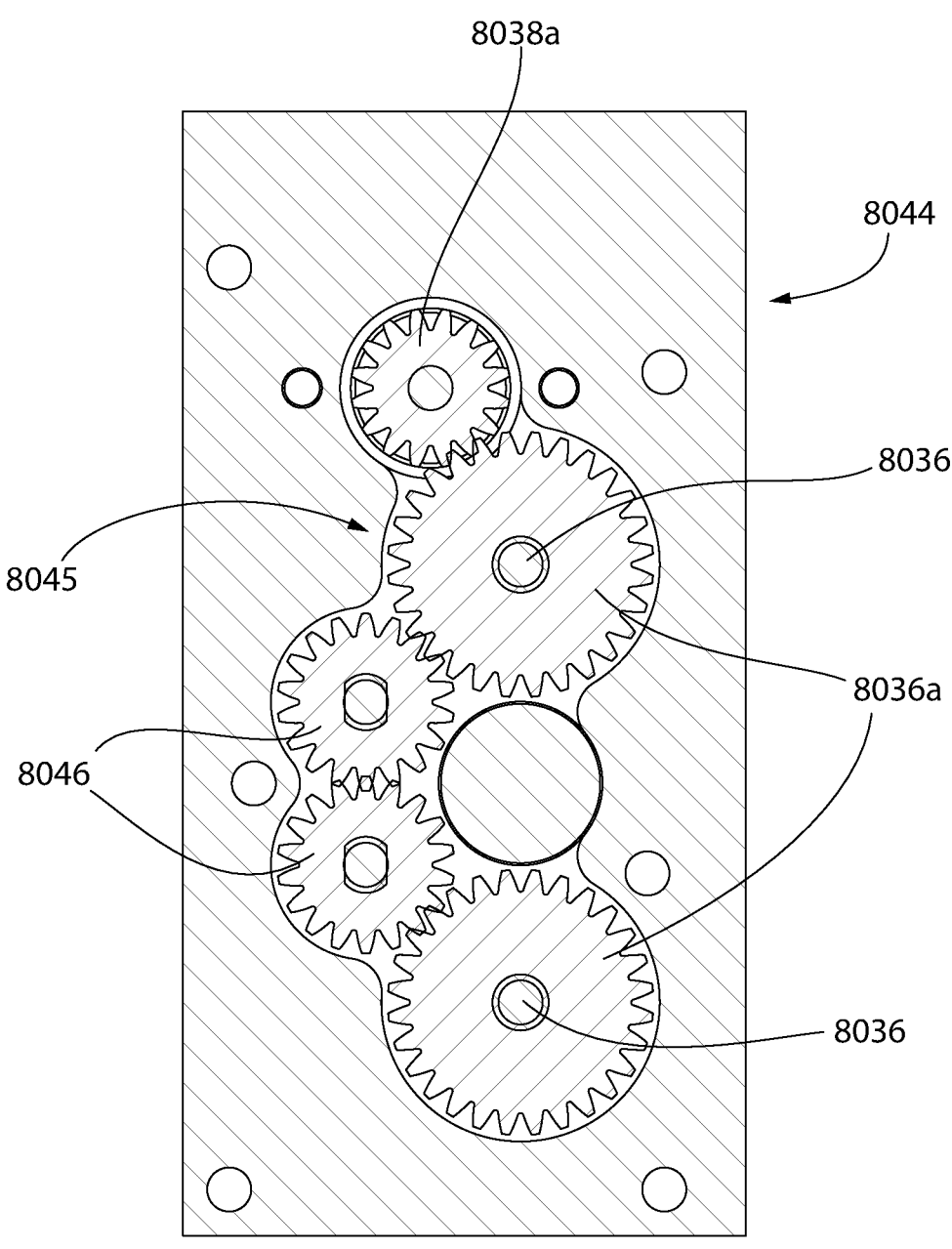
FIG. 60 is an upper transverse cross sectional view thereof showing the drive gearing.

It bears noting that the recirculating slurry from slurry recirculation flow loop 8002 flows tangentially into and enters stirring chamber 8031 (via slurry recirculation inlet 8033*a*) in one of the two circular sections of stirring chamber 8031 such as for example section 8031*b* (see, e.g., FIGS. 59 and 61). In one preferred but non-limiting embodiment, the slurry is reintroduced tangentially along one of the sidewalls 8043 of section 8031*b* of the stirring chamber to reduce air entrainment in the slurry which adversely affects slurry density measurements as previously described herein. Slurry may be extracted from chamber 8031 within the narrow throat area 8041 between each chamber section

8031*a*, 8031*b* where the slurry will tend to be fully blended and agitated in a homogenous state.

In some embodiments, operation of the blade assemblies 8034 concerning the degree of agitation imparted to the slurry in stirring device 8030 may be controlled and automatically adjusted by system controller 2820 based on the level of slurry (and concomitantly volume thereof) in stirring chamber 8031. When slurry level is lower, it is desirable to rotate the blade assemblies at a slower speed (rpm) to reduce agitation thereby minimizing air entrainment in the slurry which adversely affects slurry density measurements. When slurry level is higher, the blade assemblies may be sped up to ensure that the slurry mixture remains homogeneous and solids are kept in suspension.

To achieve the foregoing operating scheme, a level sensor 8039 may be provided which is configured and operable to measure the level of slurry in chamber 8031 of stirring device 8030 in real time. Any suitable commercially-available sensor may be used, such as for example without limitation an ultrasonic level sensor. Level sensor and motor 8039 may be operably and communicably linked to system controller 2820 to control the slurry agitation speed. Motor may be a variable speed motor whose speed is adjusted based on detected slurry level by controller 2820 to achieve the desired degree of agitation of the slurry by decreasing or increasing the rotational speed of the blade assemblies 8034. Motor 8038 may therefore include speed control circuitry responsive to control signals from controller 2820 to adjust the speed of the motor based on the slurry level.

The method or process for controlling blade assemblies 8034 of stirring device 8030 may be summarized as the controller 2820: detecting a level of slurry in stirring chamber 8031 via level sensor 8039; increasing or decreasing the speed of motor 8038 operably coupled to the pair of blade assembly 8034 based on the detected level; and rotating the blade assemblies at a rate or speed corresponding to the speed of the motor. When controller 2820 detects a first level of slurry in chamber 8031, the controller rotates the blade assemblies at a first speed. When controller 2820 detects a second level of slurry, the controller rotates the blade assemblies a second speed different than the first speed. When the first level of slurry is lower than the second level of slurry, the controller rotates the blade assemblies at a slower speed than the second level of slurry, and vice-versa. Other variations of the variable blade speed operation are possible. In some embodiments, the blade assemblies may be rotated a constant speed regardless of slurry levels in stirring chamber 8031 which may depend on the type of agricultural slurry which has been prepared and concomitant propensity of solids to fall out of suspension or other factors.

Accumulator

FIGS. 44-50 show the accumulator 8050 in isolation and greater detail. Accumulator functions to dampen pressure surges or pulsations in the slurry circulating through the slurry recirculation flow loop 8002. The accumulator 8050 may be a straight flow-through design in one embodiment in which flow enters, travels through, and exists the accumulator in a linear or straight flow path along a single axis. Accumulator 8050 has a longitudinally elongated and split body generally comprising a first half section 8051*a* and second half-section 8051*b* removably coupled together such as via threaded fasteners. Other detachable coupling methods may be used. When coupled together, the half-sections 8051*a*, 8051*b* define a longitudinally elongated internal cavity 8053.

A longitudinally elongated elastomeric resiliently deformable diaphragm 8054 extends for at least a full length and width of the cavity 8053, and preferably is slightly larger in width and length than the cavity. Diaphragm 8054 may be flat and oblong in shape (best shown in FIGS. 46-47) to conform to the horizontally elongated configuration of the accumulator cavity 8053. The peripheral edges of diaphragm 8054 may be sandwiched and trapped between the first and second half-sections 8051*a*, 8051*b* of the body which retains the diaphragm in position. This divides cavity 8053 into an upper gas sub-cavity 8053*a* and lower slurry sub-cavity 8053*b* fluidly isolated from the gas sub-cavity. Each upper and lower sub-cavity may have a domed concave shape in transverse cross section (best seen FIG. 50). When the diaphragm reaches full displacement (full conformance to the cavity wall), it does not put undue stress on the diaphragm by making it conform to any tight angled corners which could tear the diaphragm over numerous operating cycles due to fatigue failure. Sub-cavity 8053*a* is fluidly coupled to a pressurized gas port 8057 for establishing a precharged gas pressure for the accumulator via connection to a source of pressurized inert gas. The gas precharged upper sub-cavity 8053*a* is fillable with the pressurized inert gas such as air or nitrogen as examples to pre-charge the accumulator 8050 with a volume of gas to compensate for pressure fluctuations in the slurry flowing through the slurry recirculation flow loop 8002. Such pressure fluctuations (increases/decreases) may be attributable to starting/stopping the slurry recirculation pump 7080 causing flow and pressure fluctuations, or other factors associated with slurry processing system. Some pumps have a design that produces pressure pulses which may be of significant magnitude, which can create various issues including adversely affecting slurry density measurement.

Figures 44, 45, 48, 50:
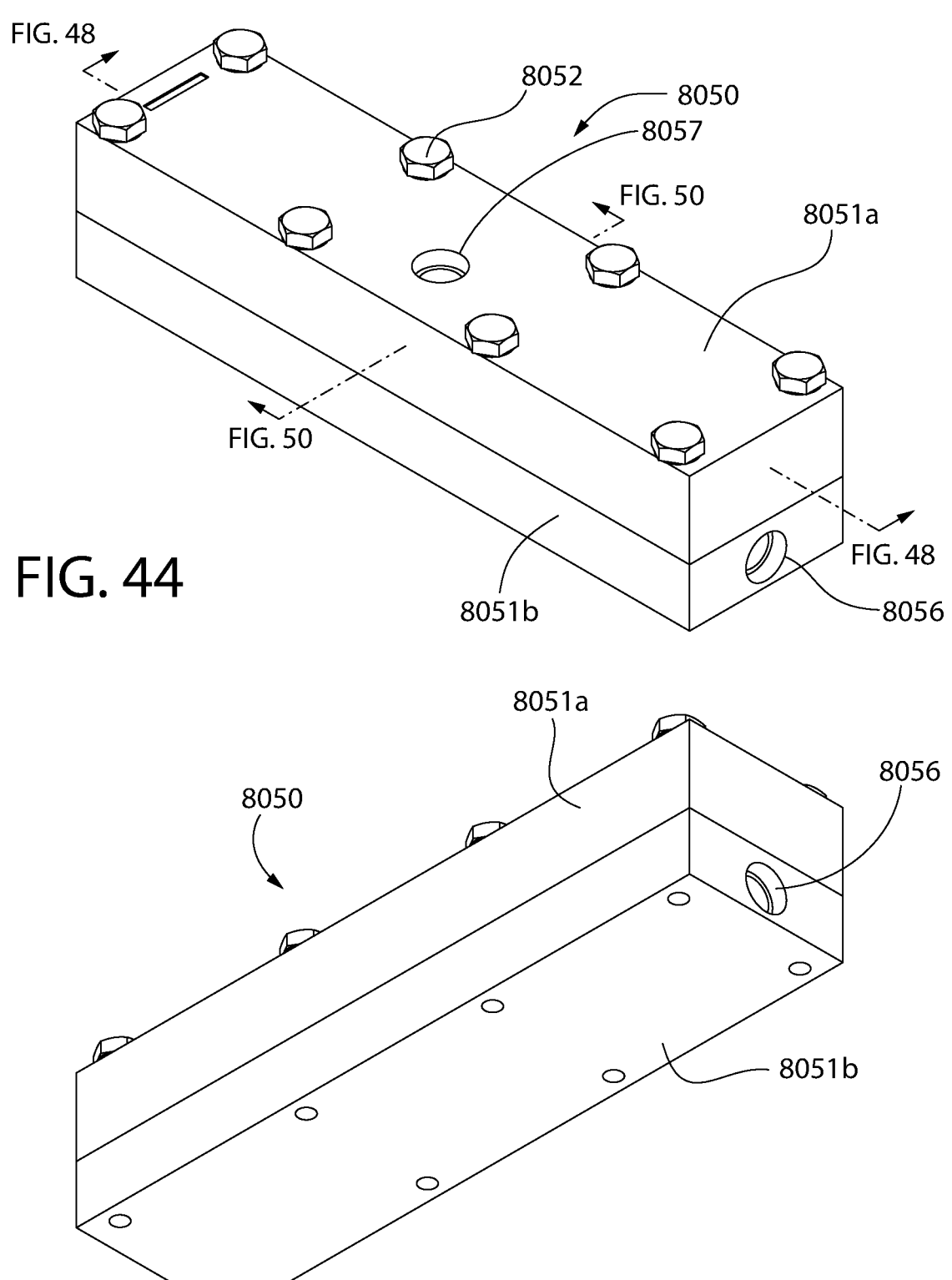
FIG. 44 is a top perspective view of the accumulator of the agricultural slurry preparation system.
FIG. 45 is a bottom perspective view thereof.
FIG. 48 is a longitudinal cross sectional view thereof.
FIG. 50 is a transverse cross sectional view thereof.
Figure 46:
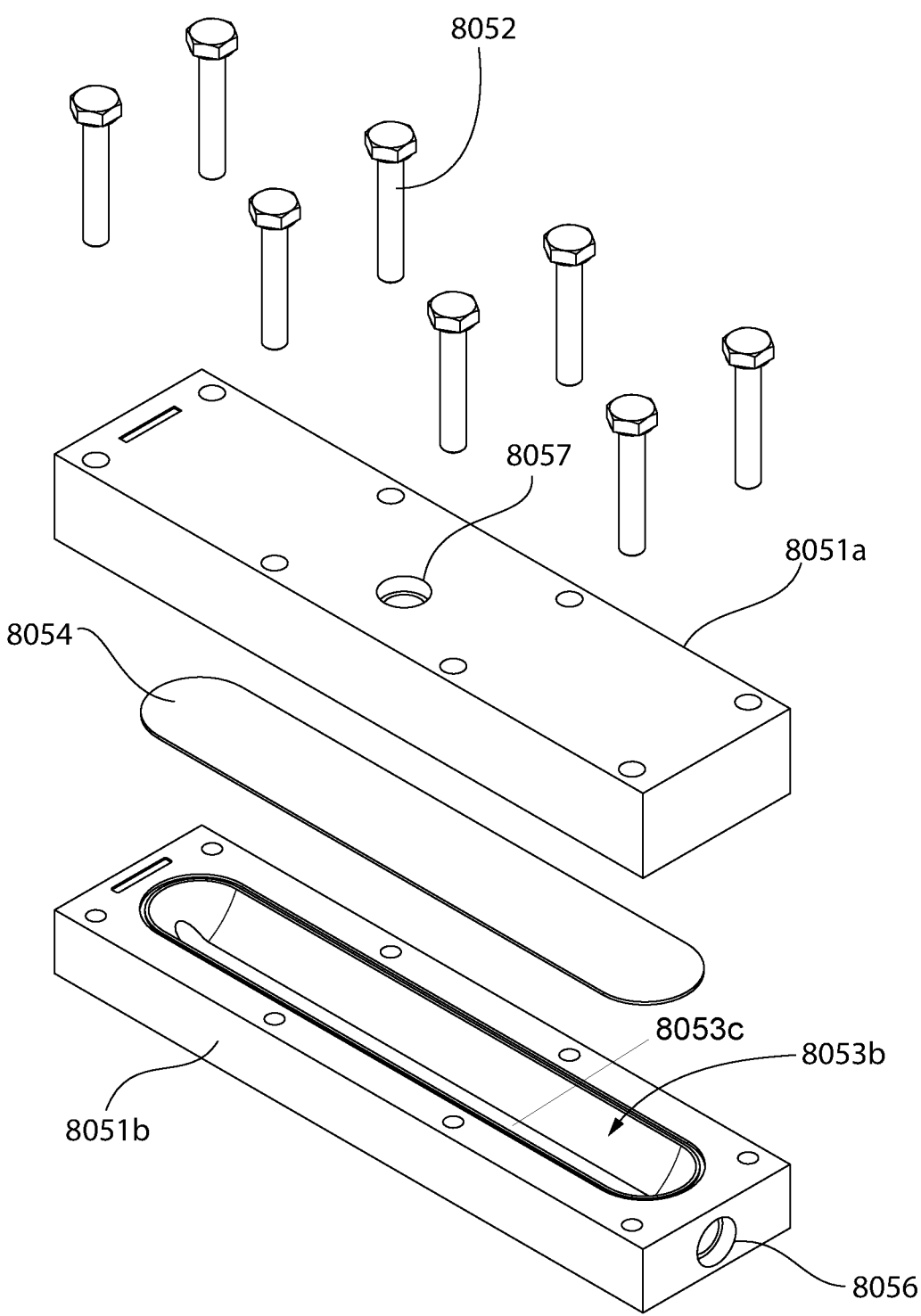
FIG. 46 is a top exploded perspective view thereof.
Figure 47:
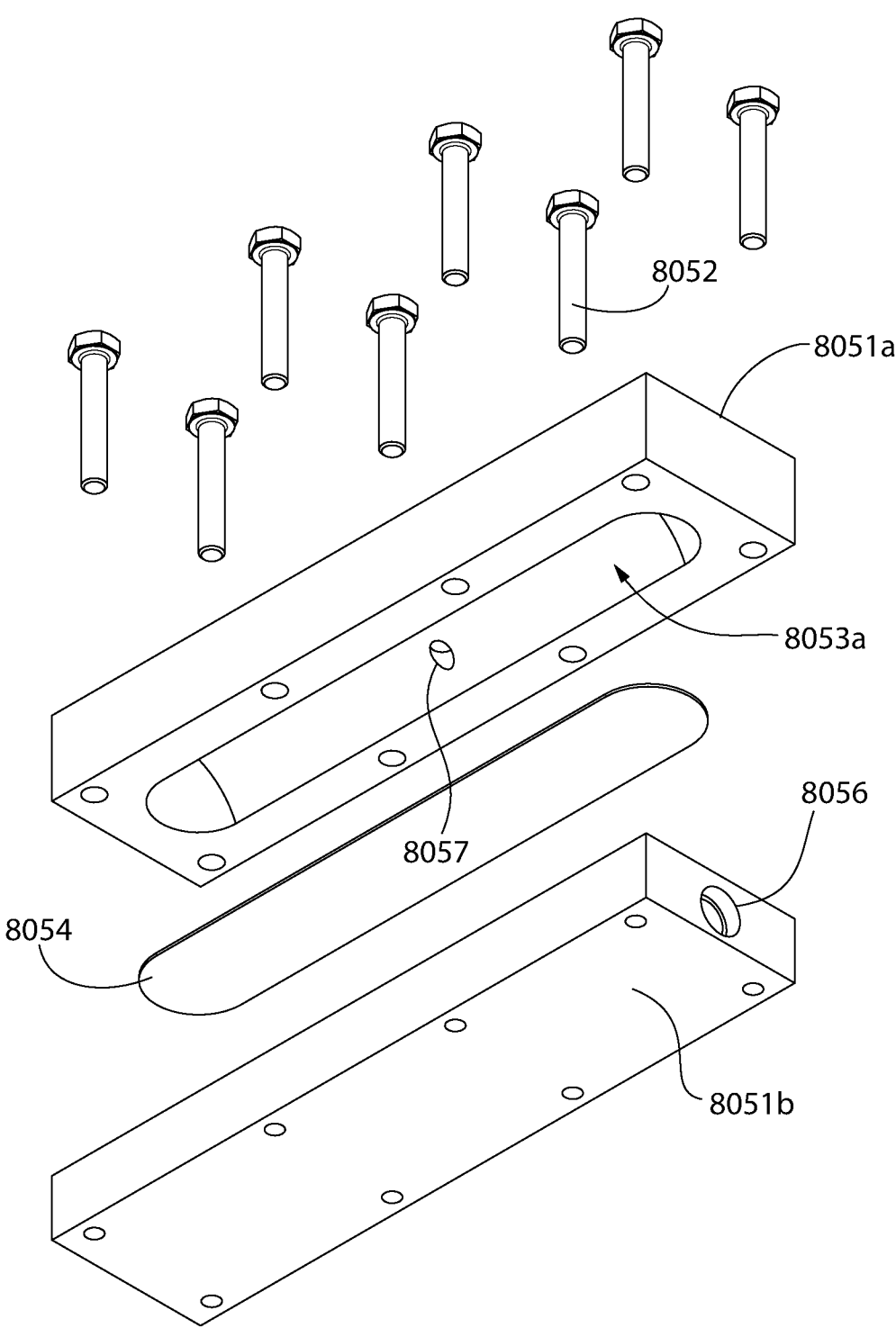
FIG. 47 is a bottom exploded perspective view thereof.
Figure 48:
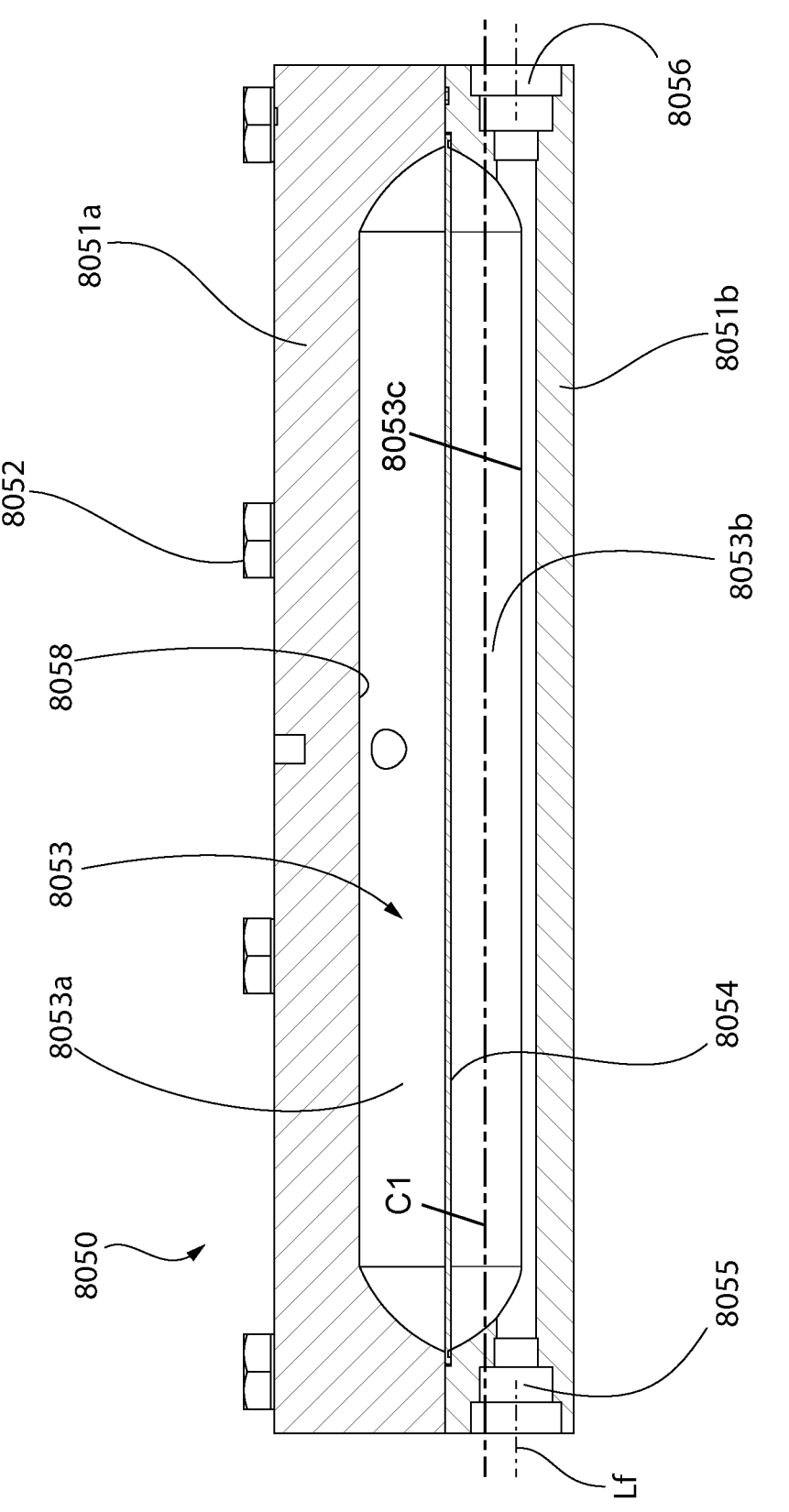
Figure 49:
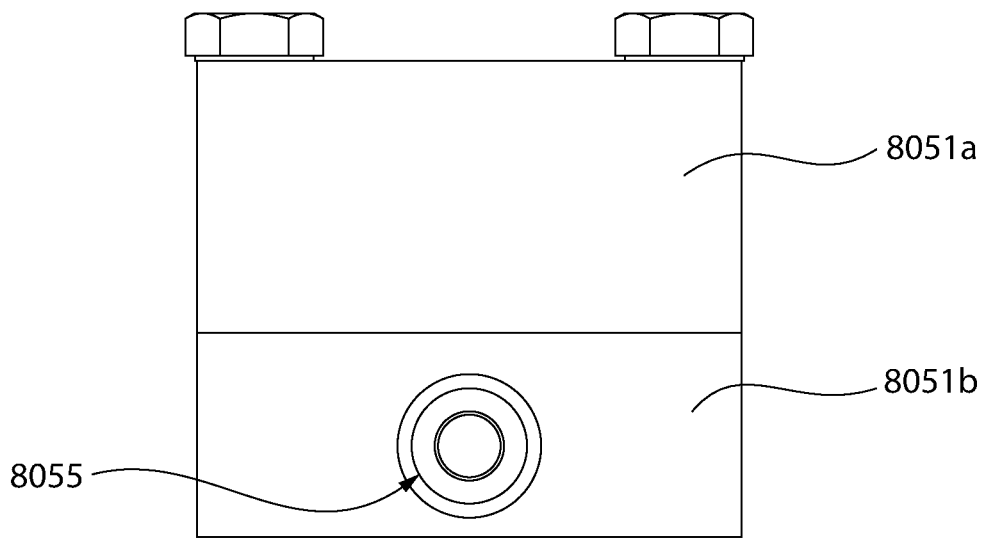
FIG. 49 is an end view of the inlet end of the accumulator.
Figure 50:
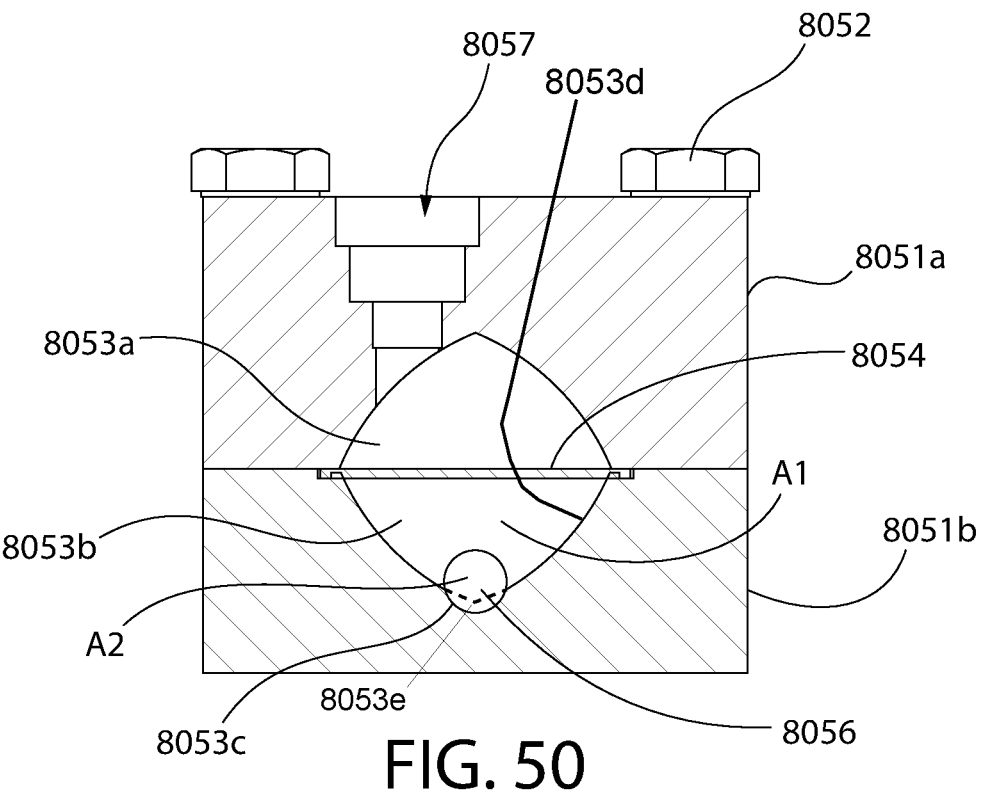
Figure 51:
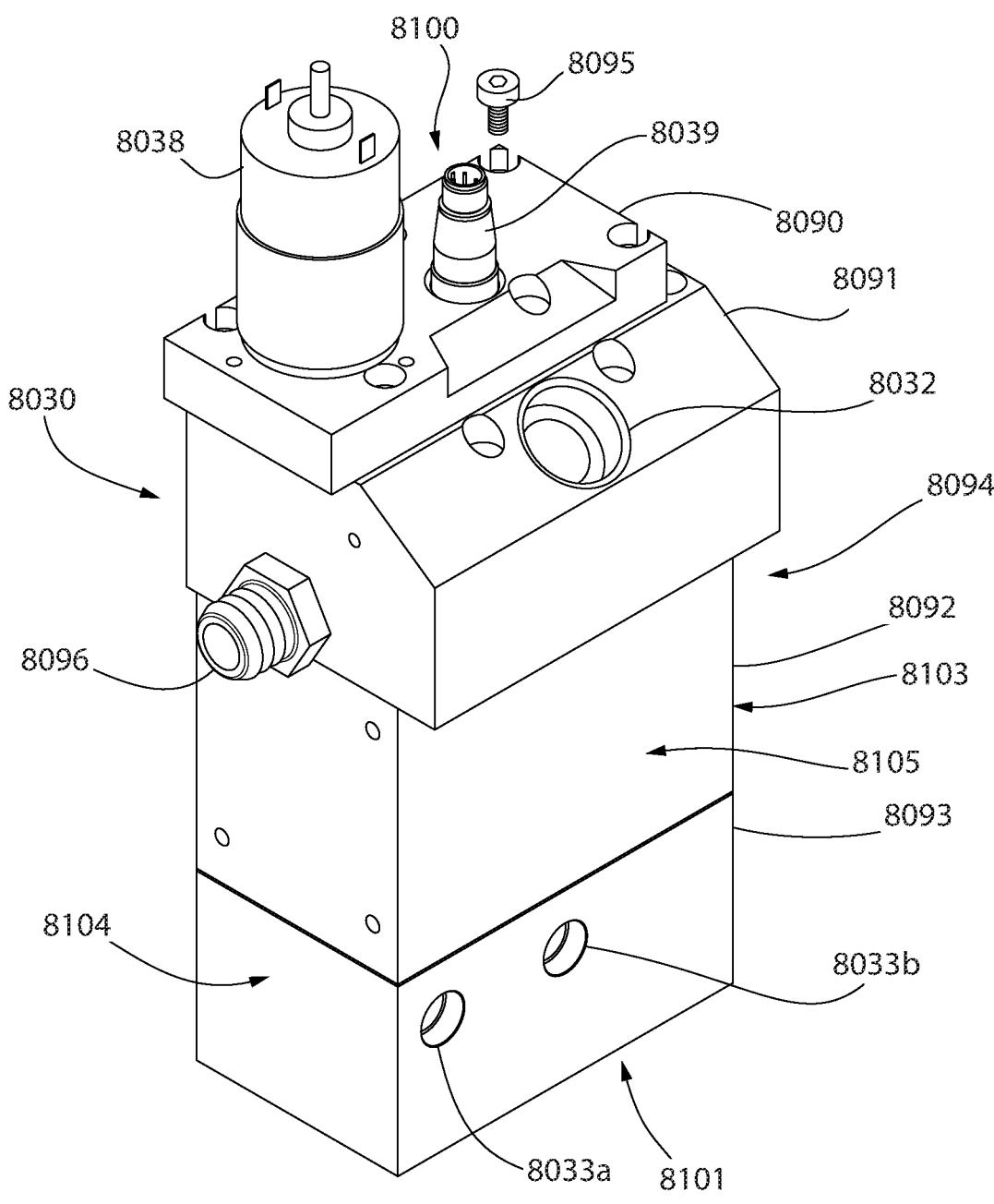
FIG. 51 is a top perspective view of the stirring device of agricultural slurry preparation system.
Figure 52:
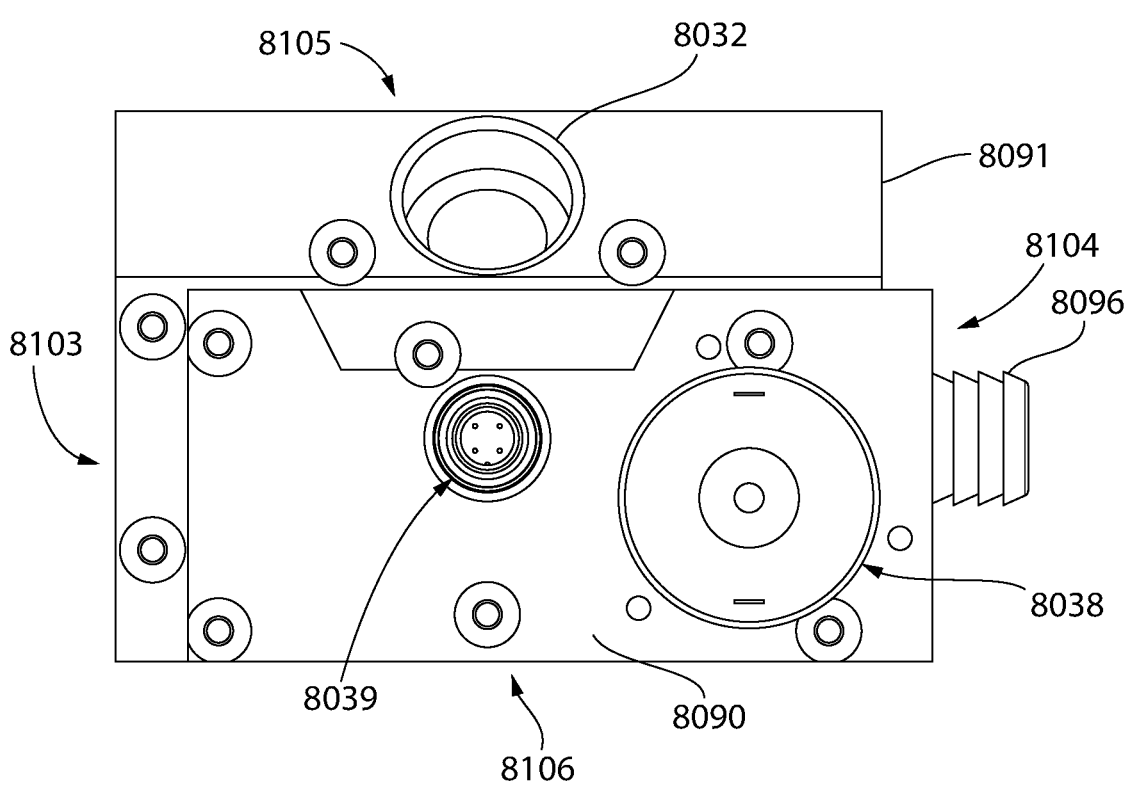
FIG. 52 is a top view thereof.
Figure 53:
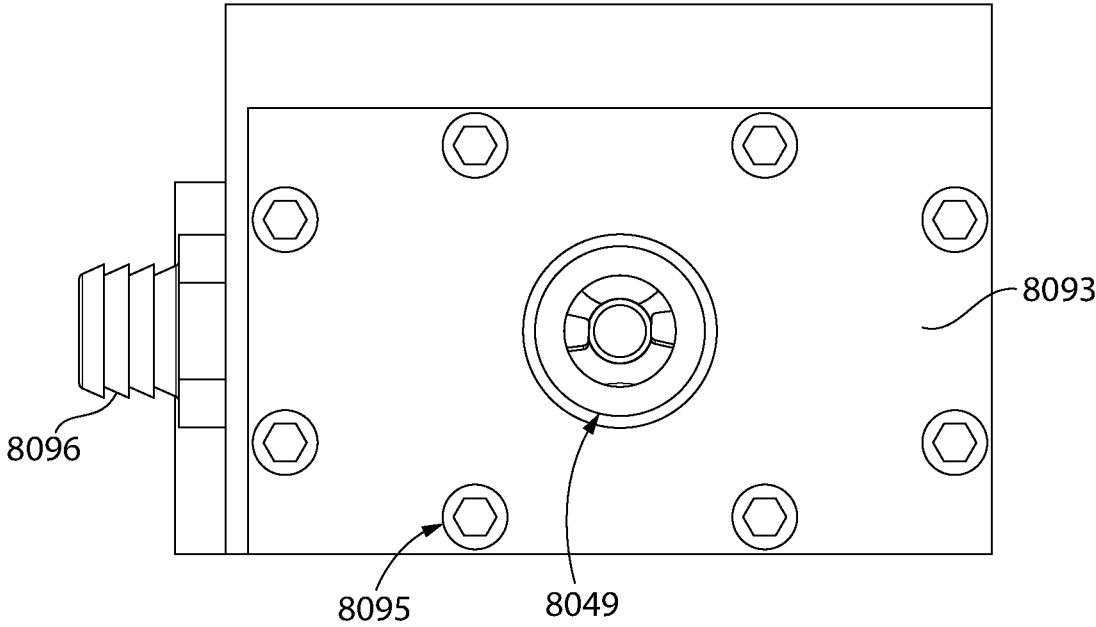
FIG. 53 is a bottom view thereof.
Figure 54:
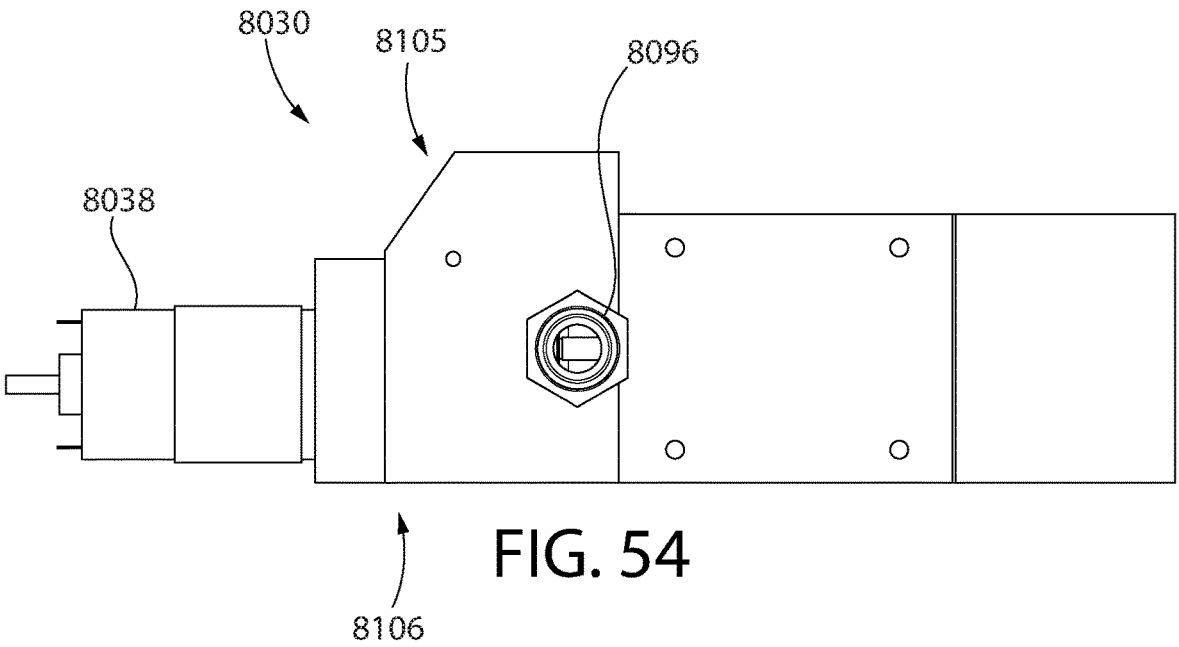
FIG. 54 is a left side view thereof.
Figure 55:
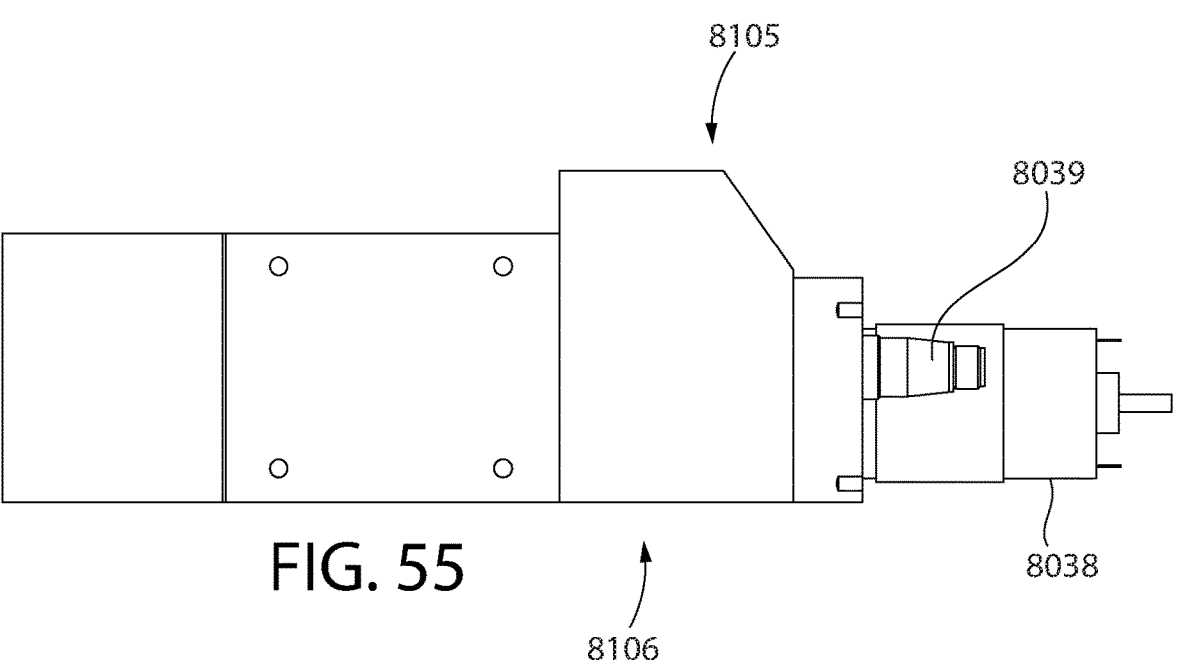
FIG. 55 is a right side view thereof.
Figures 56, 57:
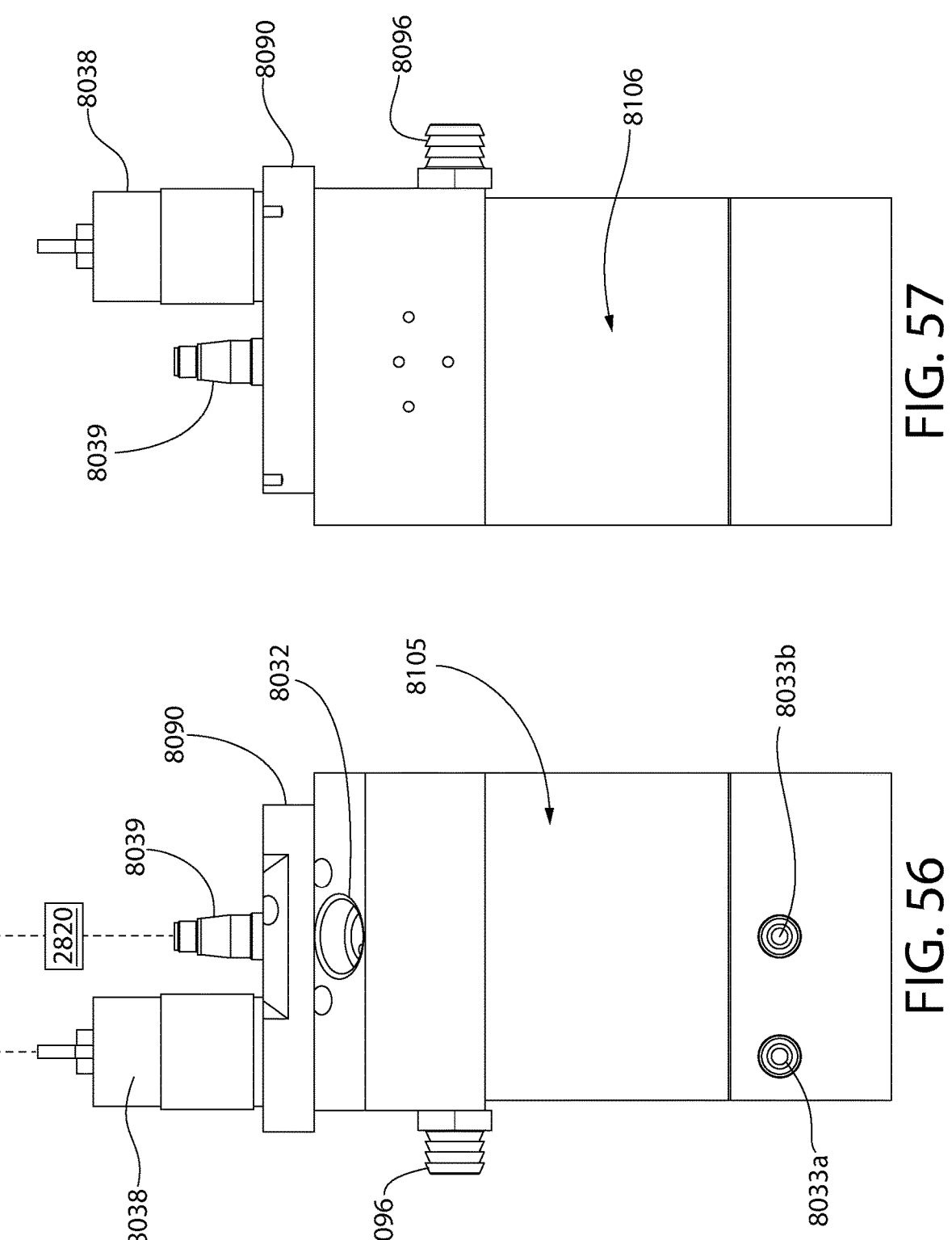
FIG. 56 is a front view thereof.
FIG. 57 is a rear view thereof.
Figure 58:
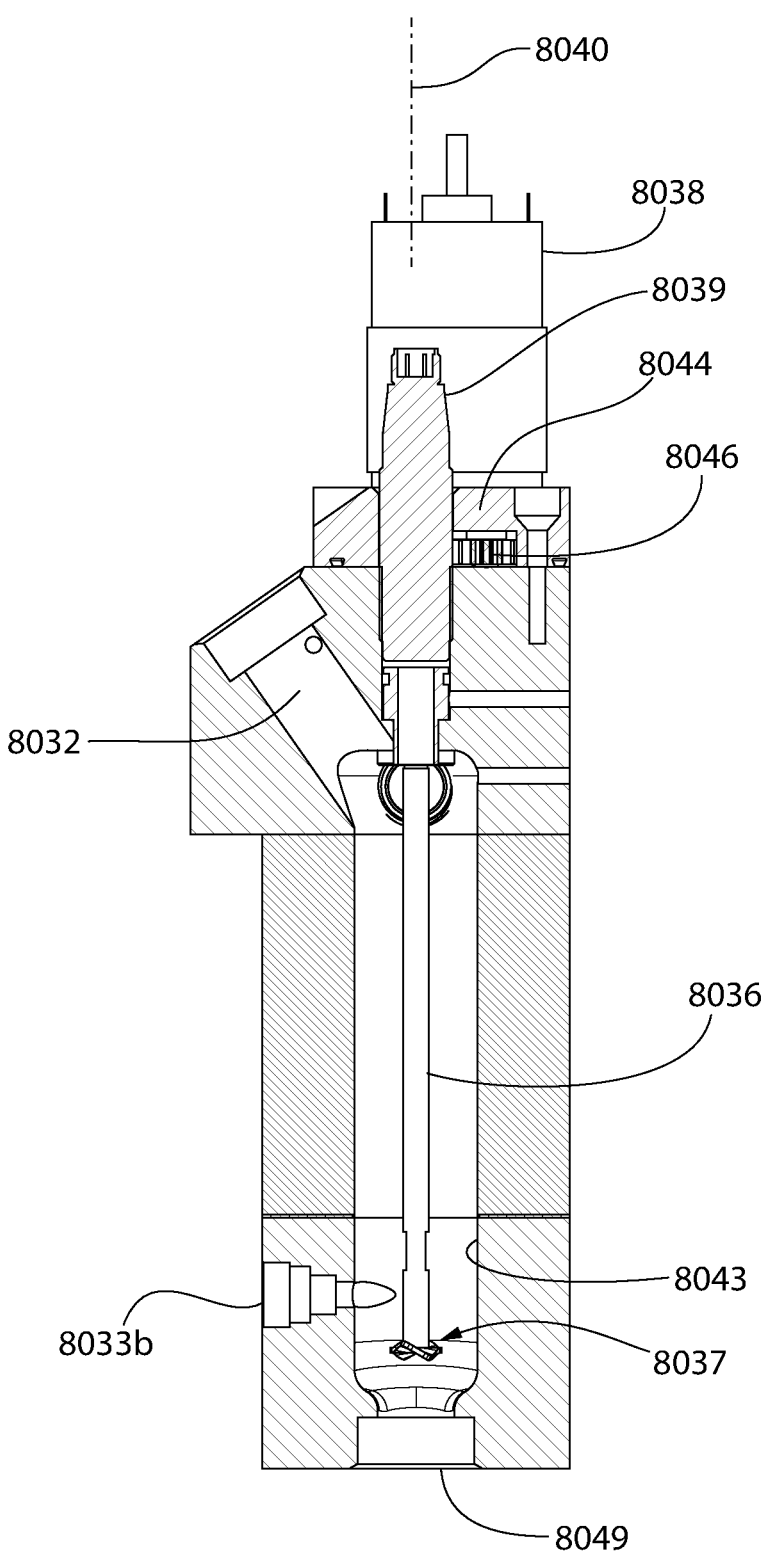
FIG. 58 is a side longitudinal cross sectional view thereof.

The slurry sub-cavity 8053*b* receives slurry and defines the main portion of the linear/straight slurry flow passage extending through the accumulator from end to end. The lowermost bottom portion of sub-cavity 8053*b* may include an integrally formed longitudinally-extending through 8053*c* having an arcuately curved bottom surface in transverse cross section. Trough 8053*c* may have a semi-circular transverse cross-sectional shape as best seen in FIG. 50 which is different than the transverse cross-sectional shape of the lower sub-cavity 8053*b*. The trough 8053*c* advantageously discourages the diaphragm from sealing off the outlet during periods of extreme displacement due to slurry pressure fluctuations by providing a flowpath that is difficult for the diaphragm to fully obstruct, and also helps keep any sediment moving quickly through the accumulator in a linear direction to discourage deposition and clogging of the accumulator.

The slurry sub-cavity 8053*b* is fluidly coupled to a slurry inlet 8055 at one end of the second half-section 8051*b* and a slurry outlet 8056 which may be formed at an opposite end in lower slurry sub-cavity 8053*b*. Inlet 8055 is coaxially aligned with outlet 8056 defining a longitudinal flow axis Lf extending therebetween along a length of the accumulator body. Most accumulators have a single combined inlet and outlet, which if used in a slurry application would not clean out effectively due to sediment deposits created by agricultural solids falling out of suspension from the slurry.

For this reason, it is advantageous to use a straight flow-through accumulator according to the present disclosure with a specially configured linear flow path for handling slurry with entrained solids that has a cross-sectional area ratio measured directly adjacent to and below the flexible displaceable diaphragm 8054 (i.e., wet side) of the accumulator 8050 which can allow the slurry (fluid) flow to continuously scrub and clean the accumulator out of sediment effectively between sample preparation/processing runs. In one embodiment, for example without limitation, the flow path cross sectional area A1 of lower sub-cavity 8053*b* determined transverse to flow axis Lf preferably does not exceed 20 time, and more preferably 30 times the transverse minimum cross sectional area A2 of the inlet or outlet of the accumulator in preferred embodiments. The slurry inlet 8055 and outlet 8056 may have different or the same cross-sectional areas A2. In the non-limiting illustrated embodiment, the cross-sectional areas of the slurry inlet and outlet are the same.

In sum, the cross-sectional area A1 of the inlet and/or outlet is/are preferably smaller than the overall cross-sectional area A1 of the sub-cavity 8053*b* of the accumulator located below the resiliently deformable diaphragm 8054 measured when the diaphragm is at rest (i.e. not deformed via pressure surges or drops in the fluid system). Advantageously, this sizing and overall ratio of cross-sectional areas of sub-cavity 8053*b* to the inlet and/or outlets 8055, 8056 helps prevent solids from falling out of suspension from the slurry and plugging up the accumulator between slurry processing runs.

To ensure solids or sediment do not fall out of suspension and accumulate inside the lower sub-cavity 8053*b* of the accumulator between slurry processing runs in view of the fact that the cross-sectional area A1 of the lower sub-cavity is substantially larger than the cross-sectional area A2 of the slurry inlet and outlet 8055, 8056, (e.g., at least 20 times) as noted above, the slurry inlet and outlet (and concomitantly longitudinal flow axis Lf defined therebetween) are preferably positioned offset from and below the horizontally-extending geometric longitudinal cavity centerline C1 of lower sub-cavity 8053*b*. Centerline C1 extends through the geometric center of lower sub-cavity 8053*b* and vertically is located mid-way between the lowest point of the lower sub-cavity 8053*b* at the bottom of semi-circular trough 8053*c* and diaphragm 8054 as denoted in FIG. 48. Preferably, slurry inlet and outlet 8055, 8056 are positioned at the very bottom of sub-cavity 8053*b* as best shown in FIGS. 48 and 50. In one embodiment, sub-cavity 8053*b* comprises a pair of opposing sloping and arcuately curved concave sidewalls 8053*d* which help funnel the heavy sediment/solids entrained in the in the slurry flowing through the accumulator downwards to the bottom of the sub-cavity where the stream has the greatest velocity between slurry inlet and outlet 8055, 8056 along the longitudinal flow axis Lf. This advantageously eliminates any corners or dead zones in the lower sub-cavity where the sediment/solids might accumulate between slurry processing runs.

In transverse cross section (relative to longitudinal cavity axis Ca), the lower sub-cavity 8053*b* may not have a completely semi-circular configuration as best shown in FIG. 50. Instead, the arcuately curved concave sidewalls 8053*d* may converge at a pointed apex 8053*e* at the very bottom of the sub-cavity 8053*b*. This may be similar to the apex formed in upper sub-cavity 8053*a* at top. The lowermost slurry trough 8053*c* in lower sub-cavity 8053*b* previously described herein intersects the apex 8053*e*. The lowest point at the bottom of semi-circular trough 8053*c* (in transverse cross section as seen in FIG. 50) is located below the point or apex where the curved converging lower sub-cavity sidewalls 8053*d* meet (see also FIGS. 46 and 48). The curved concave sidewalls 8053*d* of lower sub-cavity 8053*b* may be considered to define a substantially V-shaped transverse cross-sectional shape as opposed to the semi-circular transverse cross-sectional shape of the trough 8053*c*. The term "substantially" as used here connotes that the curved sidewalls 8053*d* are not flat and therefore do not form a perfect V-shape. Upper sub-cavity 8053*a* may be complementary configured to lower sub-cavity 8053*b* each sharing a substantially V-shaped transverse cross section; one being the mirror image of the other on opposites sides of the diaphragm 8054 (see, e.g., FIG. 50).

In addition to prevent the diaphragm 8054 from completely blocking off the slurry inlet and outlet 8055, 8056 during maximum downward deformation of the diaphragm as previously noted herein, the trough 8053*c* advantageously also promotes higher slurry stream velocities therein through accumulator 8050 to help keep the heavy sediment/solids entrained in the slurry moving through the accumulator as it flows between the slurry inlet 8055 and slurry outlet, 8056. This also helps to discourage accumulations or deposits of sediment/solids between slurry processing runs.

The accumulator 8050 is an energy storage device and operates in a conventional manner. In operation, slurry flows through sub-cavity 8053*b* while sub-cavity 8053*a* holds a pressurized volume of gas. If a pressure surge occurs in the slurry recirculation flow loop 8002, the excess pressure which deform the diaphragm 8054 (towards gas sub-cavity 8053*a*) to absorb the pressure pulse and maintain a relatively constant pressure in the flow loop. If slurry pressure in the flow loop drops below the precharged pressure of the accumulator, the diaphragm will move towards slurry sub-cavity 8053*b* to increase the pressure of slurry in the flow loop. The relatively constant pressure maintained by the accumulator in the slurry recirculation flow loop 8002 improves the overall accuracy of slurry density measurements by the density measurement devices in the flow loop.
Slurry Main and Recirculation Pumps The main slurry pump 7081 shown in FIGS. 3-4 and slurry recirculation pump 7080 shown in FIGS. 5-6 which circulates the slurry flow through the closed slurry recirculation flow loop 8002 will now be further described. In one embodiment, a positive displacement pump such as an air-operated double diaphragm (AODD) pump may be used for either or both pumps 7080, 7081 with a unique pump head design including internal fluid path modifications designed to especially handle agricultural slurries such as soil sample slurries or others in which the heavy solid particulate matter or sediment component of the slurry tends to readily drop out of suspension. This type of slurry is somewhat analogous to slurries of water and sand by comparison. For such slurries, standard commercially-available "off the shelf" type AODD pumps are prone to heavy sediment buildup or deposits in the lower portion of the pumping chambers. These sediment deposits create flow restrictions and reduced pumping capacity which adversely affects pumping performance and output. Cleaning the pump between samples becomes significantly difficult also, as sediment does is not readily entrained into the flow while flushing during the cleaning process.

The present AODD pump 7080 with innovative design provisions are configured for minimizing or eliminating sediment accumulations within the pumping chambers overcomes the disadvantages of the foregoing standard AODD pumps for pumping slurries containing heavy particulate or solids such as soil slurries.

The AODD slurry pump will be described for convenience of reference to the slurry recirculation pump recognizing that the same pump description applies to main slurry pump 7081 if the same design is used. It will be appreciated however that different type pumps may be used for either pumps 7080 or 7081 in certain other implementations of the slurry processing systems.

Figure 64:
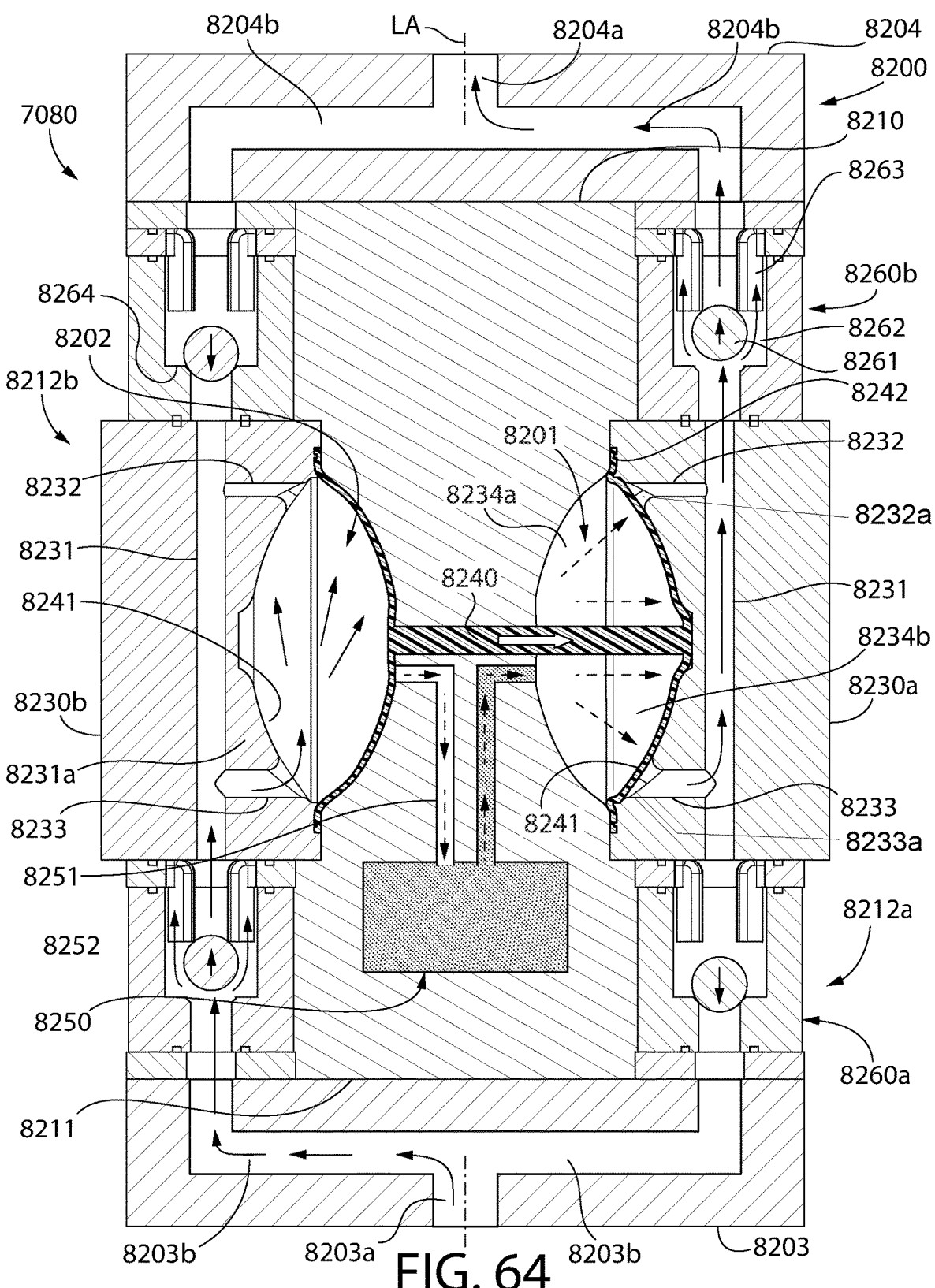
FIG. 64 is a transverse cross sectional view of the air-operated double diaphragm (AODD) pump of the agricultural slurry preparation system showing the pump in a first operational pumping position.
Figure 65:
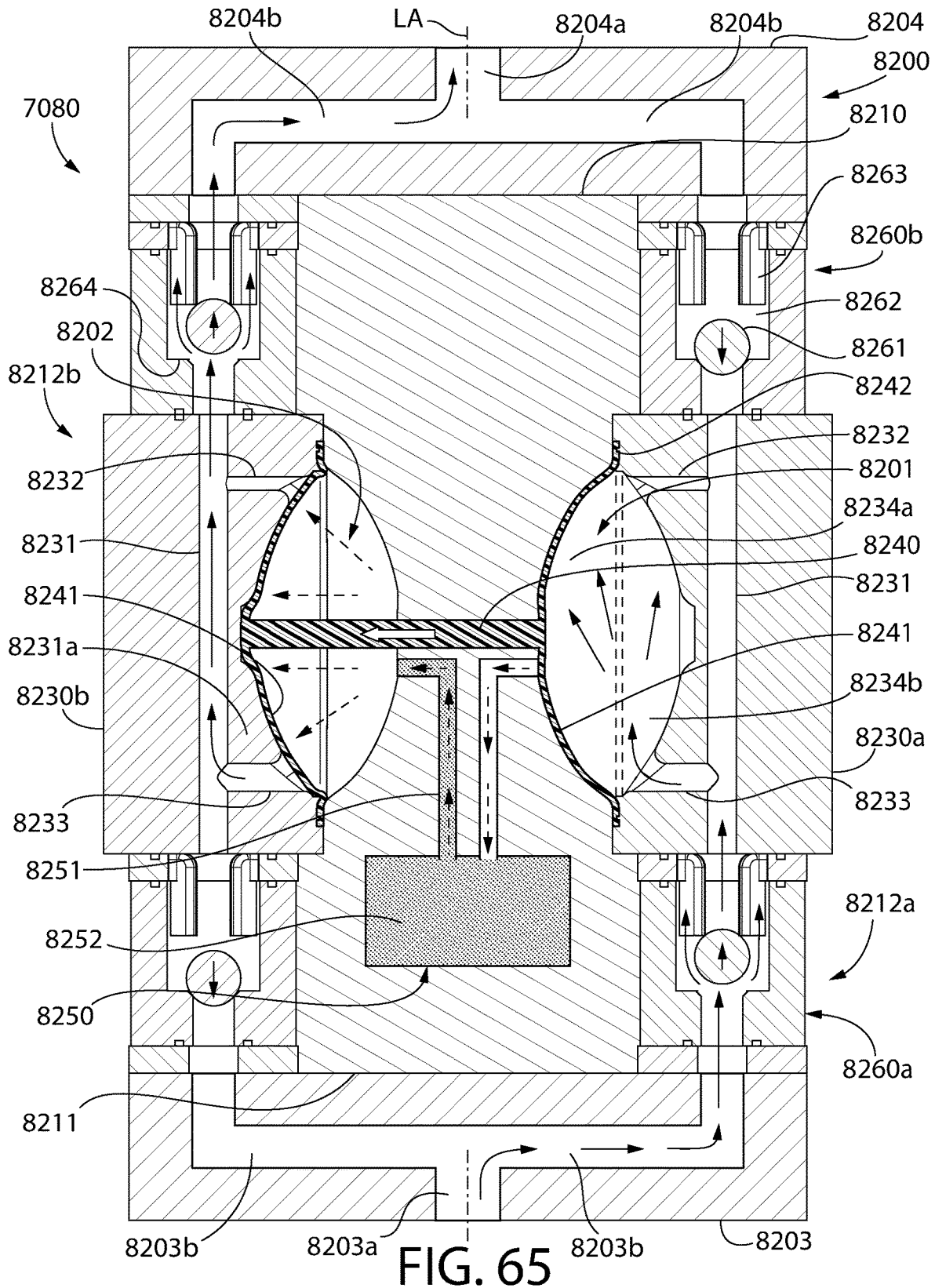
FIG. 65 is a transverse cross sectional view thereof showing the pump in a second operational pumping position.
Figure 66:
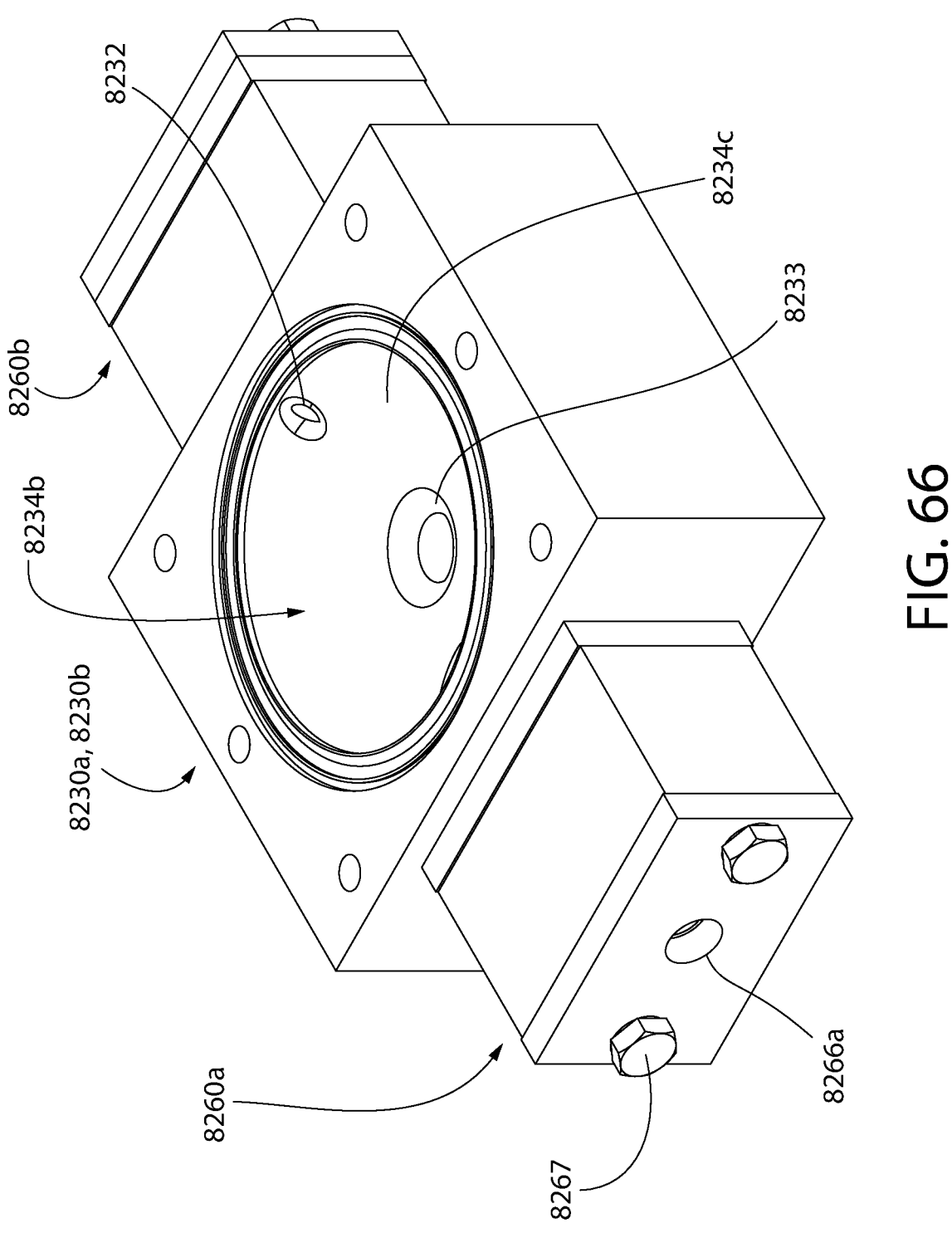
FIG. 66 is a first perspective view of one of the pump heads of the pump showing the inboard side and the inlet and outlet check valves attached.

FIGS. 64-70 show aspects of the AODD slurry recirculation pump 7080 of the slurry recirculation flow loop 8002 according to the present disclosure. FIGS. 64 and 65 are sequential cross-sectional views showing the pump internals and operation of the pump with internal slurry flow paths during the pumping strokes. The pump is depicted in its normal upright (vertical) operating position in these figures.

Referring to FIGS. 64-70 in general initially, slurry recirculation pump 7080 generally comprises a pump body 8200 defining top end 8210, bottom end 8211, opposing right and left lateral sides 8212a, 8212b, and a vertical longitudinal axis LA passing through the geometric center of the pump body for convenience of reference. Right and left pumping chambers 8201, 8202 are formed on opposite sides of longitudinal axis LA.

An inlet flow manifold 8203 and an outlet flow manifold 8204 are coupled to opposite top and bottom ends 8210, 8211 of the body. Each flow manifold comprises an internal flow passage for receiving slurry from slurry recirculation flow loop 8002 into the pump 7080 or discharging/returning the slurry back to the flow loop from the pump. The inlet flow manifold 8203 comprises a single inlet 8203a and a pair of inlet branches 8203b each of which is fluidly connected to one of two inlet check valves 8220. The inlet flow manifold bifurcates or divides and distributes the inlet slurry flow from recirculation flow loop 8002 to each pumping chamber 8201, 8202. Outlet flow manifold 8204 comprises a single outlet 8204a and a pair of outlet branches 8204b each of which is fluidly connected to one of the outlet check valves 8221. Conversely, the outlet flow manifold combines the slurry from each pumping chamber 8201, 8202 and returns the combined flow to the recirculation flow loop 8002 from the discharge of the pump. In one embodiment, the foregoing flow passages of the inlet and outlet flow manifolds may have a cylindrical shape with circular transverse cross section.

Slurry recirculation pump 7080 further comprises right and left pump heads 8230a, 8230b detachably coupled to the pump body 8200 laterally adjacent the right and left pumping chambers 8201, 8202 (see, e.g., FIGS. 64-65). The pump heads may be similar in configuration in one embodiment and may be configured and constructed to provide both a flow function and closure function for the pumping chambers as described below.

The flow function of each pump head 8230a, 8230b is provided by a plurality of fluidly interconnected internal flow passages comprising a longitudinal flowbore 8231 fluidly coupled to the inlet and outlet flow manifolds 8203, 8204, an upper air vent bore 8232, and a lower slurry exchange bore 8233. The upper air vent and lower slurry exchange bores in turn are each fluidly coupled to a respective longitudinal flow bore and the right pumping chamber 8201 or the second pumping chamber 8202 as shown. It bears noting that the longitudinal flow bores 8231 are only fluidly connected to pumping chambers 8201, 8202 via the upper and air vent and lower slurry exchange bores 8232, 8233, All bores may be elongated in configuration (i.e., greater length than diameter) having a cylindrical shape with circular transverse cross section in one embodiment. It bears noting that although reference may be made to the "air vent" and "slurry exchange" ports, either port will have some amount of slurry and air going through it during the various stages of the pump cycle (e.g., priming, pumping, flushing/cleaning, and air purging).

In one embodiment, longitudinal flow bores 8231 of pump heads 8230a, 8230b may be vertically oriented and parallel to vertical longitudinal axis LA of pump 7080. This orientation prevents sediment accumulations from the slurry within the bores. Upper air vent and lower slurry exchange bores 8232, 8233 may be transverse oriented to longitudinal bores 8231. In one embodiment, the upper air vent and lower slurry exchange bores may be perpendicularly oriented to the longitudinally bores. Upper air vent bores 8232 may have a smaller diameter than lower slurry exchange bores 8233 due to the function of these flow passages. The upper air vent bores 8232 are fluidly coupled to the upper end portion of pumping chambers 8201, 8202 to expel trapped air in the chambers during the pumping stroke into the longitudinal flow bores 8231. The lower slurry exchange bores 8233 are fluidly coupled to the lower end portion of the pumping chambers for flushing sediment back out of the chambers during the pumping stroke. Advantageously, this keeps the heavy sediment in the slurry from accumulating in the chambers due to gravity which preserves pumping capacity by eliminating flow restrictions caused by sediment accumulations. The lower slurry exchange bores 8233 may therefore be larger in diameter than the upper air vent bores 8232 and configured for bi-directional/two-way flow during the pumping strokes. Slurry is drawn into the pumping chambers via the lower slurry exchange bores in one direction during the intake stroke of the pump and expelled back out of the chamber in the opposite direction during the discharge or pumping stroke carrying any heavy particles or sediment entrained in the slurry out of the pumping chambers 8201, 8202 with the slurry. The upper air vent bores 8232 may therefore be smaller in diameter since their primary function is to expel air trapped in the chambers during the discharge stroke (albeit some small insignificant amount of slurry might be expelled with the air). The smaller diameter upper air vent bore ensures that primarily air is preferentially ejected from the pumping chambers especially during startup of the pump and initiation of the pumping cycle rather than slurry during the pumping stroke to remove any residual air accumulated within the pumping chambers when not in operation. Once air is purged from the pumping system and pumping chambers, these bores 8232, 8233 will communicate (i.e. exchange) mostly slurry between the longitudinal bores 8231 in the pump heads and the pumping chambers 8201, 8202.

It bears noting that the presence of the internal flow passages (flow bores 8231-8233) distinguish the present AODD pump 7080 from conventional similar type pumps which use only a plain closure cap or plate without internal flow passages to enclose the pumping chambers. In such prior designs, the diaphragm 8241 are movable reciprocating strokes fully within pump chambers. In the present AODD pump design, however, the diaphragms do not enter the longitudinal bores 8231. Both the pump chambers and diaphragms are physically separated/isolated from the longitudinal bores created through the pump heads by a partition wall 8231a formed by the integral material of the pump heads 8230a, 8230b themselves (see, e.g. FIG. 7). In other words, the partition wall is formed integrally by the bodies of the pump heads.

In some embodiments, an entrance 8232a, 8233a of each of the upper air vent bore 8232 and lower slurry exchange bore 8233 into the first pumping chamber may comprise a concave depression to facilitate expelling slurry and sediment entrained in the slurry outwards from the first pumping chamber (see, e.g., 69-70). In particular, at least the lower slurry exchange bore preferably may comprise the concave depression since a majority of slurry entering and leaving the pumping chambers 8201, 8202 is exchanged through bore 8233 with the longitudinal bore 8231 in the pump heads 8230*a*, 8230*b*. To this end, the concave depression associated with the lower slurry exchange bore 8233 may extend down to the very bottom of the pumping chambers (see, e.g., 70) to avoid any dead spaces at the bottom of the chambers where the heavy sediment might accumulate during repeating slurry pumping cycles. In other embodiments, however, the bore entrances may omit the concave depression.

Figure 7:
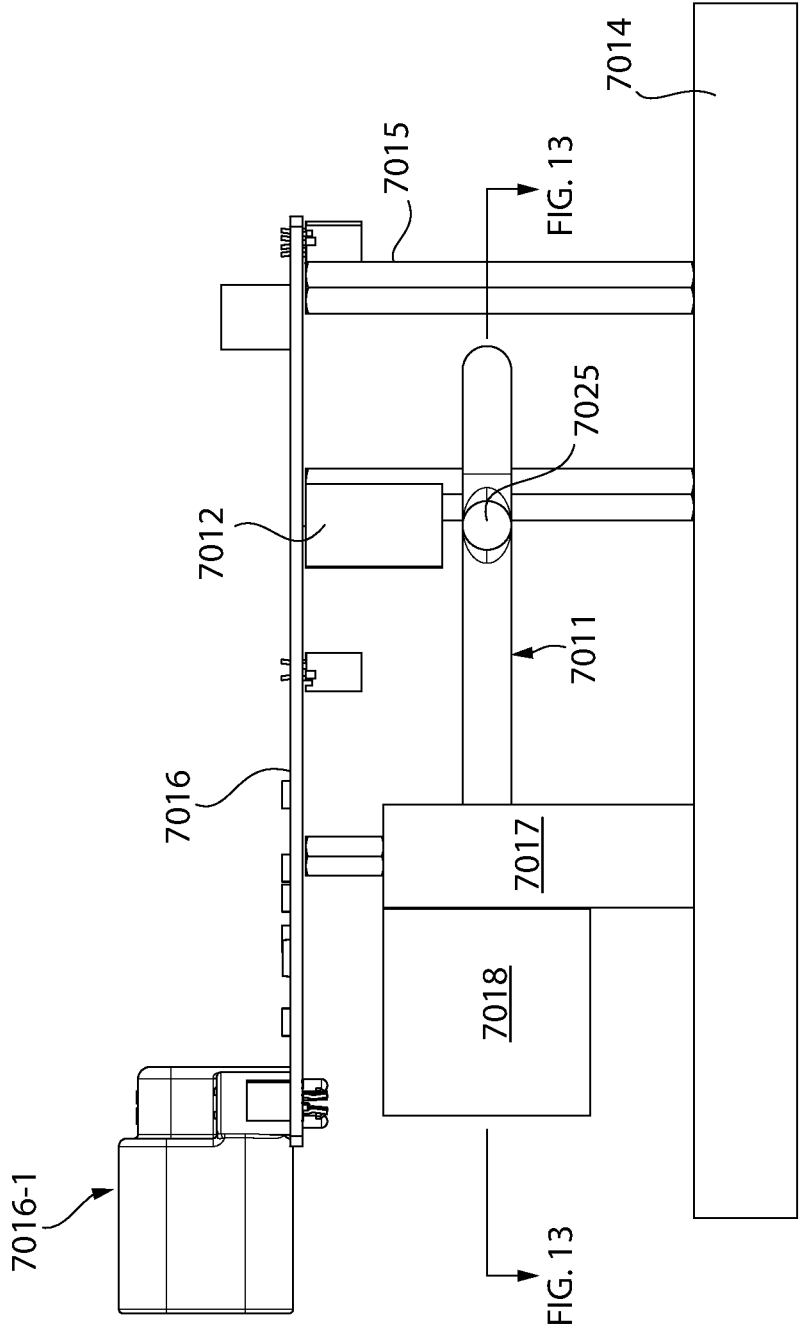
FIG. 7 is a second side view thereof.
Figure 8:
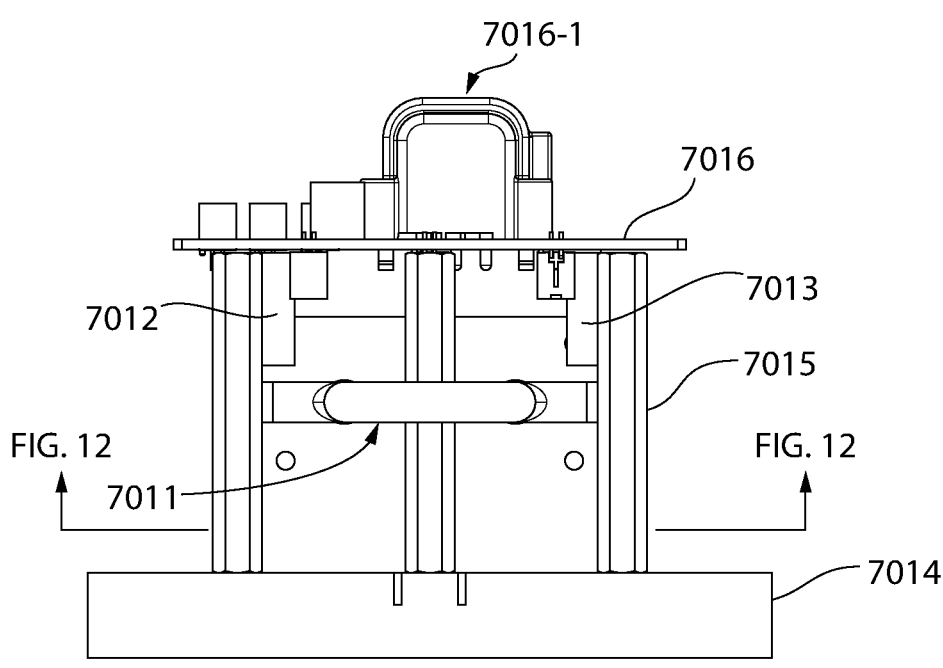
FIG. 8 is a first end view thereof.
Figure 9:
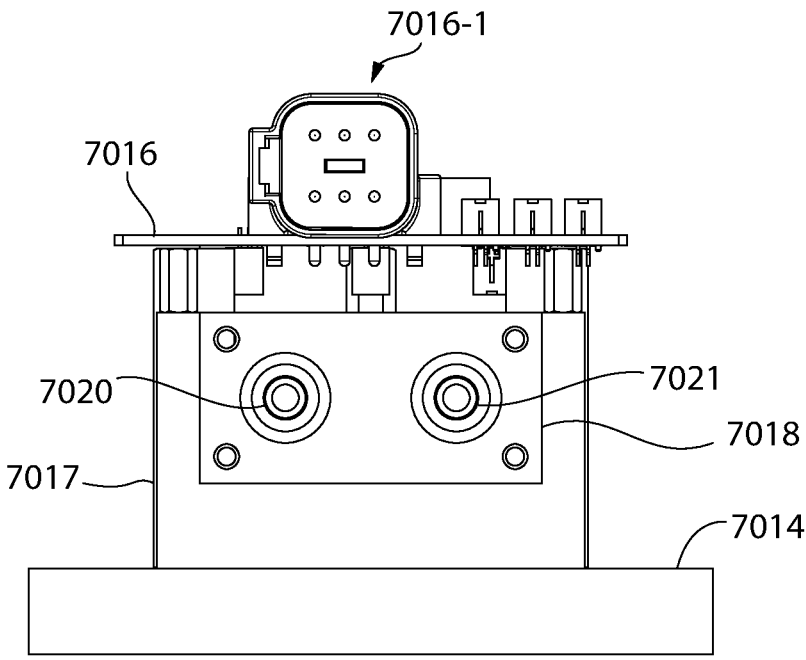
FIG. 9 is a second end view thereof.
Figure 10:
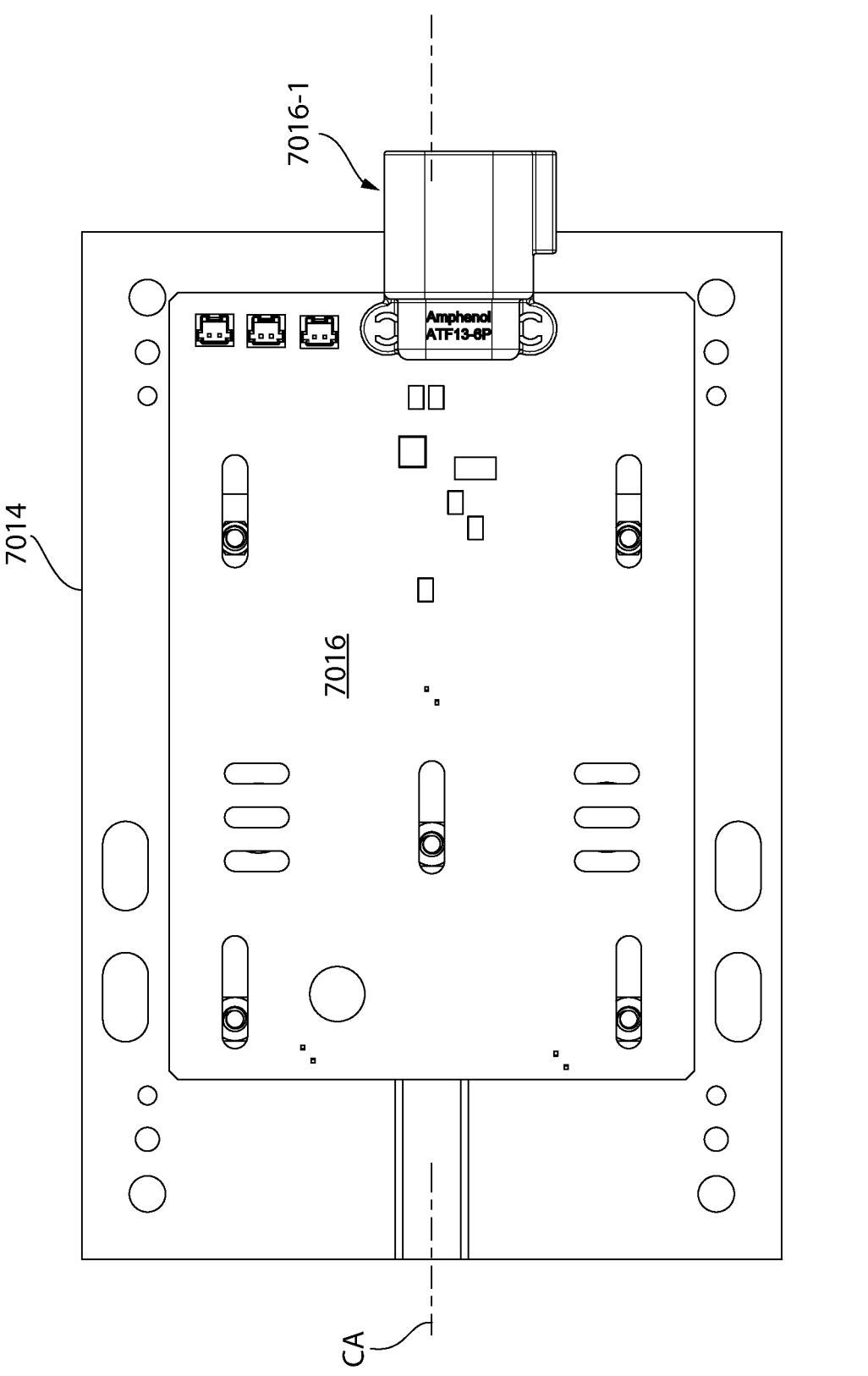
FIG. 10 is top view thereof.
Figure 11:
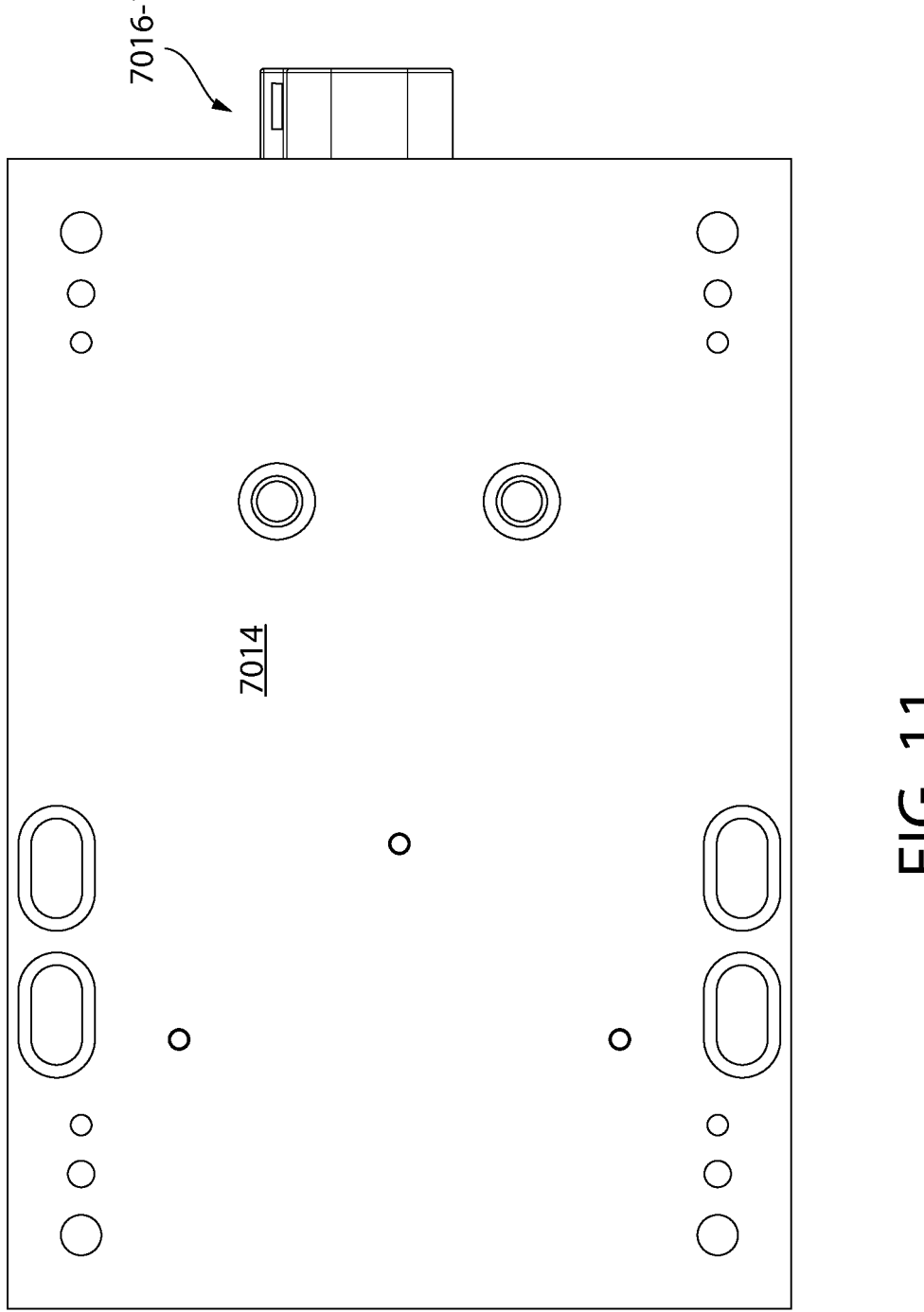
FIG. 11 is a bottom view thereof.
Figure 12:
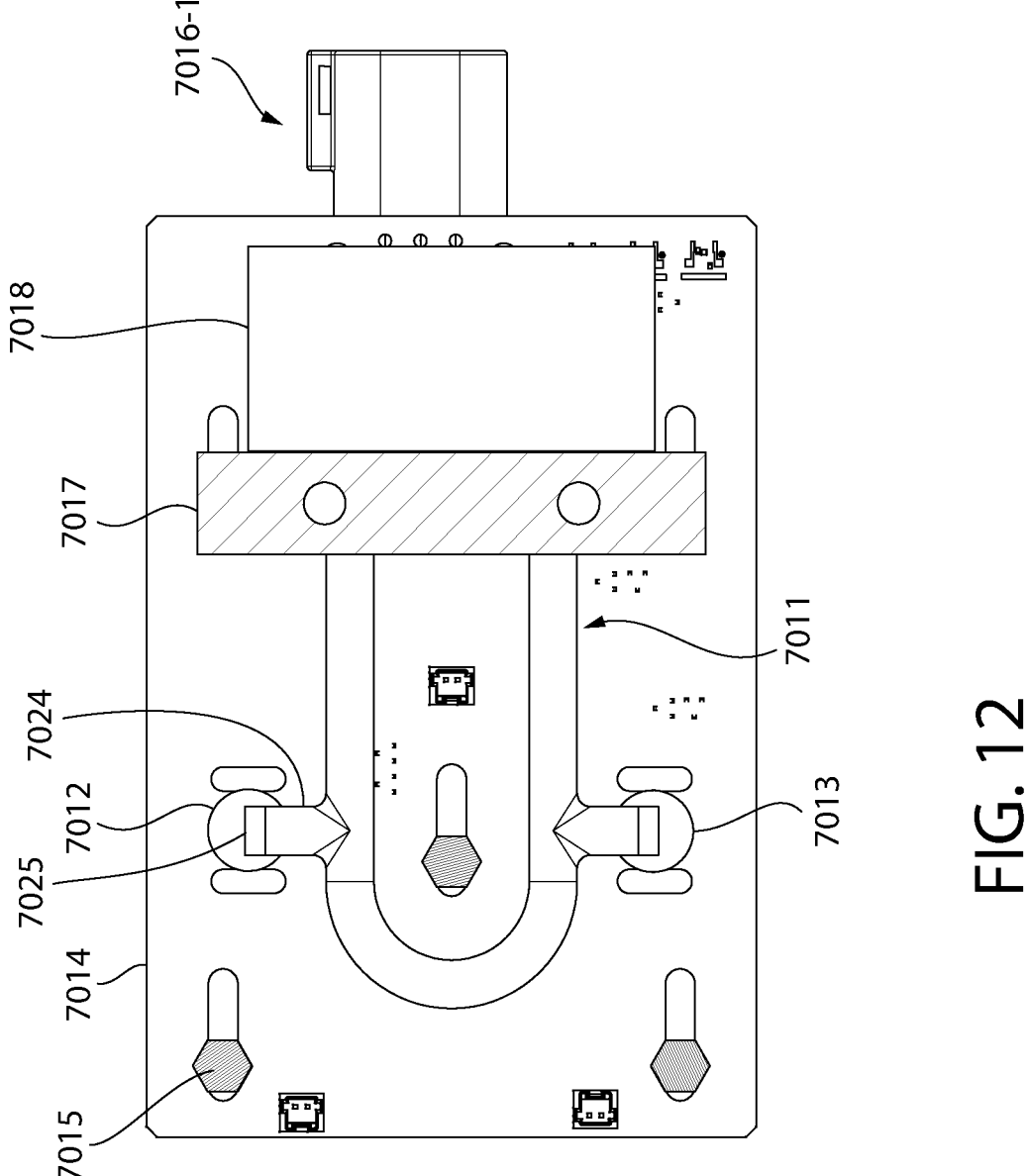
FIG. 12 is a first longitudinal cross sectional view thereof.
Figure 13:
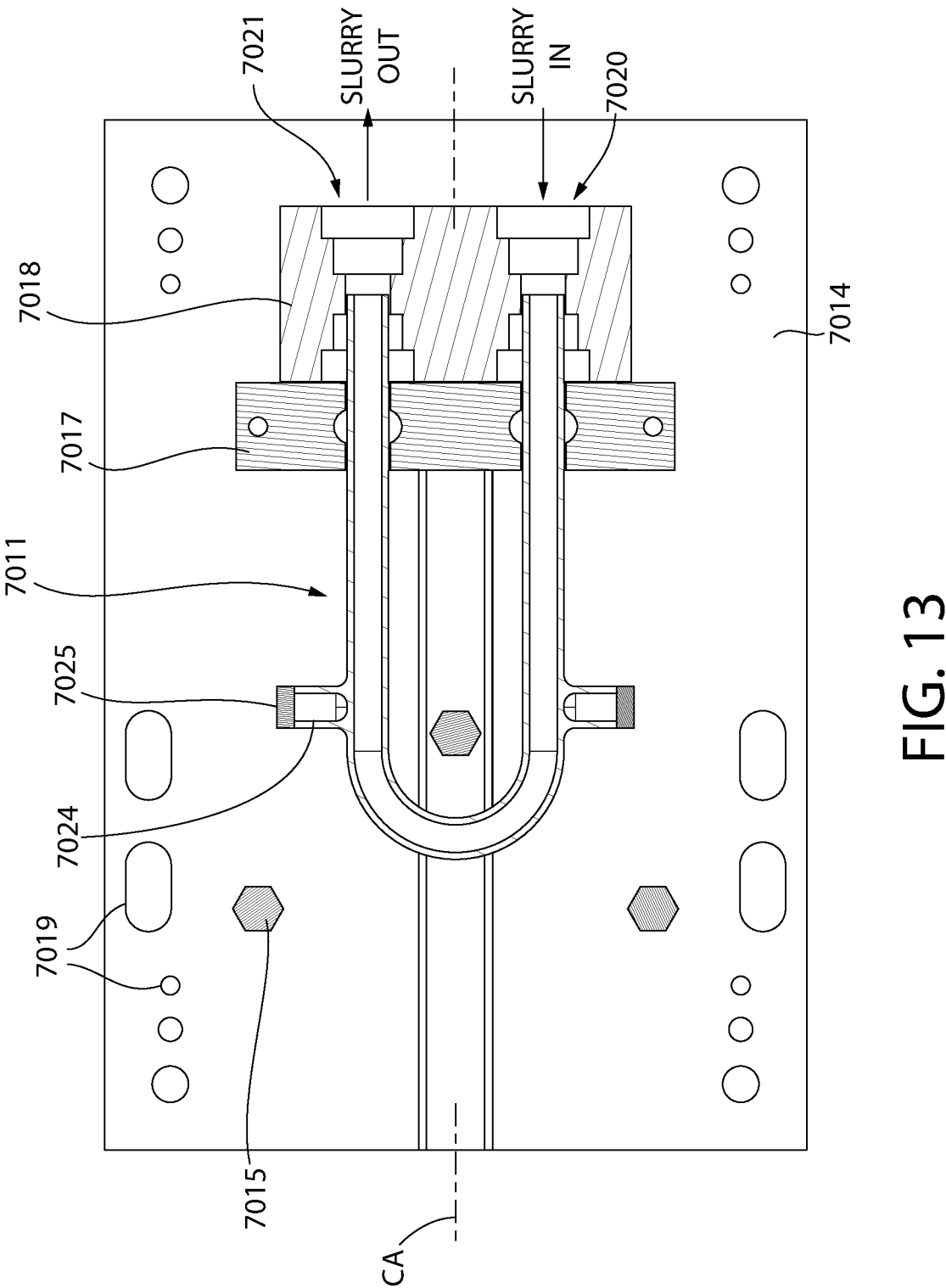
FIG. 13 is a second longitudinal cross sectional view thereof.

The pumping chamber closure function comprises the pump heads 8230*a*, 8230*b* being configured to fully enclose the inboard concavity 8234*a* of pumping chambers 8201, 8202 defined by the pump body 8200. The pump heads define an outboard concavity 8234*b* of the pumping chambers. Accordingly, each of the pump heads comprise an integrally formed outboard concavity which cooperates with a mating inboard concavity of the pump body 8200 to form a shared contiguous total volume which collectively defines each of the pumping chambers 8230*a*, 8230*b*. The concavities 8234*a*, 8234*b* may be complementary configured each having an arcuately curved wall 8234*c* which may be a mirror-image of the opposing curved wall as shown in FIGS. 7-8. In one embodiment, the upper air vent and lower slurry exchange bores 8232, 8233 penetrate the arcuately curved walls 8234*c* of the outboard concavities 8234*b* of the pump heads (see, e.g., FIGS. 64, 65, 68, and 70). Walls 8234*c* physically separate the longitudinal flow bores 8231 of the pump heads from pumping chambers 8201, 8202.

Figure 67:
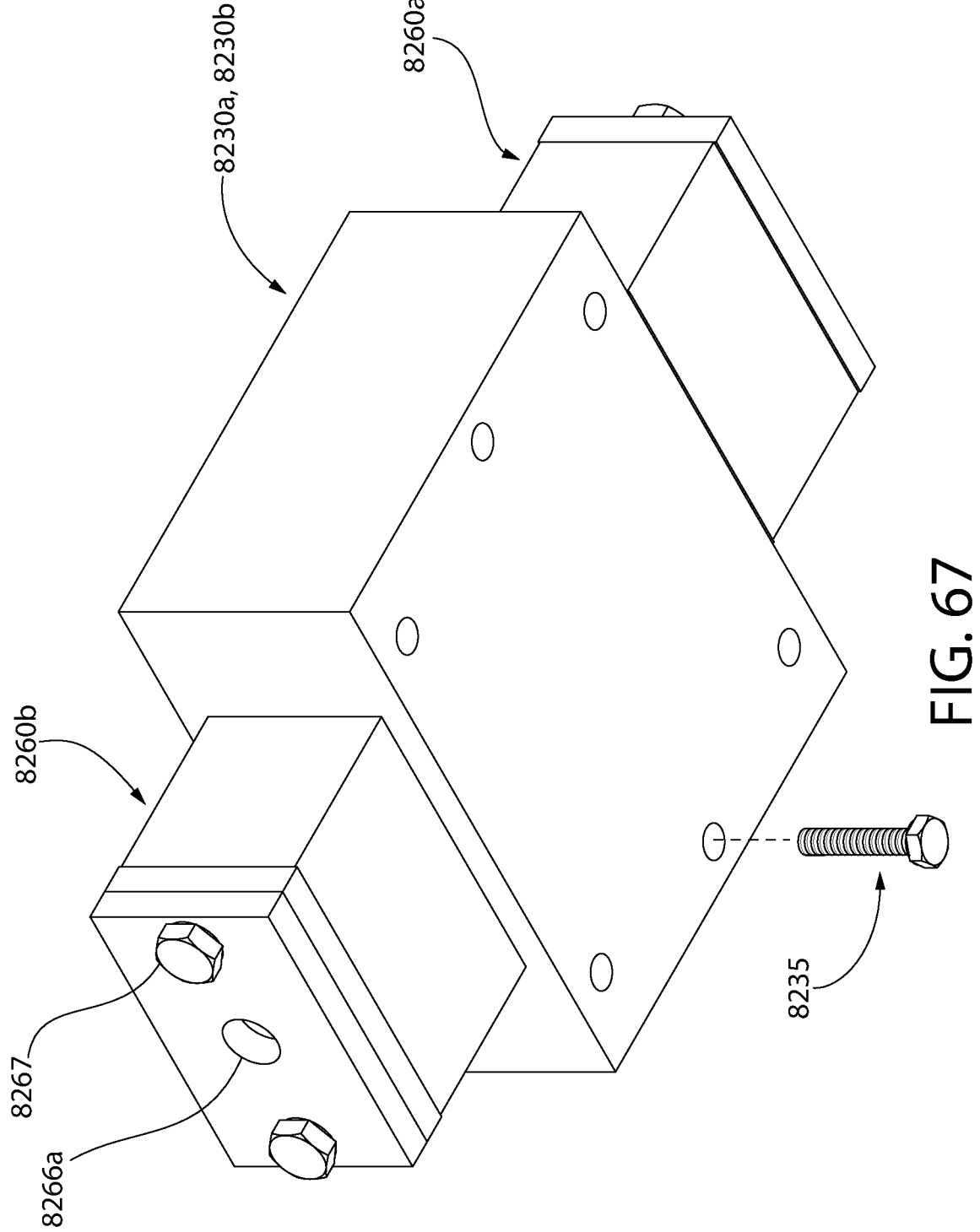
FIG. 67 is a second perspective view thereof showing the opposite outboard side.
Figure 68:
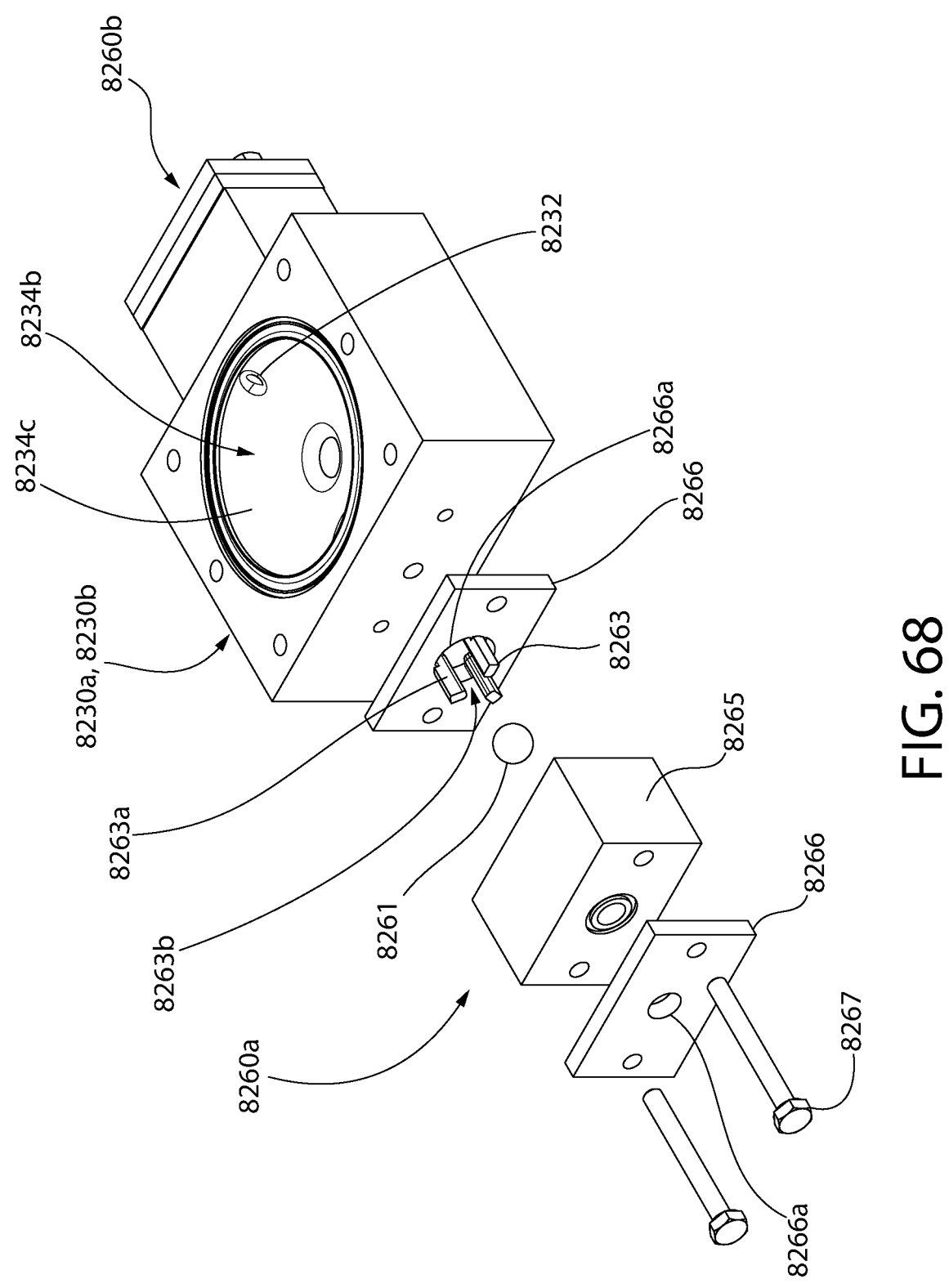
FIG. 68 is a perspective view thereof showing the inlet valve in exploded out.
Figure 69:
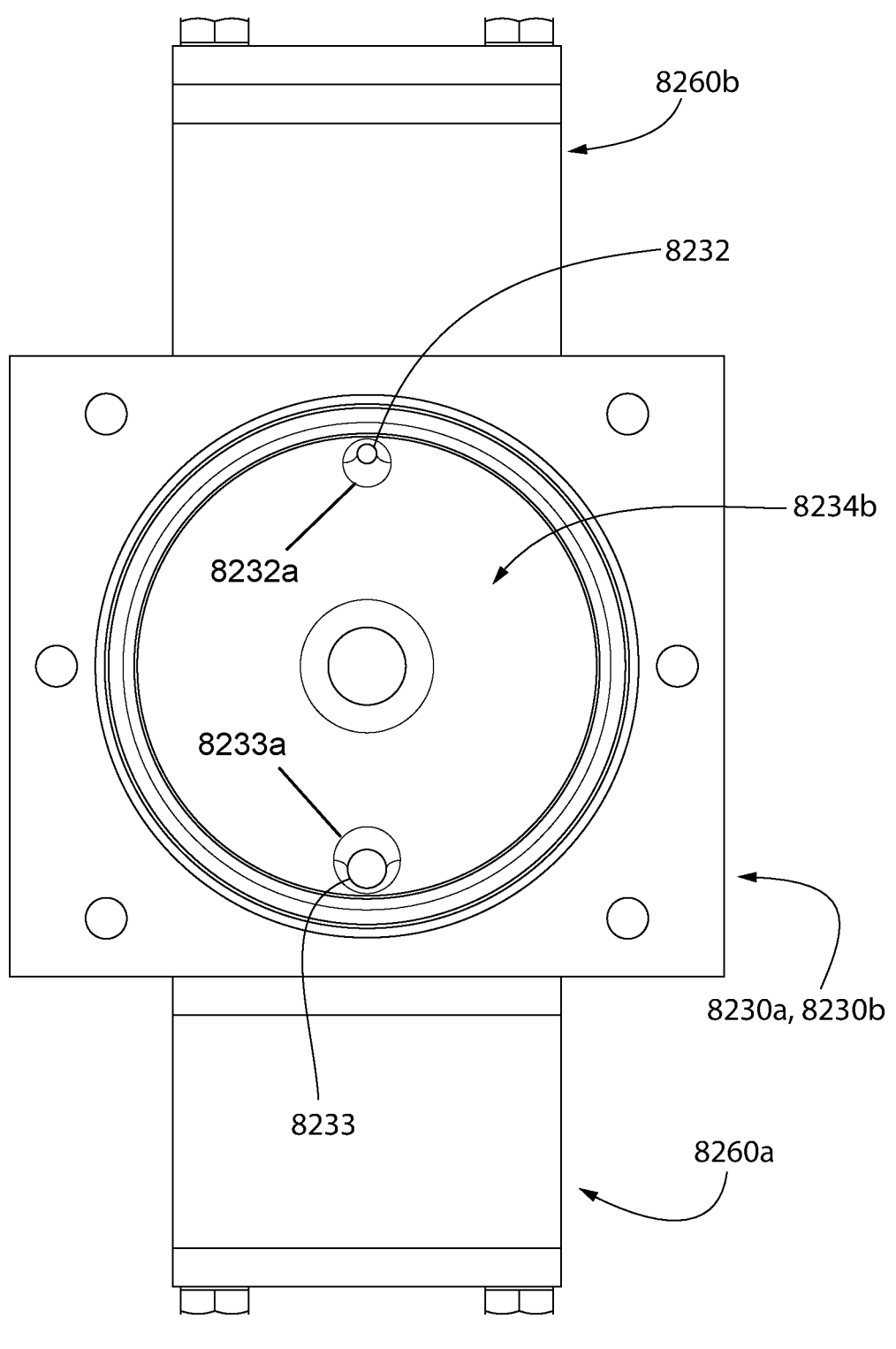
FIG. 69 is a plan view of the inboard side of the pump head and valve assembly.
Figure 70:
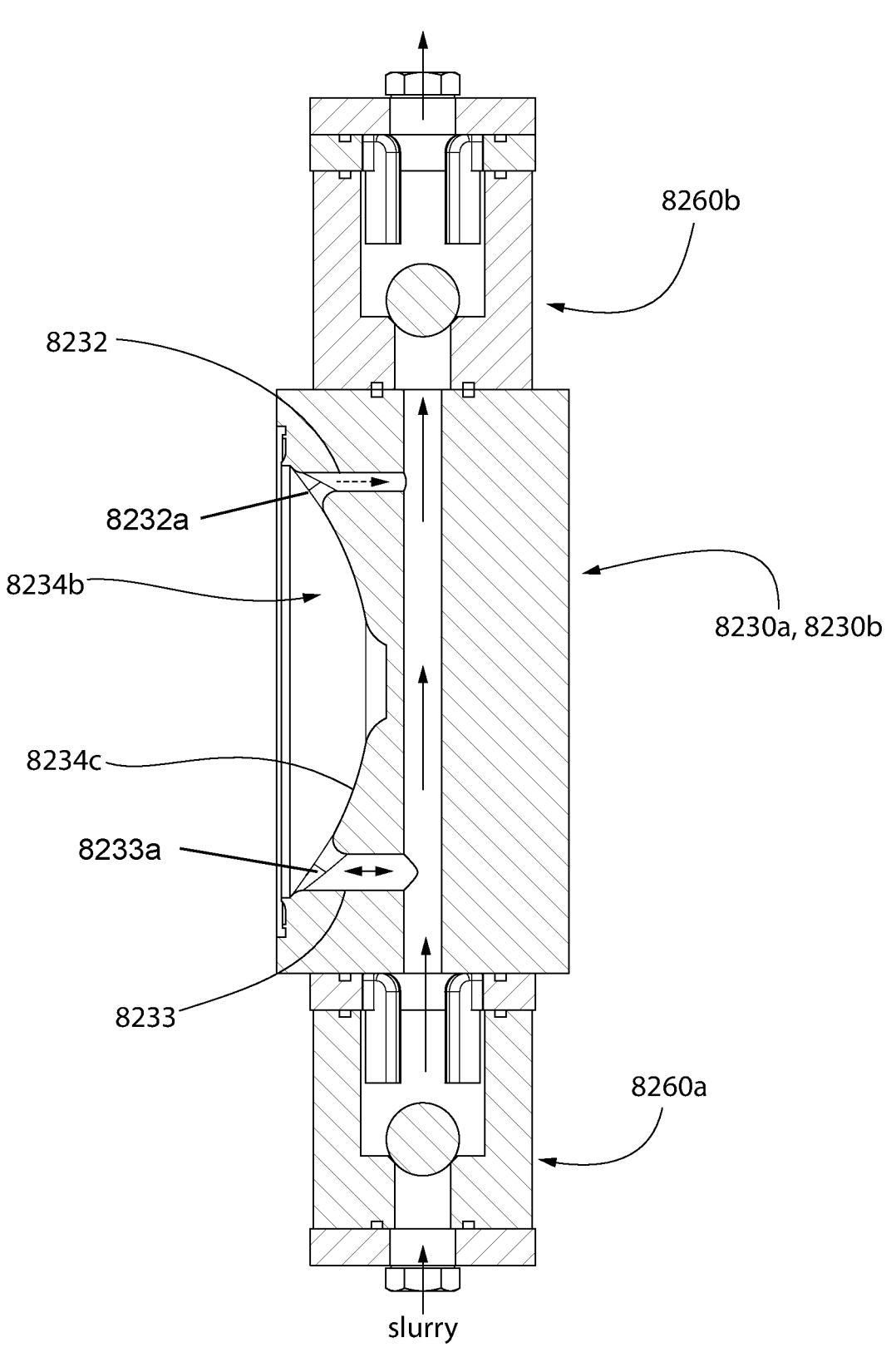
FIG. 70 is a longitudinal cross sectional view thereof.

In one embodiment, the pump heads 8230*a*, 8230*b* may be formed from a solid monolithic piece or block of metallic or non-metallic (e.g., plastic) material which defines a body of the pump heads. The longitudinal flow bores 8231, upper air vent bore 8232 and lower slurry exchange bores 8233 previously described herein may be formed integrally with and in the block via either molding, casting, and/or machining (e.g., drilling/boring) depending in part on the type of material used and method of fabrication (e.g., casting, forging, molding, etc.). The bores 8231-8233 may therefore be cylindrical in configuration having a corresponding circular cross-sectional shape forming discrete flow passages which are separate from and not part of the pumping chambers 8201, 8202. In other words, slurry only enters or leaves the pumping chambers via bores 8231-8233, not directly from and into the inlet or outlet manifolds 8203, 8204 unlike prior AODD pump designs. Pump heads 8230*a*, 8230*b* are configured for detachable mounting to the pump body to access the diaphragms for replacement and other pump maintenance. In one embodiment, the pump heads may be coupled to the pump body 8200 via threaded fasteners 8235 (FIG. 67).

AODD slurry recirculation pump 7080 further includes an operating or pumping mechanism including a laterally translatable operating shaft 8240 comprising a resiliently deformable diaphragm 8241 attached to each of opposite ends of the shaft. One of the diaphragms is disposed in each of the pumping chambers 8201, 8202. Shaft 8240 is perpendicularly oriented to vertical longitudinal axis LA of the pump and movable in a reciprocating back and forth motion (e.g., left and right) during the pumping strokes. Any suitable resiliently deformable elastomeric material may be used for diaphragms 8241. The shaft 8240 is preferably made of metal.

Diaphragms 8241 have a generally round disk-like or circular configuration. The circumferentially-extending peripheral edge 8242 may be trapped between the pump heads 8230*a*, 8230*b* and central portion of the pump body 8200 (best shown in FIGS. 64-65) in one embodiment to secure the diaphragms in place. The ends of the operating shaft 8240 are fixedly coupled to the central portion of the diaphragms such that the shaft may push or pull the diaphragms during opposing motions of the pumping strokes. Any suitable commercially-available resiliently deformable polymeric material with an elastic memory may be used for the diaphragm.

The pumping mechanism is driven by an air distribution system 8250 configured to alternatingly inject or extract air from the pumping chambers 8201, 8202 to translate the shaft back and forth during the reciprocating pumping strokes. FIGS. 64-65 show the air distribution system schematically. The air distribution system includes a pressurized air source 8252 fluidly coupled to each of the chambers 8201, 8202 by an air conduit 8251 which act to both supply air to the one of the chambers during the pumping stroke while venting air from the other chamber at the same time during the return stroke, and vice versa (see dashed directional airflow arrows). Any suitable commercially-available pneumatic (pressurized air) distribution system typically used with AODD pumps may be used.

Two sets of check valves 8260*a*, 8260*b* are provided to alternatingly control the slurry flow into or out of the longitudinal flow bores 8231 in each pump head 8230*a*, 8230*b*. Referring to FIGS. 64-70, an inlet check valve 8260*a* is fluidly coupled between each of the longitudinal flow bores 8231 and the inlet flow manifold 8203. An outlet check valve 8260*b* is fluidly coupled between each of longitudinal flow bores and the outlet flow manifold 8204. The inlet check valves are detachably attached to a top end of the pump heads such as via threaded fasteners 8267, and the outlet check valves are attached to a bottom of the pump heads in a similar manner.

Check valves 8260*a*, 8260*b* may be ball type check valves in one embodiment. Each of the ball check valves generally includes a ball 8261, ball cage 8263, and valve body 8265 defining an internal fluid passageway 8262 which extends completely through each end of the valve for fluid communication with the pump head longitudinal flow bores 8231 and flow passages of the inlet and outlet manifolds 8203, 8204 (see, e.g. in FIGS. 64, 65, 68, and 70). The ball and cage are disposed in fluid passageway 8262 which may have any suitable shape. An annular valve seat 8264 is formed in each valve body within fluid passageway 8262 for seating the ball and closing one of the fluid passageway. Valve bodies 8265 may have any suitable polygonal or non-polygonal configuration. Each valve body 8265 may be formed of a suitable metallic or non-metallic (e.g., plastic) material and may have a monolithic structure.

In some embodiments, a pair of end plates 8266 each comprising a flow hole 8266*a* may be provided. Flow holes 8266*a* are in fluid communication with the internal fluid passageway 8262 of the valve bodies as shown. The ball cage 8263 may be fixedly attached to one of the end plates in each pair. Ball cages 8263 in one embodiment may be formed by a circumferentially spaced apart and axially elongated finger protrusions 8263*a*. The finger protrusions restrict and limit the movement of the ball 8261. Openings 8263*b* are formed between finger protrusions 8263*a* to allow the slurry to pass through and out of the check valves. The ball cage is configured such that the ball engages an end portion of the finger protrusions but does not fully enter between them to keep the openings 8263*b* unobstructed to pass slurry therethrough. It bears noting that the end plate including the flow cage 8263 is attached to the outlet or discharge side of the check valves 8260*a*, 8260*b* (see, e.g., FIGS. 64-65). The valve seat 8264 is at the inlet side of the valves. For the outlet check valves 8260*b*, the pair of end plates may therefore be attached to the same end of the valve body and stacked on top of each other as shown.

A process or method for pumping slurry using slurry recirculation pump 7080 previously described herein will now be summarized with reference to FIGS. 64-65. In these figures, slurry flow arrows are shown as solid and air flow arrows are shown as dashed.

The method generally includes moving the operating shaft 8240 with diaphragms 8241 in a first direction (e.g., right) shown in FIG. 64. The method continues with drawing slurry from inlet manifold 8203 (fluidly coupled to slurry recirculation flow loop 8002 on the intake side of the pump) into pumping chamber 8202 through the inlet check valve 8260$a$, and then through the longitudinal flow bore 8231 and lower slurry exchange bore each formed in the left pump head 8230$b$ (see solid slurry flow arrows). Slurry is drawn into the lower end of chamber via the slurry exchange bore 8233 by the vacuum created on the wet or fluid side of the left pumping chamber diaphragm by the shaft 8240 moving towards the right. The shaft 8240 is laterally and linearly translated in this first direction by applying air pressure to the dry or gas side of diaphragm 8241 in the opposite right pumping chamber 8201 (see dashed air arrows). Simultaneously, air is vented from the left pumping chamber 8202 via the air distribution system 8250.

Once the slurry has been drawn into the left pumping chamber 8202 due to the vacuum created within the chamber by movement of the operating shaft 8240 and diaphragm 8241, the process continues with moving the operating shaft with diaphragms in an opposite second direction (e.g., left) via the air distribution system 8250 as shown in FIG. 65. The diaphragm 8241 in left pumping chamber 8202 pressurizes the slurry and expels it back out of the same lower slurry exchange bore 8233 (opposite to the chamber fill direction) and into the longitudinal flow bore 8231 in the left pumping head 8203$b$. The expelled or discharged slurry re-enters and then flows upwards in longitudinal flow bore 8231 through outlet check valve 8260$b$ and into outlet manifold 8204 for discharge back into the slurry recirculation flow loop 8002.

While the slurry is being expelled from the left pumping chamber 8202, the diaphragm simultaneously expels any air which may have been drawn into the chamber during the foregoing slurry intake pumping stroke through the upper air vent bore and into the longitudinal flow bore 8231 in the left pump head 8230$b$. Any air present in the left pumping chamber 8202 would tend to rise and accumulate at the top end portion of the chamber 8202 which is where the air vent port is fluidly coupled to the chamber for this reason.

The air-driven operating shaft 8240 of pump 7080 reciprocates rapidly right and left to repeat the above process and pump/circulate slurry through the slurry recirculation flow loop 8002. During the pumping intake and discharge strokes, the inlet and outlet check valves 8260$a$, 8260$b$ alternatingly open and close as shown in FIGS. 64-65. During an intake stroke for each pumping chamber 8201 or 8202, the inlet check valve opens to draw slurry into the chamber wile while the outlet check valve simultaneously closes to prevent slurry being drawn back into the pump from the outlet manifold 8204. Conversely, the opposite valve operation occurs during the pumping stroke.

Although slurry recirculation pump 7080 is disclosed as an air-operated double diaphragm (AODD) pump in one non-limiting embodiment, an electric operated double diaphragm (EODD) may alternatively be used with the specially configured pump heads disclosed herein. The electrically configured double diaphragm pumps utilized an electric motor and geared or cam mechanism to laterally translate the operating shaft-diaphragm assembly and are well known in the art without undue elaboration here.

Although slurry recirculation pump 7080 is disclosed as an air-operated double diaphragm (AODD) pump in one non-limiting embodiment, in other embodiments the pump may be an air-operated or electrically driven single diaphragm pump having a single pump head, pumping chamber, and diaphragm actuated by an operating shaft which may be linearly or rotatably moving to produce the pumping stroke action of the diaphragm. In yet other embodiments, more than two diaphragms may be used in the slurry recirculation pump. an electric operated double diaphragm (EODD) may alternatively be used with the specially configured pump heads disclosed herein. The electrically driven shaft may be driven by an electric motor which may include a gear and/or cam mechanism to actuate the diaphragm.

Fine Filter Unit

Returning back to FIGS. 34-35, the fine filter unit 8080 in slurry recirculation flow loop 8002 may be any of the fine filter units 8050 or 8060 previously described herein. The filter screens of these units are configured to filter out larger solid particles or sediment in the slurry of a size which are not conducive to further slurry processing and analysis in the chemical analysis sub-system 3003 and components thereof which may include various microfluidic processing disk devices having extremely small size flow channels or passages readily plugged by such larger particles. By contrast, the coarse filter unit 8020 has a screen opening size to block debris in the agricultural slurry from passing to the slurry recirculation flow loop 8002 and devices therein as previously described herein.

Slurry Density Measurement Device

Slurry density measurement device 8070 in slurry recirculation flow loop 8002 may be any suitable type of preferably digital density meter operable to measure the density of the slurry in dynamic flow conditions while slurry is circulating through slurry recirculation flow loop 8002 and in a static flow conditions. In some embodiments, device 8070 may be any of the previously disclosed embodiments of the density measurement device 7010 of density meters of the U-tube oscillator type. Other digital density meters however may be used.

Agricultural Solids Particle Density Measurement Device

Agricultural solids particle density (S.P.D.) measurement device 8060 in slurry recirculation flow loop 8002 may be any digital device operable to measure the density of the solids or particulate component of the aqueous agricultural slurry. Density data measured by sensors associated with device 8060 may be used in conjunction with the total slurry density measurements from slurry density measurement device 8070 to characterize the water to solids (water/solids) ratio of the slurry circulating through the slurry recirculation flow loop 8002. This information may then be used to determine the appropriate amount of water to be metered and added to the slurry via stirring device 8030 to achieve the target water to solids ratio of the slurry for subsequent downstream processing in the chemical analysis sub-system. Any suitable commercially-available product or electronic circuits and associated sensors may be used for S.P.D. measurement device 8060, such as without limitation such circuits and associated sensors utilized in SmartFirmer from Precision Planting, LLC of Tremont, Illinois, which is described in WO2014/153157, WO2014/186810, WO2015/171908, US20180168094, WO2019070617, and/or WO2020161566.

The apparatuses, devices, and components described herein may be made of any suitable metallic materials, non-metallic materials (e.g., plastic), and combinations thereof suitable for their application described herein and intended service conditions.

In some embodiments, the main slurry pump 7081 previously described herein may be configured the same as slurry recirculation pump 7080 described above and also be an air-operated double diaphragm (AODD) pump. Accordingly, this AODD pump design disclosed herein may be used for either the main slurry or recirculation pump.

EXAMPLES

The following are nonlimiting examples.

Example 1—An agricultural sample preparation system comprising: a mixing device fluidly coupled to a water source, the mixing device configured and operable to receive an agricultural sample and mix the sample with water to prepare a slurry; a stirring device fluidly coupled the first mixing device, the stirring device configured to receive and maintain the slurry in an agitated mixed condition; and a density measurement device fluidly coupled to the stirring device, the density measurement device arranged to receive the slurry and configured to measure a density of the slurry.

Example 2—the system according to Example 1, further comprising a closed slurry recirculation flow loop fluidly coupled to the stirring device, the stirring device comprising a stirring chamber which forms an integral part of the slurry recirculation flow loop.

Example 3—the system according to Example 2, wherein the slurry recirculation flow loop comprises a slurry recirculation pump operable to circulate the slurry through the slurry recirculation flow loop including the stirring device.

Example 4—the system according to Example 3, wherein the slurry recirculation flow loop is fluidly isolated from the mixing device when slurry is circulating through the slurry recirculation flow loop.

Example 5—the system according to Examples 3 or 4, wherein the slurry recirculation flow loop comprises the density measurement device.

Example 6—the system according to Example 5, wherein the density measurement device is a U-tube vibrational density meter configured to measure slurry in a dynamic flowing state through the meter or a stagnant flow state.

Example 7—the system according to any one of Examples 2-6, wherein the slurry recirculation flow loop is fluidly coupled to a slurry analysis sub-system configured to analyze the slurry for an analyte.

Example 8—the system according to Example 7, wherein the analyte has a property of agricultural-related significance.

Example 9—the system according to Examples 7 or 8, wherein the slurry recirculation flow loop further comprises a fine filter unit fluidly coupled to a slurry analysis sub-system, the fine filter unit operable to pass a slurry having a predetermined maximum particle size.

Example 10—the system according to any one of Examples 1-9, further comprising a coarse filter unit fluidly coupled between the mixing device and stirring device, the coarse filter unit configured to remove oversized particles from the slurry received by the stirring device from the mixing device.

Example 11—the system according to Example 10, wherein the coarse filter unit includes a pressurized air inlet and a pressurized water inlet collectively forming a bubbler for clearing oversize particles from a filter screen of the coarse filter unit.

Example 12—the system according to any one of Examples 3-11, wherein the slurry recirculation flow loop further comprises a straight-through accumulator configured to suppress pressure surges produced by the slurry recirculation pump in the slurry recirculation flow loop.

Example 13—the system according to Example 12, wherein the accumulator comprises: a body defining an elongated chamber; a slurry inlet at a first end of the chamber and a slurry outlet at a second end of the chamber, the slurry inlet and slurry outlet defining a longitudinal flow axis extending therethrough; and a resiliently deformable diaphragm dividing the chamber into a pre-charged gas portion and a slurry portion which conveys slurry from the inlet to the outlet in a linear path.

Example 14—the system according to Example 14, wherein a cross-sectional area of the chamber measured transversely to the longitudinal flow axis is about thirty times the cross-sectional area of the slurry inlet and outlet.

Example 15—the system according to Example 2, wherein the mixing device comprises a mixing chamber agitated by a rotatable mixing blade mechanism, and the stirring chamber of the stirring device is agitated by a rotatable stirring blade mechanism.

Example 16—the system according to Example 15, wherein the mixing blade mechanism is configured and operable to impart greater energy into and more aggressively mix the slurry in the mixing device than the stirring blade mechanism in the stirring device.

Example 17—the system according to Example 16, further comprising a level sensor configured to measure a level of slurry in the stirring device, wherein the rotational speed of the stirring blade mechanism is controlled and adjusted based on the level of slurry measured by the level sensor.

Example 18—the system according to any one of Examples 2-17, wherein the stirring device comprises a water inlet configured to add water to the slurry to dilute the slurry to a target water to agricultural solids ratio.

Example 19—the system according to any one of Examples 2-18, wherein the stirring device comprises a slurry inlet to receive slurry from the mixing device, a slurry recirculation inlet fluidly coupled to the slurry recirculation flow loop, and a slurry recirculation outlet fluidly coupled to the slurry recirculation flow loop.

Example 20—A double diaphragm pump comprising: a pump body defining a vertical longitudinal axis and first and second pumping chambers; an inlet flow manifold and an outlet flow manifold coupled to the pump body; a first pump head coupled to the body adjacent the first pumping chamber, the first pump head comprising a longitudinal flow bore separate from the first pumping chamber and fluidly coupled to the inlet and outlet flow manifolds, an upper air vent bore, and a lower slurry exchange bore, the upper air vent bore and lower slurry exchange bore each fluidly coupling the longitudinal flow bore in turn to the first pumping chamber; and an operating shaft coupled to a resiliently deformable diaphragm, the diaphragm disposed in the first pumping chamber; wherein the shaft is moveable in a pump stroke to pump a fluid through the longitudinal bore of the first pump head and the first pumping chamber from the inlet flow manifold to the outlet flow manifold; wherein the upper air vent bore is smaller in diameter than the lower slurry exchange bore such that air is preferentially ejected from the first pumping chamber rather than slurry during the pump stroke.

Example 21—the diaphragm pump according to Example 20, further comprising an inlet check valve fluidly coupled to a bottom end of the longitudinal flow bore and the inlet flow manifold, and an outlet check valve fluidly coupled to a top end of the longitudinal flow bore and the outlet flow manifold.

Example 22—the diaphragm pump according to Examples 20 or 21, wherein the diaphragm does not enter the longitudinal bore of the first pump head during the pump stroke.

Example 23—the diaphragm pump according to any one of Examples 20-22, wherein the lower slurry exchange bore is configured and operable for bidirectional exchange of the fluid between the longitudinal bore and the first pumping chamber.

Example 24—the diaphragm pump according to any one of Examples 20-23, wherein the upper air vent bore and the lower slurry exchange bores are transversely oriented relative to the longitudinal flow bore and formed integrally in the first pump head.

Example 25—the diaphragm pump according to Example 24, wherein longitudinal flow bore is vertically oriented and the upper and lower slurry exchange bores are arranged perpendicularly to the longitudinal flow bores.

Example 26—the diaphragm pump according to any one of Examples 20-25, wherein the upper air vent bore is fluidly coupled to an upper end portion of the first pumping chamber, and the lower slurry exchange bore is fluidly coupled to a lower end portion of the first pumping chamber.

Example 27—the diaphragm pump according to any one of Examples 20-26, wherein there are no other bores fluidly coupling the first pumping chamber to the first longitudinal bore other than the upper air vent bore and the lower slurry exchange bore.

Example 28—the diaphragm pump according to any one of Examples 20-27, further comprising an air distribution system fluidly coupled to the first pumping chamber on a dry side of the diaphragm, the air distribution system being configured to alternatingly inject or extract air from the first and pumping chamber to translate the shaft back and forth to pump the fluid.

Example 29—the diaphragm pump according to any one of Examples 20-28, wherein the first pump head comprises an integrally formed outboard concavity having an arcuately curved wall which cooperates with a mating complementary configured inboard concavity having an arcuately curved wall integrally formed in the pump body to form a shared volume which collectively defines the first pumping chamber.

Example 30—the diaphragm pump according to any one of Examples 20-29, wherein the upper air vent bore and the lower slurry exchange bore is fluidly coupled directly to the outboard concavity.

Example 31—the diaphragm pump according to Examples 10 or 11, wherein the arcuately curved wall of the inboard concavity is a mirror-image of the arcuately curved wall of the outboard concavity.

Example 31A—the diaphragm pump according to any one of Examples 20-30, wherein the longitudinal flow bore, upper air vent bore, and lower slurry exchange bore are cylindrical in configuration having a circular transverse cross section.

Example 32—the diaphragm pump according to any one of Examples 20-31A, wherein the longitudinal flow bore is physically separated from the first pump chamber by a partition wall formed integrally by a body of the first pump head.

Example 33—the diaphragm pump according to any one of Examples 20-32, wherein the diaphragm pump is a double diaphragm pump further comprising: a second pump head coupled to the body adjacent the second pumping chamber, the second pump head comprising a second longitudinal flow bore separate from the second pumping chamber and fluidly coupled to the inlet and outlet flow manifolds, a second upper air vent bore, and a second lower slurry exchange bore, the second upper air vent bore and second lower slurry exchange bore each fluidly coupling the second longitudinal flow bore in turn to the second pumping chamber; wherein the operating shaft is linearly translatable and coupled to a resiliently deformable second diaphragm, the second diaphragm disposed in the second pumping chamber; wherein the shaft is moveable back and forth in reciprocating pump strokes to pump the fluid alternatingly through the longitudinal bore of the first pump head and the second longitudinal bore of the second pump head from the first and second pumping chambers.

Example 34—A method for pumping slurry comprising: providing a double diaphragm slurry pump comprising a vertical longitudinal axis and a pair of first and second pumping chambers, a first and second pump head enclosing the first and second pumping chambers respectively, and a translatable operating shaft comprising a resiliently deformable diaphragm coupled to each of opposite ends of the shaft, one of the diaphragms disposed in each of the first and second pumping chambers; moving the operating shaft in a first direction; during an intake stroke; drawing slurry from an inlet manifold into the first pumping chamber through a longitudinal bore of the first pump head and a lower slurry exchange bore each formed in the first pump head separate from the first pumping chamber; moving the operating shaft in a second direction during a pumping stroke; and expelling the slurry back through the lower slurry exchange bore during the pumping stroke from the first pumping chamber back into the longitudinal bore of the first pump head, while simultaneously expelling air from the first pumping chamber into the longitudinal bore of the first pump head through an upper air vent bore; and expelling air from the first pump chamber through an upper air vent bore during the pumping stroke into the longitudinal flow bore of the first pump head simultaneous to the step of expelling the slurry; wherein the upper air vent bore is smaller in diameter than the lower slurry exchange bore such that air is preferentially ejected from the first pumping chamber rather than slurry.

Example 35—the method according to Example 34, wherein the expelling step further comprises flowing the slurry through the longitudinal bore of the first pump head to an outlet manifold.

Example 36—the method according to Example 35, wherein the slurry flows to the outlet manifold through an outlet check valve.

Example 37—the method according to Examples 35 or 36, wherein the drawing step further comprises drawing the slurry first through the longitudinal flow bore from the intake manifold prior to drawing the slurry through the lower slurry exchange bore into the first pumping chamber.

Example 38—the method according to any one of Examples 35-37, further comprising a step of expelling air vent bore fluidly couples the longitudinal flow bore of the first pump head directly to an upper portion of first pump chamber, and the lower slurry exchange bore fluidly couples the longitudinal flow bore of the first pump head directly to a lower simultaneous to the step of expelling the slurry.

Example 38A—the method according to Example 38, wherein there are no other bores fluidly coupling the first pumping chamber to the longitudinal bore of the first pump head other than the upper air vent bore and the lower slurry exchange bore.

Example 39—the method according to any one of Examples 34-38A, wherein the slurry is drawn from the inlet manifold through an inlet check valve during the drawing step.

Example 40—the method according to any one of Examples 34-39, wherein the step of moving the operating shaft in the first direction comprises moving the diaphragm in the first pump chamber towards the first pump head, and the step of moving the operating shaft in the second direction comprises moving the diaphragm in the first pump chamber away the first pump head in an opposite direction.

Example 41—the method according to any one of Examples 34-40, further comprising drawing slurry from the inlet manifold into the second pumping chamber through a longitudinal flow bore and a lower slurry exchange bore formed in the second pump head simultaneous with the step of expelling the slurry back through the lower slurry exchange bore into the first pump head.

Example 42—the method according to any one of Examples 34-41, wherein the shaft is moved by applying pressurized air to the diaphragms in the first or second pumping chambers which deforms the diaphragms to move the shaft.

Example 42A—the method according to Example 34, wherein the longitudinal bore is vertically oriented and elongated, and the inlet and outlet manifolds are both horizontally oriented and elongated.

Example 42B—the method according to Example 42, wherein slurry flows upwards in the longitudinal bore during the drawing slurry step, the slurry flows downwards in the longitudinal bore during the expelling the slurry step.

Example 42C—the method according to Example 34, wherein an entrance of each of the lower slurry exchange bore into the first pumping chamber comprises a concave depression to facilitate expelling sediment entrained in the slurry outwards from the first pumping chamber.

Example 43—A method for forming and processing an agricultural slurry, the method comprising: adding water and agricultural solids to a mixing chamber of a mixing device; agitating the water and agricultural solids with the mixing device to form a slurry; discharging the slurry into a flow conduit; pressurizing the flow conduit to drive the slurry into a filter unit comprising a filter screen; and filtering the slurry through the filter screen to remove particles in the slurry larger than a predetermined particle size; and discharging filtered slurry from the filter unit.

Example 44—the method according to Example 43, further comprising injecting pressurized air and water into the filter unit during the filtering step.

Example 45—the method according to Example 44, wherein the filtering step comprises flowing the slurry in a first direction through the filter screen and flowing the pressurized air and water through the filter screen in a second direction opposite to the slurry.

Example 46—the method according to Example 45, wherein the slurry enters a first cavity in the filter unit on a first side of the filter screen and the pressurized air and water are injected into a second cavity in the filter unit on a second side of the screen opposite the first side.

Example 47—the method according to Example 46, wherein the filter unit comprises a slurry inlet configured to flow the slurry in a linear flow path through the first cavity, a waste outlet configured to discharge the oversized particles from the first cavity in the same linear flow path, and a slurry outlet configured to discharge the filtered slurry in a direction transverse to the linear flow path.

Example 48—the method according to any one of Examples 43-47, wherein the slurry enters the filter unit in a direction parallel to a direction in which the filtered slurry is discharged.

Example 49—the method according to any one of Examples 43-48, wherein the mixing device is fluidly isolated from flow conduit during the pressurizing step.

Example 50—An inline accumulator for moderating pressure in a slurry flow conduit system, the accumulator comprising: a body defining an elongated chamber; a slurry inlet at a first end of the chamber and a slurry outlet at a second end of the chamber, the slurry inlet and slurry outlet being coaxially aligned and defining a longitudinal flow axis extending therethrough; and a resiliently deformable diaphragm dividing the chamber into a pre-charged gas portion and a slurry portion which conveys slurry from the inlet to the outlet in a linear path; wherein the diaphragm deforms due to increases or decreases in pressure of the slurry to maintain a relatively constant pressure in the slurry flow conduit system.

Example 51—the accumulator according to Example 50, wherein the accumulator comprises an axially elongated trough having a concave shape which extends between the slurry inlet and the slurry outlet.

Example 52—A slurry filter unit comprising: a body having an interior defining an upper cavity and a lower cavity; a filter screen arranged between the upper and lower cavities; an unfiltered slurry inlet in fluidly coupled to the upper cavity; a waste outlet fluidly coupled to the upper cavity opposite the unfiltered slurry inlet which defines a slurry inlet flow path in the upper cavity; a filtered slurry outlet fluidly coupled to the lower cavity; wherein the filter unit is configured to pass slurry through the filter screen from the first to second cavities in a direction transverse to the slurry inlet flow path.

Example 53—the slurry filter unit according to Example 52, wherein the slurry inlet flow path is linear.

Example 54—the slurry filter unit according to Examples 51 or 52, further comprising a pressurized air inlet for injecting air and a pressurized water inlet for injecting water collectively forming a bubbler for clearing oversize particles from the filter screen.

Example 55—the slurry filter unit according to Example 54, wherein the pressurized air and water inlets are fluidly coupled to the lower cavity below the filter screen.

Example 56—the slurry filter unit according to Example 55, wherein the air and water flow through the filter screen in a direction from the lower cavity to the upper cavity.

Example 57—the slurry filter unit according to any one of Examples 51-56, wherein the filter screen is elongated and arcuately curved in configuration defining a concave side facing the upper cavity and a convex side facing the lower cavity.

Example 58—the slurry filter unit according to any one of Examples 51-57, wherein the unfiltered slurry inlet comprises a resiliently deformable segmented tubing coupling comprising a plurality of radially deformable elongated fingers with longitudinal slits circumferentially separating the fingers, the tubing coupling configured to insert a flow tube inside the tubing coupling.

Example 59—the slurry filter unit according to any one of Examples 51-58, wherein the unfiltered slurry inlet and the filter slurry outlet each define a respective centerline which is parallel to each other.

Example 60—A slurry stirring device comprising: an elongated housing defining a vertical centerline and a stirring chamber; a slurry inlet configured to receive the slurry, a slurry recirculation inlet configured for fluid coupling to a closed slurry recirculation flow loop, and a slurry recirculation outlet configured for fluid coupling to the slurry recirculation flow loop; and a rotatable blade mechanism configured to maintain the slurry in an agitated mixed condition in the stirring chamber.

Example 61—the slurry stirring device according to Example 60, further comprising a motor operably coupled to the blade mechanism and configured to rotate the blade mechanism.

Example 62—the slurry stirring device according to Examples 60 or 61, wherein the blade mechanism comprises at least a first blade assembly including a first drive shaft operably coupled to the motor and a first set of blades fixedly coupled thereto.

Example 63—the slurry stirring device according to Example 62, wherein the first drive shaft is vertically oriented and the first set of blades is disposed in a bottom portion of the slurry chamber.

Example 64—the slurry stirring device according to Example 63, further comprising a second blade assembly including a vertical second drive shaft operably coupled to the motor and a second set of blades fixedly coupled thereto and disposed in a bottom portion of the slurry chamber.

Example 65—the slurry stirring device according to Example 64, wherein the first and second drive shafts are operably coupled to the motor by a gear train.

Example 66—the slurry stirring device according to Examples 64 or 65, wherein the first blade assembly rotates in a first rotational direction and the second blade assembly rotates in a second rotational direction.

Example 67—the slurry stirring device according to Example 66, wherein the slurry recirculation inlet is configured to introduce slurry from the slurry recirculation flow loop tangentially to an interior sidewall of the stirring chamber.

Example 68—the slurry stirring device according to Example 67, wherein the slurry recirculation inlet is further configured to introduce the slurry into the stirring chamber in a same direction as the second rotational direction of the second blade assembly.

Example 69—the slurry stirring device according to any one of Examples 64-68, wherein the stirring chamber has a figure eight shape in transverse cross section forming a first section and a second section separated by a narrowed throat area of the stirring chamber.

Example 70—the slurry stirring device according to Example 69, wherein the first blade assembly is disposed in the first section of the stirring chamber and the second blade assembly is disposed in the second section of the stirring chamber.

Example 71—the slurry stirring device according to Examples 69 or 70, wherein the slurry recirculation outlet is disposed in the narrowed throat area of the stirring chamber between the first and second sections.

Example 72—the slurry stirring device according to any one of Examples 60-71, wherein the stirring device further comprises an overflow port fluidly coupled to a top end of the stirring chamber and a waste outlet port fluidly coupled to the bottom of the stirring chamber.

Example 73—the slurry stirring device according to any one of Examples 60-72, further comprising a water inlet configured to add water to the slurry to dilute the slurry.

Example 74—the slurry stirring device according to any one of Examples 60-73, further comprising a level sensor configured to measure a level of slurry in the stirring chamber, wherein a rotational speed of the stirring blade mechanism is controlled and adjusted based on the level of slurry in the stirring chamber measured by the level sensor.

Example 75—the slurry stirring device according to any one of Examples 60-74, wherein the housing of the stirring device has a segmented construction comprising a removable top cover, a top section, a mid-section, and a bottom section.

Additional Examples—Method for
Forming/Processing an Agricultural Slurry

1A. A method for forming and processing an agricultural slurry, the method comprising: adding water and agricultural solids to a mixing chamber of a mixing device; agitating the water and agricultural solids at a first speed with the mixing device to form a slurry; discharging the slurry from the mixing device into a filter unit via a flow conduit fluidly coupled therebetween; coarsely filtering the slurry through the filter screen of a coarse filter to remove particles in the slurry larger than a predetermined first maximum particle size; and receiving the filtered slurry from the filter unit in a stirring chamber of a stirring device defining a stirring chamber; and agitating the slurry at a second speed different than the first speed in the stirring device.

2A. The method according to Example 1A, wherein the mixing device includes a rotatable first blade mechanism which is rotated during the agitating the water and agricultural solids step to form the slurry, and the stirring device includes a rotatable second blade mechanism which is rotated during the agitating the slurry step.

3A. The method according to Examples 1A or 2A, wherein the first speed is faster than the second speed.

4A. The method according to any one of Examples 1A-3A, wherein the stirring chamber of the stirring device forms an integral part of a closed slurry recirculation flow loop fluidly coupled to the coarse filter unit.

5A. The method according to Example 4A, wherein the slurry recirculation flow loop comprises a slurry recirculation pump which circulates the slurry through the slurry recirculation flow loop and the stirring device.

6A. The method according to Example 5A, wherein the slurry recirculation flow loop is fluidly isolated from the mixing device when the slurry is circulating through the slurry recirculation flow loop.

7A. The method according to Examples 5A or 6A, wherein the stirring device is operable to maintain the slurry in a mixed homogenous state as the slurry circulates through the slurry recirculation flow loop.

8A. The method according to Example 7A, further comprising measuring a density of the slurry in the mixed homogenous state concurrently with circulating the slurry through the slurry recirculation flow loop.

9A. The method according to Example 8A, wherein the slurry recirculation flow loop comprises a density measurement device which measures the density of the slurry.

10A. The method according to Example 9A, wherein the density measurement device is a U-tube vibrational density meter configured to measure slurry in a dynamic flowing state through the meter or a stagnant flow state.

11A. The method according to any one of Examples 1A-10A, wherein the slurry recirculation flow loop is fluidly coupled to a slurry chemical analysis sub-system configured to analyze the slurry for an analyte of agricultural-related significance.

12A. The method according to Example 11A, further comprising finely filtering the slurry through a fine filter unit fluidly disposed within the slurry recirculation flow loop before a step of flowing filtered slurry from the fine filter unit to the slurry chemical analysis sub-system.

13A. The method according to Example 12A, wherein the fine filter unit is configured to remove solid particle in the slurry having a predetermined second maximum particle size smaller than the predetermined first maximum particle size of the coarse filter unit.

14A. The method according to any one of Examples 1A-13A, further comprising pressurizing the flow conduit with air between the mixing device and stirring device to drive the slurry through the coarse filter unit and into the stirring device.

15A. The method according to Example 14A, wherein the mixing device is fluidly isolated from the flow conduit during the pressurizing step.

16A. The method according to Example 1A, further comprising injecting pressurized air and water forming an aerated stream through the coarse filter unit during the coarsely filtering step to prevent solid particles larger than the predetermined first maximum particle size from blocking the filter screen.

17A. The method according to Example 16A, wherein the coarsely filtering step comprises flowing the slurry in a first direction through the filter screen and flowing the aerated stream through the filter screen in a second direction opposite to the first direction.

18A. The method according to Example 17A, wherein the slurry enters a first cavity in the coarse filter unit on a first side of the filter screen and the pressurized air and water are injected into a second cavity in the filter unit on a second side of the screen opposite the first side.

19A. The method according to Example 18A, wherein the coarse filter unit comprises a slurry inlet configured to flow the slurry in a linear flow path through the first cavity, a waste outlet configured to discharge the oversized particles from the first cavity in the same linear flow path, and a slurry outlet configured to discharge the filtered slurry in a direction transverse to the linear flow path.

20A. The method according to any one of Examples 5A-19A, wherein the slurry recirculation flow loop further comprises an accumulator positioned upstream of the slurry pump, the accumulator configured to dampen pressure surges in the slurry recirculation flow loop.

Additional Examples—Accumulator

1B. An inline accumulator for moderating pressure in a slurry flow conduit system, the accumulator comprising: a body defining an elongated chamber; a resiliently deformable diaphragm dividing the chamber into an upper sub-cavity configured to be precharged with an inert gas and a lower sub-cavity configured to convey slurry; the lower sub-cavity defining a geometric longitudinal cavity centerline; a slurry inlet formed at a first end of the lower sub-cavity and a slurry outlet formed at an opposite second end of the lower sub-chamber, the slurry inlet and slurry outlet being coaxially aligned with each other and defining a longitudinal flow axis extending therebetween: the longitudinal flow axis defined by the slurry inlet and slurry outlet being vertically offset from the longitudinal cavity centerline of lower sub-cavity; wherein the diaphragm deforms due to increases or decreases in pressure of the slurry to maintain a constant pressure in the slurry flow conduit system.

2B. The accumulator according to Example 1B, wherein the slurry is flowable through the lower sub-cavity from the slurry inlet to the slurry outlet in a linear flow path.

3B. The accumulator according to Examples 1B or 2B, wherein the lower sub-cavity comprises a longitudinally elongated trough formed at a bottom of the body in the lower sub-cavity configured to collect and move sediment entrained in the slurry through the lower sub-cavity as the slurry is flowing.

4B. The accumulator according to Example 3B, wherein the trough extends along a length of the body completely between the slurry inlet and the slurry outlet.

5B. The accumulator according to Examples 3B or 4B, wherein the trough is co-axially aligned with the slurry inlet and outlet.

6B. The accumulator according to any one of Examples 3-5B, wherein the trough has a semi-circular transverse cross-sectional shape.

7B. The accumulator according to Example 6B, wherein the trough has a different transverse cross-sectional shape than the lower sub-cavity.

8B. The accumulator according to Example 7B, wherein the lower sub-cavity has a substantially V-shaped transverse cross-sectional shape.

9B. The accumulator according to any one of Examples 3B-8B, wherein the lower sub-cavity is formed by sloping and converging arcuately curved concave sidewalls of the body of the accumulator which intersect the trough.

10B. The accumulator according to any one of Examples 1B-9B, wherein the slurry inlet and slurry outlet are located at a bottom of the lower sub-cavity 11B The accumulator according to Example 1B, wherein the lower sub-cavity has a transverse flow path cross sectional area which does not exceed 30 times a transverse minimum cross sectional area of the slurry inlet or the slurry outlet of the accumulator.

12B. The accumulator according to Example 11B, wherein the slurry inlet and the slurry outlet each have the same cross-sectional area.

13B. The accumulator according to Example 1B, wherein the lower sub-cavity has a substantially V-shaped transverse cross-sectional shape.

14B, The accumulator according to Example 13B, wherein the upper sub-cavity has a substantially V-shaped transverse cross-sectional shape complementary configured to the transverse cross-sectional shape of the lower sub-cavity.

151B. The accumulator according to any one of Examples 1B-14B, wherein the diaphragm is sandwiched and trapped between first and second half-sections of the body which are detachably coupled together.

16B. The accumulator according to Example 1B, wherein the accumulator includes a pressurized gas port arranged to precharge the upper sub-cavity with the inert gas.

17B. The accumulator according to any one of Examples 1B-16B, wherein the slurry is an agricultural slurry.

18B. The accumulator according to Example 17B, wherein the agricultural slurry is a soil slurry.

It bears noting that the unique features recited by foregoing Examples 1B-18B and described in further detail previously herein are directed to an accumulator specifically configured and operable for successfully handling slurries with entrained/suspended solids and sediment such as soil slurries as opposed to those prior accumulator designs which handle liquids alone containing no substantial amount of suspended solids.

Additional Examples—Slurry Filtering

1C. A slurry filter unit comprising: a Y-shaped body having an interior defining an upper cavity and a lower cavity; a filter screen arranged between the upper and lower cavities; an unfiltered slurry inlet fluidly coupled to the upper cavity; a waste outlet fluidly coupled to the upper cavity opposite the unfiltered slurry inlet which defines a slurry inlet flow path in the upper cavity; a filtered slurry outlet fluidly coupled to the lower cavity; wherein the filter unit is configured to pass slurry through the filter screen from the first to second cavities in a direction transverse to the slurry inlet flow path.

2C. The slurry filter unit according to Example 1C, wherein the slurry inlet flow path is linear such that the slurry flows parallel to a length of the filter screen.

3C. The slurry filter unit according to Examples 1C or 2C, further comprising a pressurized air inlet configured for injecting air and a pressurized water inlet configured for injecting water collectively forming a bubbler for clearing oversize particles from the filter screen.

4C. The slurry filter unit according to Example 3C, wherein the pressurized air and water inlets are fluidly coupled to the lower cavity below the filter screen.

5C. The slurry filter unit according to Example 4C, wherein the pressurized air and water inlets are arranged to flow the pressurized air and water upwards through the filter screen in a direction from the lower cavity to the upper cavity to clear oversized particles from the filter screen.

6C. The slurry filter unit according to Example 5C, wherein the filter unit is configured such that the pressurized air and water flow upwards through the filter screen from the lower cavity to the upper cavity.

7C. The slurry filter unit according to any one of Examples 1C-6C, wherein the filter screen is arcuately curved from side to side in configuration defining a concave side facing the upper cavity and a convex side facing the lower cavity.

8C. The slurry filter unit according to any one of Examples 1C-7C, wherein the upper cavity is angled downwards relative and obliquely to a horizontal reference plane such that the slurry travels across the filter screen in a same obliquely angled flow path.

9C. The slurry filter unit according to any one of Examples 2C, 7C, or 8C, wherein the unfiltered slurry inlet is disposed at one end of the upper cavity and a waste outlet is disposed at an opposite end thereof.

10C. The slurry filter unit according to Example 9C, wherein the upper cavity is configured so that oversized particles entrained in the slurry mixture which are too large to pass through the screen openings in the filter screen flow in a linear path across the concave upper surface of screen to the waste outlet.

11C The slurry filter unit according to any one of Examples 1C-10C, wherein the unfiltered slurry inlet comprises a resiliently deformable segmented tubing coupling comprising a plurality of radially deformable elongated fingers with longitudinal slits circumferentially separating the fingers, the tubing coupling configured to insert a flow tube inside the tubing coupling.

12C. The slurry filter unit according to any one of Examples 1C-11C, wherein the unfiltered slurry inlet and the filtered slurry outlet each define a respective centerline which is parallel to each other.

13C. The slurry filter unit according to any one of Examples 1C-12C, wherein the filter unit is oriented such that the upper cavity is positioned above the lower cavity when the filter unit is in use and the filter screen extends horizontally between the upper and lower cavities.

14C, The slurry filter unit according to any one of Examples 1C-13C, wherein the slurry comprises water and an agricultural sample material.

15C. The slurry filter unit according to Example 14C, wherein the agricultural sample material is soil.

16C. The slurry filter unit according to any one of Examples 1C-15C, wherein the lower cavity has a oblique frustoconical shape such that the lower cavity narrows moving downwards in direction from an upper portion adjacent the filter screen towards the filtered slurry outlet located at a bottom of the lower cavity.

17C, The slurry filter unit according to any one of Examples 1C-16C, wherein the upper cavity of body is covered by a clear plastic cover configured to allow the filter screen to be viewed by a user.

18C. A method for filtering a slurry comprising: providing a filter unit comprising a filter screen, an upper cavity formed above the filter screen, and a lower cavity formed below the filter screen; injecting pressurized air and water into the lower cavity to produce an aerated water stream; flowing the aerated water stream through the filter screen into the upper cavity; introducing unfiltered slurry into the upper chamber of a filter unit; and passing the unfiltered slurry through the filter screen in a countercurrent direction to the aerated water stream to produce a filtrate.

19C, The method according to Example 18C, wherein the filter unit has Y-shaped body.

20C. The method according to Examples 18C or 19C, further comprising: the unfiltered slurry being introduced into the upper chamber in a direction parallel to and flowing along a length of the filter screen from an unfiltered slurry inlet of the filter unit; passing a portion of the slurry with oversized particles entrained in the slurry which are too large to pass through the screen openings in filter screen flow in a linear flow path along an upper surface of the filter screen towards a waste outlet in the upper chamber located directly opposite the unfiltered slurry inlet.

21C. The method according to Example 20C, wherein the upper surface of the filter screen is arcuately curved from side to side and concave in shape forming a trough.

22C The method according to Examples 20C or 21C, wherein the flow of slurry with entrained oversized particles through the waste outlet is controlled by an openable and closeable waste valve fluidly coupled thereto.

23C. The method according to Example 22C, wherein the filter unit is operated in a self-cleaning mode when the waste valve is opened to expel the portion of the slurry with entrained oversized particles simultaneously with the step of passing the unfiltered slurry through the filter screen in a countercurrent direction to the aerated water stream to produce a filtrate.

24C. The method according to any one of Examples 18C-23C, wherein the step of injecting pressurized air and water into the lower cavity comprises injecting pressurizes water first followed by applying air pressure to produce the aerated water stream.

25C. The method according to any one of Examples 18C-24C, wherein the air is injected through an air inlet port in the lower cavity which is separate from water inlet portion therein through which the pressurized water is injected.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A method for forming and processing an agricultural slurry, the method comprising:
   adding water and agricultural solids to a mixing chamber of a mixing device;
   agitating the water and agricultural solids at a first speed with a rotatable first blade mechanism of the mixing device to form a slurry;
   discharging the slurry from the mixing device into a coarse filter unit via a flow conduit fluidly coupled therebetween;
   coarsely filtering the slurry through a filter screen of the coarse filter unit to remove particles in the slurry larger than a predetermined first maximum particle size;
   receiving the filtered slurry from the coarse filter unit in a stirring chamber of a stirring device defining the stirring chamber; and
   agitating the slurry with a rotatable second blade mechanism at a second speed different than the first speed in the stirring device;
   wherein the stirring chamber of the stirring device forms an integral part of a closed slurry recirculation flow loop fluidly coupled to the coarse filter unit, the slurry recirculation flow loop comprising a slurry recirculation pump which circulates the slurry through the slurry recirculation flow loop and the stirring device, the slurry recirculation flow loop being fluidly isolated from the mixing device when the slurry is circulating through the slurry recirculation flow loop.

2. The method according to claim 1, wherein the first speed is faster than the second speed.

3. The method according to claim 1, wherein the stirring device is operable to maintain the slurry in a mixed homogenous state as the slurry circulates through the slurry recirculation flow loop.

4. The method according to claim 3, further comprising measuring a density of the slurry in the mixed homogenous state concurrently with circulating the slurry through the slurry recirculation flow loop.

5. The method according to claim 4, wherein the slurry recirculation flow loop comprises a density measurement device which measures the density of the slurry, the density measurement device being a U-tube vibrational density meter configured to measure slurry in a dynamic flowing state through the meter or a stagnant flow state.

6. The method according to claim 1, wherein the slurry recirculation flow loop is fluidly coupled to a slurry chemical analysis sub-system configured to analyze the slurry for an analyte of agricultural-related significance.

7. The method according to claim 6, further comprising finely filtering the slurry through a fine filter unit fluidly disposed within the slurry recirculation flow loop before a step of flowing filtered slurry from the fine filter unit to the slurry chemical analysis sub-system, the fine filter unit being configured to remove solid particle in the slurry having a predetermined second maximum particle size smaller than the predetermined first maximum particle size of the coarse filter unit.

8. The method according to claim 1, further comprising pressurizing the flow conduit with air between the mixing device and stirring device to drive the slurry through the coarse filter unit and into the stirring device.

9. The method according to claim 8, wherein the mixing device is fluidly isolated from the flow conduit during the pressurizing step.

10. The method according to claim 1, further comprising injecting pressurized air and water forming an aerated stream through the coarse filter unit during the coarsely filtering step to prevent solid particles larger than the predetermined first maximum particle size from blocking the filter screen.

11. The method according to claim 10, wherein the coarsely filtering step comprises flowing the slurry in a first direction through the filter screen and flowing the aerated stream through the filter screen in a second direction opposite to the first direction.

12. The method according to claim 11, wherein the slurry enters a first cavity in the coarse filter unit on a first side of the filter screen and the pressurized air and water are injected into a second cavity in the filter unit on a second side of the screen opposite the first side.

13. The method according to claim 12, wherein the coarse filter unit comprises a slurry inlet configured to flow the slurry in a linear flow path through the first cavity, a waste outlet configured to discharge the oversized particles from the first cavity in the same linear flow path, and a slurry outlet configured to discharge the filtered slurry in a direction transverse to the linear flow path.

14. The method according to claim 1, wherein the slurry recirculation flow loop further comprises an accumulator positioned upstream of the slurry pump, the accumulator configured to dampen pressure surges in the slurry recirculation flow loop.

15. The method according to claim 1, wherein the slurry recirculation flow loop is downstream of the mixing device and the coarse filter unit.

16. A method for forming and processing an agricultural slurry, the method comprising:
   adding water and agricultural solids to a mixing chamber of a mixing device;
   agitating the water and agricultural solids at a first rotational speed with the mixing device to form a slurry;
   discharging the slurry from the mixing device and receiving the filtered slurry in a stirring chamber of a stirring device; and
   agitating the slurry at a second rotational speed different than the first rotational speed in the stirring device;
   wherein the stirring chamber of the stirring device forms an integral part of a closed slurry recirculation flow loop, the slurry recirculation flow loop comprising a slurry recirculation pump which circulates the slurry through the slurry recirculation flow loop and the stirring device, the slurry recirculation flow loop being fluidly isolated from the mixing device when the slurry is circulating through the slurry recirculation flow loop.

17. The method according to claim 16, wherein the slurry recirculation flow loop is downstream of the mixing device.

*   *   *   *   *